(12) United States Patent
Cannon Wilson et al.

(10) Patent No.: US 12,043,567 B2
(45) Date of Patent: Jul. 23, 2024

(54) TEXTURED GLASS-BASED ARTICLES WITH MULTIPLE HAZE LEVELS AND PROCESSES OF PRODUCING THE SAME

(71) Applicant: CORNING INCORPORATED, Corning, NY (US)

(72) Inventors: Shunda Denise Cannon Wilson, Painted Post, NY (US); John Martin Dafin, Christiansburg, VA (US); Yuhui Jin, Painted Post, NY (US); George Karl Kaufman, Painted Post, NY (US); Hamidreza Pirayesh, Corning, NY (US); Thomas Christopher Zajicek, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 240 days.

(21) Appl. No.: 17/536,276

(22) Filed: Nov. 29, 2021

(65) Prior Publication Data

US 2022/0169563 A1 Jun. 2, 2022

Related U.S. Application Data

(60) Provisional application No. 63/281,817, filed on Nov. 22, 2021, provisional application No. 63/119,046, filed on Nov. 30, 2020.

(51) Int. Cl.
| | | |
|---|---|---|
| *B32B 15/04* | (2006.01) | |
| *B24B 7/24* | (2006.01) | |
| *B32B 17/06* | (2006.01) | |
| *C03C 15/00* | (2006.01) | |
| *B24B 7/04* | (2006.01) | |

(52) U.S. Cl.
CPC ............... *C03C 15/00* (2013.01); *B24B 7/24* (2013.01); *B24B 7/04* (2013.01); *C03C 2204/08* (2013.01)

(58) Field of Classification Search
CPC .................................................. C03C 2204/08
USPC .................................................. 428/410, 426
See application file for complete search history.

(56) References Cited

U.S. PATENT DOCUMENTS

| | | | |
|---|---|---|---|
| 10,239,782 B2 * | 3/2019 | Bazemore | ............... C03C 15/00 |
| 11,109,500 B2 * | 8/2021 | Shannon | ............... G06F 1/1656 |
| 11,533,817 B2 * | 12/2022 | Shannon | ............... H04N 23/54 |
| 11,560,330 B2 * | 1/2023 | Hu | ............... C03C 4/18 |
| 11,691,912 B2 * | 7/2023 | Tatebe | ............. H01M 50/1245 |
| | | | 65/30.14 |
| 2016/0102010 A1 | 4/2016 | Beall et al. | |
| 2019/0300422 A1 | 10/2019 | Guo et al. | |

(Continued)

FOREIGN PATENT DOCUMENTS

| | | |
|---|---|---|
| EP | 3748464 A1 | 12/2020 |
| EP | 3798694 A1 | 3/2021 |

(Continued)

OTHER PUBLICATIONS

Lead (Leadrp.net), 2023.*

(Continued)

*Primary Examiner* — Lauren R Colgan
(74) *Attorney, Agent, or Firm* — William J. Tucker

(57) ABSTRACT

A textured glass-based article with multiple haze levels is provided. The textured glass-based articles are produced by utilizing a combination of etching and mechanical polishing to produce the multiple haze levels.

28 Claims, 45 Drawing Sheets

(56) References Cited

U.S. PATENT DOCUMENTS

2020/0389991 A1* 12/2020 Shannon ................. C03C 15/00
2021/0080778 A1* 3/2021 Hatano ............. G02F 1/133331
2022/0011468 A1* 1/2022 Hart ...................... C23C 14/021

FOREIGN PATENT DOCUMENTS

WO 2018/116981 A1 6/2018
WO 2019/225450 A1 11/2019

OTHER PUBLICATIONS

Invitation to Pay Additional Fees and, Where Applicable, Protest Fee; PCT/US2021/060752; mailed on Mar. 23, 2022, 11 pages; European Patent Office.
ASTM D1003 "Standard Test Method for Haze and Luminous Transmittance of Transparent Plastics" using Illuminant C.
ASTM standard C770-16, entitled "Standard Test Method for Measurement of Glass Stress-Optical Coefficient".

* cited by examiner

TEXTURED GLASS-BASED ARTICLES WITH MULTIPLE HAZE LEVELS AND PROCESSES OF PRODUCING THE SAME

This application claims the benefit of priority of U.S. Provisional Application Ser. No. 63/281,817 filed on Nov. 22, 2021 and U.S. Provisional Application Ser. No. 63/119,046 filed on Nov. 30, 2020, the content of each of which are relied upon and incorporated herein by reference in its entirety.

BACKGROUND

Field

The present specification generally relates to textured glass-based articles. More specifically, the textured glass-based articles have multiple haze levels.

Technical Background

Portable electronic devices, such as, smartphones, tablets, and wearable devices (such as, for example, watches and fitness trackers) continue to get smaller and more complex. As such, materials that are conventionally used on at least one external surface of such portable electronic devices also continue to get more complex. For instance, as portable electronic devices get smaller and thinner to meet consumer demand, the display covers and housings used in these portable electronic devices serve multiple functions and cover multiple components, such as a display, cameras, and sensors, each of which may require different surface properties for optimum functionality.

Accordingly, a need exists for materials with areas of different surface properties and methods for manufacturing such materials.

SUMMARY

According to an aspect (1), a method is provided. The method comprises: texturing a surface of a glass-based substrate to produce a textured glass-based substrate having a first thickness $t_1$, a first surface roughness Rai, and a first haze $H_1$; and polishing a region of the surface of the textured glass-based substrate to produce a glass-based article with a surface comprising a polished region with a second thickness $t_2$, a second surface roughness $R_{a2}$, and a second haze $H_2$, wherein $R_{a1}>R_{a2}$, $H_1>H_2$, $t_1>t_2$, and the glass-based article comprises a region having $t_1$, $R_{a1}$, and $H_1$.

According to aspect (2), the method of aspect (1) is provided, wherein the texturing removes from greater than or equal to 5 µm to less than or equal to 50 µm from the surface of the glass-based substrate.

According to aspect (3), the method of any of aspect (1) to the preceding aspect is provided, wherein the texturing comprises etching the surface of the glass-based substrate with an etchant.

According to aspect (4), the method of aspect (3) is provided, wherein the etchant comprises an alkali hydroxide.

According to aspect (5), the method of aspect (3) is provided, wherein the etchant comprises hydrofluoric acid.

According to aspect (6), the method of any of aspect (1) to the preceding aspect is provided, wherein the texturing comprises mechanically lapping the surface of the glass-based substrate.

According to aspect (7), the method of aspect (6) is provided, wherein the mechanical lapping employs a slurry comprising particles with a size from greater than or equal to 5 µm to less than or equal to 22 µm, wherein the particles comprise at least one of $Al_2O_3$ and $CeO_2$.

According to aspect (8), the method of aspect (6) is provided, wherein the mechanical lapping employs a pad comprising diamond particles with a size from greater than or equal to 9 µm to less than or equal to 20 µm.

According to aspect (9), the method of any of aspect (1) to the preceding aspect is provided, wherein the polishing employs a cerium oxide impregnated polishing tool.

According to aspect (10), the method of any of aspect (1) to the preceding aspect is provided, wherein the polishing comprises controlling the pressure applied to the glass-based substrate by a polishing tool.

According to aspect (11), the method of any of aspect (1) to the preceding aspect is provided, wherein $t_1-t_2 \leq 2$ µm.

According to aspect (12), the method of any of aspect (1) to the preceding aspect is provided, wherein $R_{a1}$ is greater than or equal to 300 nm.

According to aspect (13), the method of any of aspect (1) to the preceding aspect is provided, wherein $H_1$ is greater than or equal to 30% to less than or equal to 100%.

According to aspect (14), the method of any of aspect (1) to the preceding aspect is provided, wherein $R_{a2}$ is greater than or equal to 0.2 nm to less than or equal to 10 nm.

According to aspect (15), the method of any of aspect (1) to the preceding aspect is provided, wherein $H_2$ is less than or equal to 0.2%.

According to aspect (16), the method of any of aspect (1) to the preceding aspect is provided, further comprising: polishing an additional region of the surface of the textured glass-based substrate to produce a glass-based article comprising an additional region with a third thickness $t_3$, a third surface roughness $R_{a3}$, and a third haze $H_3$, wherein $R_{a1}>R_{a3}>R_{a2}$, $H_1>H_3>H_2$, and $t_1>t_3>t_2$.

According to aspect (17), the method of aspect (16) is provided, wherein $R_{a3}$ is greater than or equal to 10 nm to less than or equal to 300 nm.

According to aspect (18), the method of any of aspect (16) to the preceding aspect is provided, wherein $H_3$ is greater than or equal to 3% to less than or equal to 30%.

According to aspect (19), the method of any of aspect (1) to the preceding aspect is provided, further comprising contacting the glass-based article with a molten salt bath to produce an ion exchanged glass-based article, wherein the ion exchanged glass-based article comprises a compressive stress of greater than or equal to 200 MPa and a depth of compression of greater than or equal to 10 µm.

According to aspect (20), the method of any of aspect (1) to the preceding aspect is provided, wherein a transition from the region with the thickness $t_1$ to the region with the thickness $t_2$ comprises a surface that is not perpendicular to a surface plane of the glass-based article.

According to aspect (21), the method of any of aspect (1) to the preceding aspect is provided, wherein the method does not utilize a mask.

According to aspect (22), a glass-based article is provided. The glass-based article, comprises: a first surface region with a first thickness $t_1$, a first surface roughness $R_{a1}$, and a first haze $H_1$; and a second surface region having a second thickness $t_2$, a second surface roughness $R_{a2}$, and a second haze $H_2$, wherein $R_{a1}>R_{a2}$, $H_1>H_2$, and $t_1>t_2$.

According to aspect (23), the glass-based article of aspect (22) is provided, wherein 0.5 µm $\leq t_1-t_2 \leq 5$ mm.

According to aspect (24), the glass-based article of any of aspect (22) to the preceding aspect is provided, wherein $t_1-t_2 \leq 2$ μm.

According to aspect (25), the glass-based article of any of aspect (22) to the preceding aspect is provided, wherein $R_{a1}$ is greater than or equal to 300 nm.

According to aspect (26), the glass-based article of any of aspect (22) to the preceding aspect is provided, wherein $H_1$ is greater than or equal to 30% to less than or equal to 100%.

According to aspect (27), the glass-based article of any of aspect (22) to the preceding aspect is provided, wherein $R_{a2}$ is greater than or equal to 0.2 nm to less than or equal to 10 nm.

According to aspect (28), the glass-based article of any of aspect (22) to the preceding aspect is provided, wherein $H_2$ is less than or equal to 0.2%.

According to aspect (29), the glass-based article of any of aspect (22) to the preceding aspect is provided, wherein a transition from the first surface region to the second surface region comprises a surface that is not perpendicular to a surface plane of the glass-based article.

According to aspect (30), the glass-based article of any of aspect (22) to the preceding aspect is provided, further comprising: a third surface region having a third thickness $t_3$, a third surface roughness $R_{a3}$, and a third haze $H_3$, wherein $R_{a1} > R_{a3} > R_{a2}$, $H_1 > H_3 > H_2$, and $t_1 > t_3 > t_2$.

According to aspect (31), the glass-based article of aspect (30) is provided, wherein $R_{a3}$ is greater than or equal to 10 nm to less than or equal to 300 nm.

According to aspect (32), the glass-based article of any of aspect (30) to the preceding aspect is provided, wherein $H_3$ is greater than or equal to 3% to less than or equal to 30%.

According to aspect (33), the glass-based article of any of aspect (22) to the preceding aspect is provided, wherein the second surface region has a diameter greater than or equal to 1 mm to less than or equal to 20 mm.

According to aspect (34), the glass-based article of any of aspect (22) to the preceding aspect is provided, wherein the glass-based article comprises a transition region, the transition region being characterized by the transition between the region with the thickness $t_1$ to the second surface region with the thickness $t_2$.

According to aspect (35), the glass-based article of aspect (34) is provided, wherein the transition region has a width greater than or equal to 0.1 mm to less than or equal to 8 mm.

According to aspect (36), the glass-based article of aspect (34) is provided, wherein the transition region comprises a surface that is not perpendicular to a surface plane of the glass-based article.

According to aspect (37), the glass-based article of any of aspect (22) to the preceding aspect is provided, wherein the second surface region comprises a flat region with a diameter greater than or equal to 0.1 mm to less than or equal to 19.8 mm.

According to aspect (38), the glass-based article of aspect (37) is provided, wherein the flat region has a peak-to-valley value greater than or equal to 0.2 nm to less than or equal to 600 nm.

According to aspect (39), the glass-based article of any of aspect (37) to the preceding aspect is provided, wherein the flat region has a second surface roughness $R_{a2}$ greater than or equal to 0.2 nm to less than or equal to 20 nm.

According to aspect (40), the glass-based article of any of aspect (37) to the preceding aspect is provided, wherein the flat region has a second surface roughness $R_{a2}$ and a second haze $H_2$ greater than or equal to 0.0001% to less than or equal to 0.2%.

According to aspect (41), the glass-based article of any of aspect (37) to the preceding aspect is provided, wherein the flat region has a modulation transfer function degradation greater than or equal to 0% to less than or equal to 0.1%.

According to aspect (42), the glass-based article of any of aspect (22) to the preceding aspect is provided, further comprising a compressive stress of greater than or equal to 200 MPa and a depth of compression of greater than or equal to 10 μm.

According to aspect (43), a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover substrate disposed over the display, wherein at least a portion of at least one of the housing and the cover substrate comprises the glass-based article of any of aspect (22) to the preceding aspect.

According to aspect (44), a method is provided. The method comprises: polishing a region of a surface of a glass-based substrate with a rotary polishing tool to produce a glass-based article with a surface comprising a polished region, wherein: the pressure applied to the glass-based substrate by the rotary polishing tool is controlled to be in the range greater than or equal to 1 psi to less than or equal to 15 psi, the rotary polishing tool comprises an abrasive component embedded in a binder, the glass-based substrate has a first thickness $t_1$, the polished region of the glass-based article has a second thickness $t_2$, the glass-based article comprises a region having a thickness $t_1$, and $t_1 > t_2$.

According to aspect (45), the method of aspect (44) is provided, wherein the glass-based substrate has a textured surface having a first surface roughness $R_{a1}$ and a first haze $H_1$; the polished region has a second surface roughness $R_{a2}$ and a second haze $H_2$; $R_{a1} > R_{a2}$; and $H_1 > H_2$.

According to aspect (46), the method of any of aspect (44) to the preceding aspect is provided, wherein the rotary polishing tool operates at a rotational speed greater than or equal to 500 rpm to less than or equal to 60,000 rpm.

According to aspect (47), the method of any of aspect (44) to the preceding aspect is provided, wherein the rotary polishing tool operates at a rotational speed greater than or equal to 500 rpm to less than or equal to 35,000 rpm.

According to aspect (48), the method of any of aspect (44) to the preceding aspect is provided, wherein the rotary polishing tool operates at a rotational speed greater than or equal to 500 rpm to less than or equal to 20,000 rpm.

According to aspect (49), the method of any of aspect (44) to the preceding aspect is provided, wherein the rotary polishing tool operates at a rotational speed greater than or equal to 500 rpm to less than or equal to 4,000 rpm.

According to aspect (50), the method of any of aspect (44) to the preceding aspect is provided, wherein a rotation axis of the rotary polishing tool is orthogonal to the surface of the glass-based substrate.

According to aspect (51), the method of any of aspect (44) to the preceding aspect is provided, wherein the rotary polishing tool has a diameter that is less than or equal half of a diameter of the polished region.

According to aspect (52), the method of any of aspect (44) to the preceding aspect is provided, wherein the rotary polishing tool has a diameter greater than or equal to 0.1 mm to less than or equal to 8 mm.

According to aspect (53), the method of any of aspect (44) to the preceding aspect is provided, wherein the rotary polishing tool comprises a notch on a polishing surface.

According to aspect (54), the method of aspect (53) is provided, wherein the notch has a length equal to a diameter of the rotary polishing tool.

According to aspect (55), the method of aspect (53) to the preceding aspect is provided, wherein the notch has a width greater than or equal to 0.1 mm to less than or equal to 4 mm.

According to aspect (56), the method of aspect (53) to the preceding aspect is provided, wherein the notch has a depth greater than or equal to 0.001 mm to less than or equal to 5 mm.

According to aspect (57), the method of any of aspect (44) to the preceding aspect is provided, wherein the rotary polishing tool comprises an abrasive component and a binder, wherein the abrasive component is embedded in the binder.

According to aspect (58), the method of aspect (57) is provided, wherein the abrasive component comprises silica, cerium oxide, manganese oxide, alumina, zinc oxide, magnesium oxide, ferric oxide, silicon carbide, diamond, zirconia, or silicon nitride.

According to aspect (59), the method of any of aspect (57) to the preceding aspect is provided, wherein the abrasive component comprises $CeO_2$.

According to aspect (60), the method of any of aspect (57) to the preceding aspect is provided, wherein the abrasive component has a D50 particle size greater than or equal to 1 µm to less than or equal to 3 µm.

According to aspect (61), the method of any of aspect (57) to the preceding aspect is provided, wherein the binder comprises a polymer.

According to aspect (62), the method of any of aspect (57) to the preceding aspect is provided, wherein the binder comprises a polyurethane, a polyacrylate, a polymethacrylate, or a polyphenol.

According to aspect (63), the method of any of aspect (44) to the preceding aspect is provided, wherein the pressure applied to the glass-based substrate by the rotary polishing tool is controlled to be in the range greater than or equal to 1 psi to less than or equal to 4 psi.

According to aspect (64), the method of any of aspect (44) to aspect (62) is provided, wherein the pressure applied to the glass-based substrate by the rotary polishing tool is controlled to be in the range greater than or equal to 2 psi to less than or equal to 5 psi.

According to aspect (65), the method of any of aspect (44) to the preceding aspect is provided, wherein the rotary polishing tool is moved at a feed rate greater than or equal to 500 mm/min to less than or equal to 2000 mm/min.

According to aspect (66), the method of any of aspect (44) to the preceding aspect is provided, wherein $0.5 \ \mu m \leq t_1 - t_2 \leq 5$ mm.

According to aspect (67), the method of any of aspect (44) to the preceding aspect is provided, wherein $0.5 \ \mu m \leq t_1 - t_2 \leq 50 \ \mu m$.

According to aspect (68), the method of any of aspect (44) to the preceding aspect is provided, wherein $1 \ \mu m \leq t_1 - t_2 \leq 50 \ \mu m$.

According to aspect (69), the method of any of aspect (44) to the preceding aspect is provided, wherein $5 \ \mu m \leq t_1 - t_2 \leq 50 \ \mu m$.

According to aspect (70), the method of any of aspect (44) to the preceding aspect is provided, wherein the polished region has a diameter greater than or equal to 1 mm to less than or equal to 20 mm.

According to aspect (71), the method of any of aspect (44) to the preceding aspect is provided, wherein the glass-based article comprises a transition region, the transition region being characterized by the transition between the region with the thickness $t_1$ to the polished region with the thickness $t_2$.

According to aspect (72), the method of aspect (71) is provided, wherein the transition region has a width greater than or equal to 0.1 mm to less than or equal to 8 mm.

According to aspect (73), the method of any of aspect (71) to the preceding aspect is provided, wherein the transition region comprises a surface that is not perpendicular to a surface plane of the glass-based article.

According to aspect (74), the method of any of aspect (44) to the preceding aspect is provided, wherein the polished region comprises a flat region with a diameter greater than or equal to 0.1 mm to less than or equal to 19.8 mm.

According to aspect (75), the method of aspect (74) is provided, wherein the flat region has a peak-to-valley value greater than or equal to 0.2 nm to less than or equal to 600 nm.

According to aspect (76), the method of any of aspect (74) to the preceding aspect is provided, wherein the flat region has a second surface roughness $R_{a2}$ greater than or equal to 0.2 nm to less than or equal to 20 nm.

According to aspect (77), the method of any of aspect (74) to the preceding aspect is provided, wherein the flat region has a second surface roughness $R_{a2}$ and a second haze $H_2$ greater than or equal to 0.0001% to less than or equal to 0.2%.

According to aspect (78), the method of any of aspect (74) to the preceding aspect is provided, wherein the flat region has a modulation transfer function degradation greater than or equal to 0% to less than or equal to 0.1%.

According to aspect (79), the method of any of aspect (44) to the preceding aspect is provided, wherein the polishing utilizes water or a water-based coolant.

According to aspect (80), the method of any of aspect (44) to the preceding aspect is provided, further comprising dressing the rotary polishing tool with a silicon carbide disk prior to the polishing.

According to aspect (81), the method of any of aspect (44) to the preceding aspect is provided, wherein polishing comprises moving the rotary polishing tool over the surface of the glass-based substrate in a spiral pattern.

According to aspect (82), the method of any of aspect (44) to the preceding aspect is provided, wherein polishing comprises moving the rotary polishing tool over the surface of the glass-based substrate in a trochoidal pattern.

According to aspect (83), the method of any of aspect (44) to aspect (80) is provided, wherein the rotary polishing tool is moved in a zig-zag pattern during the polishing.

According to aspect (84), the method of any of aspect (44) to the preceding aspect is provided, wherein the rotary polishing tool is moved in a pattern with a step over size greater than or equal to 2% to less than or equal to 6% of a diameter of the rotary polishing tool.

According to aspect (85), the method of any of aspect (44) to the preceding aspect is provided, further comprising texturing a surface of the glass-based substrate prior to the polishing, wherein the texturing produces a first surface roughness $R_{a1}$ and a first haze $H_1$.

According to aspect (86), the method of aspect (85) is provided, wherein $R_{a1}$ is greater than or equal to 300 nm.

According to aspect (87), the method of any of aspect (85) to the preceding aspect is provided, wherein $H_1$ is greater than or equal to 30% to less than or equal to 100%.

According to aspect (88), the method of any of aspect (85) to the preceding aspect is provided, wherein the texturing removes from greater than or equal to 5 μm to less than or equal to 50 μm from the surface of the glass-based substrate.

According to aspect (89), the method of any of aspect (85) to the preceding aspect is provided, wherein the texturing comprises etching the surface of the glass-based substrate with an etchant.

According to aspect (90), the method of any of aspect (44) to the preceding aspect is provided, further comprising contacting the glass-based article with a molten salt bath to produce an ion exchanged glass-based article, wherein the ion exchanged glass-based article comprises a compressive stress of greater than or equal to 200 MPa and a depth of compression of greater than or equal to 10 μm.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, serve to explain the principles and operations of the claimed subject matter.

DETAILED DESCRIPTION

Figure 1A:
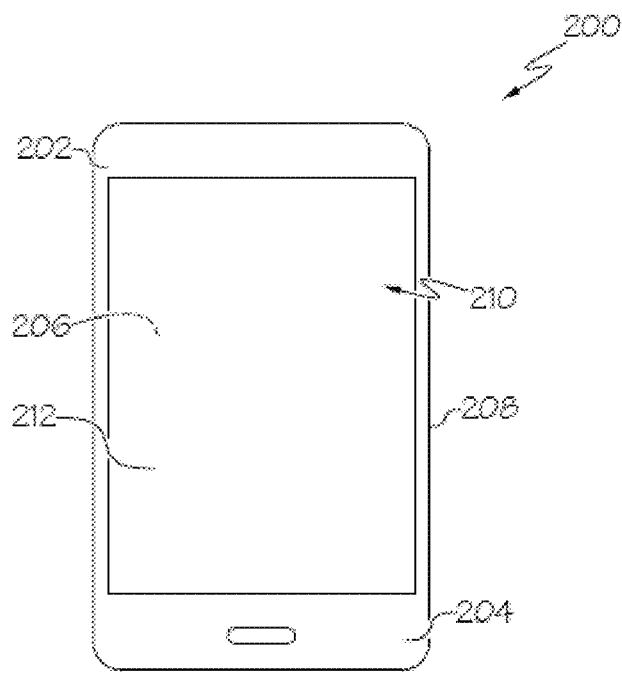
FIG. 1A is a plan view of an exemplary electronic device incorporating any of the glass-based articles disclosed herein.

Reference will now be made in detail to textured glass-based articles according to various embodiments. In particular, the textured glass-based articles include multiple haze regions. Therefore, the textured glass-based articles are suited for use as display covers and housings in portable electronic devices.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. Whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Unless otherwise specified, all compositions of the glasses described herein are expressed in terms of mole percent (mol %), and the constituents are provided on an oxide basis. Unless otherwise specified, all temperatures are expressed in terms of degrees Celsius (° C.). All ranges disclosed in this specification include any and all ranges and subranges encompassed by the broadly disclosed ranges whether or not explicitly stated before or after a range is disclosed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. As utilized herein, when the term "about" is used to modify a value, the exact value is also disclosed.

The textured articles described herein are glass-based. As utilized herein, the term "glass-based" refers to any article that includes glass, such as a glass or glass-ceramic material. For example, a glass-based article may be a laminated material where at least one laminate layer includes a glass or glass-ceramic.

Figure 1B:
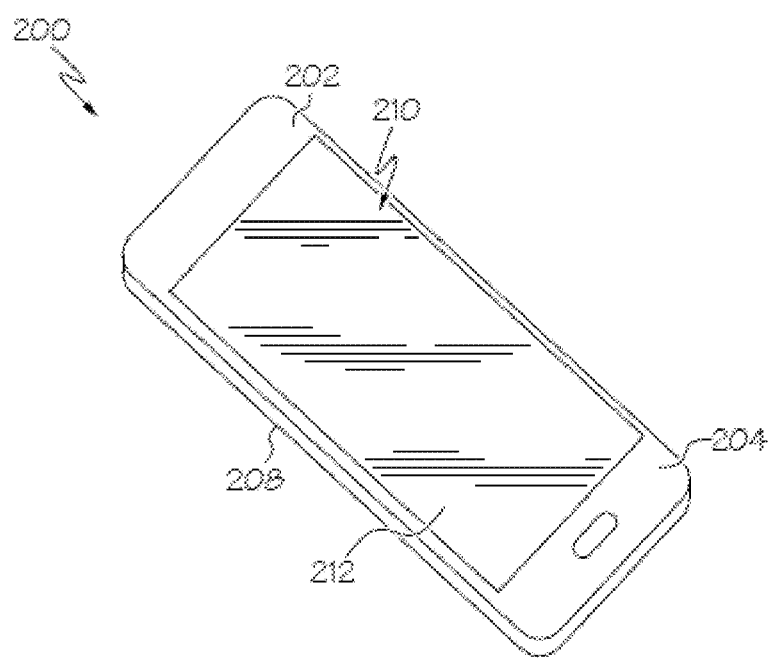
FIG. 1B is a perspective view of the exemplary electronic device of FIG. 2A.

The textured glass-based articles disclosed herein, in as-formed or ion exchanged form, may be incorporated into another article such as an article with a display (or display articles) (e.g., consumer electronics, including mobile phones, tablets, computers, navigation systems, and the like), architectural articles, transportation articles (e.g., automobiles, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 1A and 1B. Specifically, FIGS. 1A and 1B show a consumer electronic device 200 including a housing 202 having front 204, back 206, and side surfaces 208; electrical components (not shown) that are at least partially inside or entirely within the housing and including at least a controller, a memory, and a display 210 at or adjacent to the front surface of the housing; and a cover substrate 212 at or over the front surface of the housing such that it is over the display. In embodiments, at least a portion of at least one of the cover substrate 212 and/or the housing 202 may include any of the glass-based articles disclosed herein.

As described above, the textured glass-based articles described herein can be used as a front or back cover for mobile electronic devices. The glass-based articles not only serve as protective covers but also serve to enable various functionalities of the mobile electronic devices. For example, the textured glass-based articles may possess desirable antiglare properties which improve display readability in the presence of strong ambient light conditions and may also improve the touch-feel response which is appreciated by users. The textured surface of the glass-based articles may also better conceal fingerprints and provide an anti-slip function.

Figure 2A:
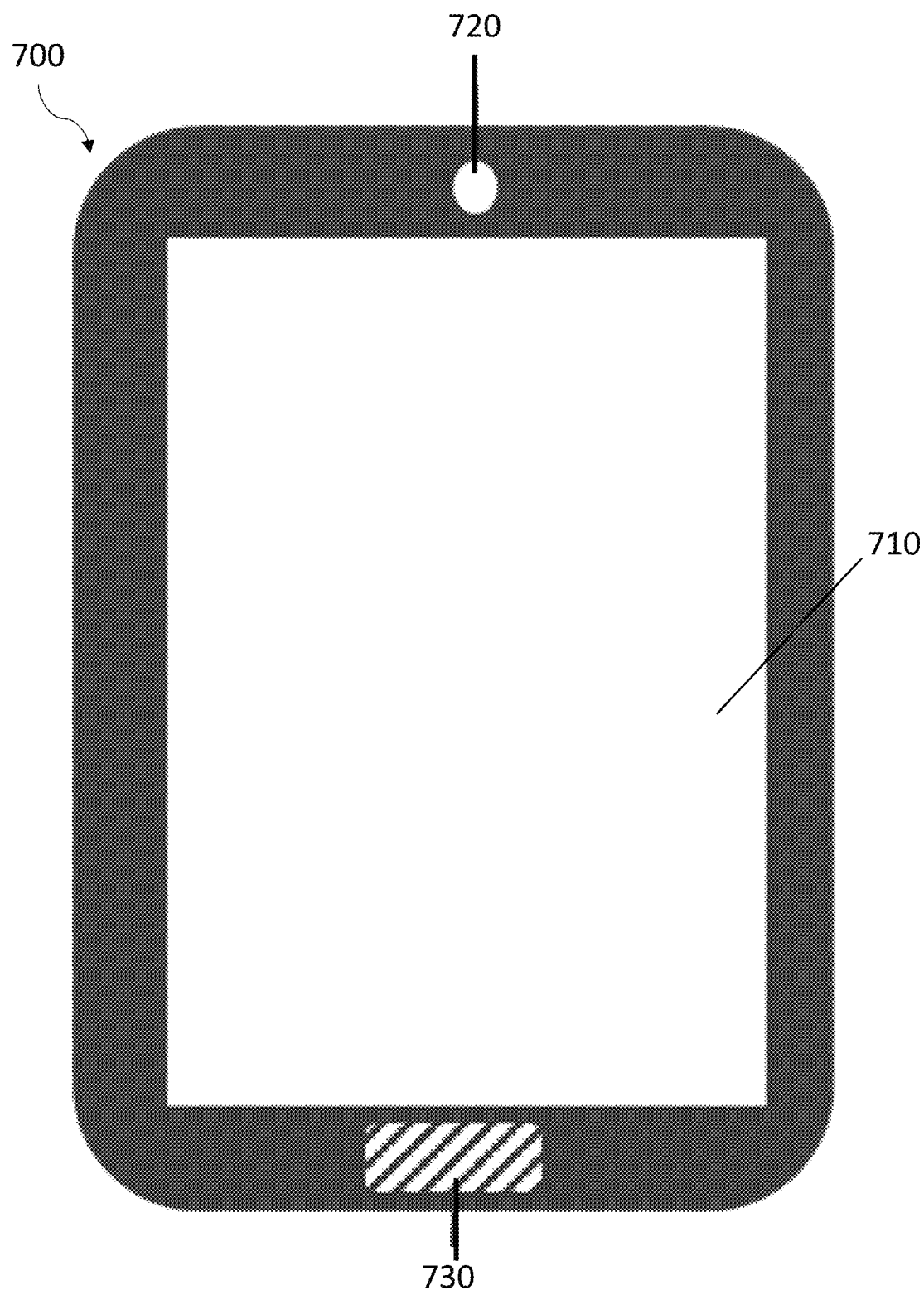
FIG. 2A is a schematic top-down view of a textured glass-based article according to an embodiment.
Figure 2B:
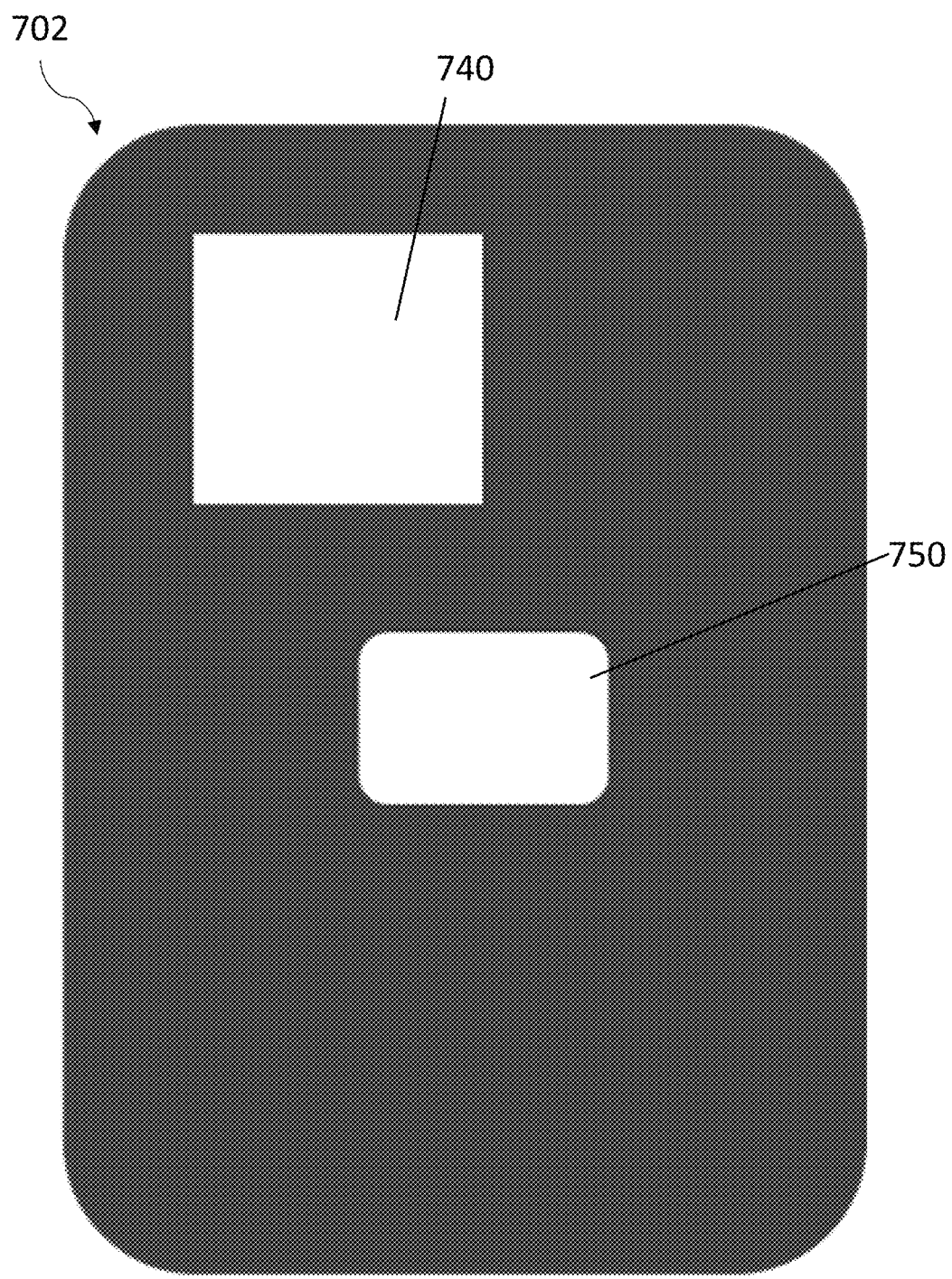
FIG. 2B is a schematic bottom-up view of a textured glass-based article according to an embodiment.

A textured glass-based article for use in a mobile electronic device may have multiple functional areas, such as a display area, a camera area, a fingerprint sensor area, a decorative area, and a logo area. FIG. 2A shows a top-down view of a glass-based article 700 that serves as a cover substrate for a mobile electronic device and includes a display region 710, a fingerprint sensor region 730, and a camera region 720. FIG. 2B shows a bottom-up view of a glass-based article 702 that serves as a back cover for a housing of a mobile electronic device and includes a logo region 750 and a camera region 740. Each area may possess different surface properties to best serve the particular functionality need. For example, the display may require less than or equal to 10% transmittance haze to reduce glare. The camera area may require substantially no haze to enable clear image capture. The logo area may require a high gloss surface for a pleasing aesthetic appearance. The fingerprint sensor area may require a distinct touch feel to allow a user to register the area without looking at the location and a surface morphology that does not interfere with the sensor function. These function areas may beneficially be integrated as part of a single glass-based article. Stated differently, a single glass-based article may need to include areas with different haze levels, different roughness or touch feel, and different visual appearance or optical properties.

Figure 3:
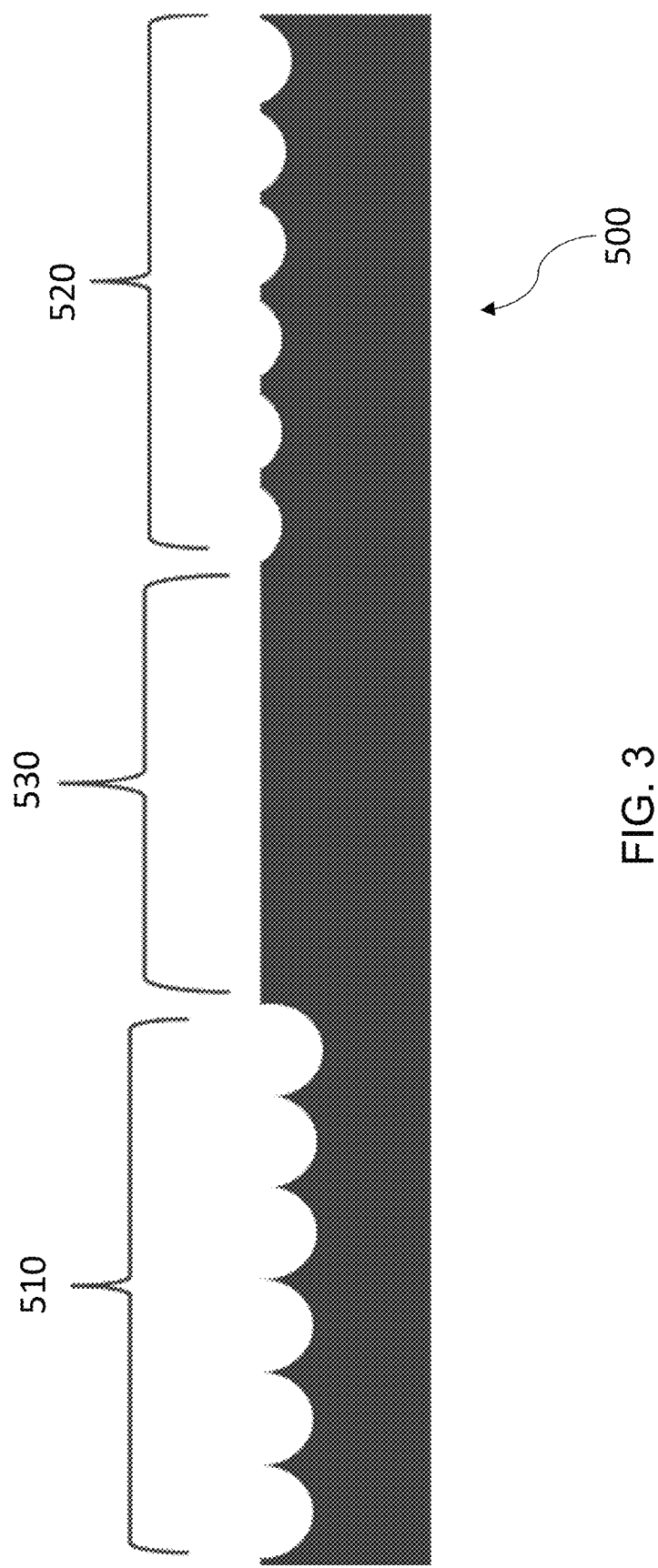
FIG. 3 is a cross-sectional view of a textured glass-based article including multiple surface roughness regions.

FIG. 3 shows a cross-section of a textured glass-based article 500 containing multiple haze and roughness levels. The textured glass-based article 500 includes a high roughness region 510, an intermediate roughness region 520, and a low roughness region 530.

Textured glass-based articles may be produced utilizing a variety of processes, such as wet chemical etching techniques and abrasion combined etching techniques. Standard techniques are well suited for producing glass-based articles with a uniform textured surface. The processes disclosed herein produce a textured glass-based article including areas with different functions and surface properties. These processes are more cost efficient than existing methods. In addition, the textured glass-based articles produced by this process also have unique surface characteristics that provide benefits when utilized in mobile electronic devices.

The processes disclosed herein include a texturing process (e.g. wet etching, abrade and etch, or mechanical lapping) applied to the surface of a glass-based substrate to form a textured glass-based substrate. The glass-based substrate is then locally polished to create a glass-based article with an area having a different haze and surface roughness than the remainder of the glass-based article.

Figure 4:
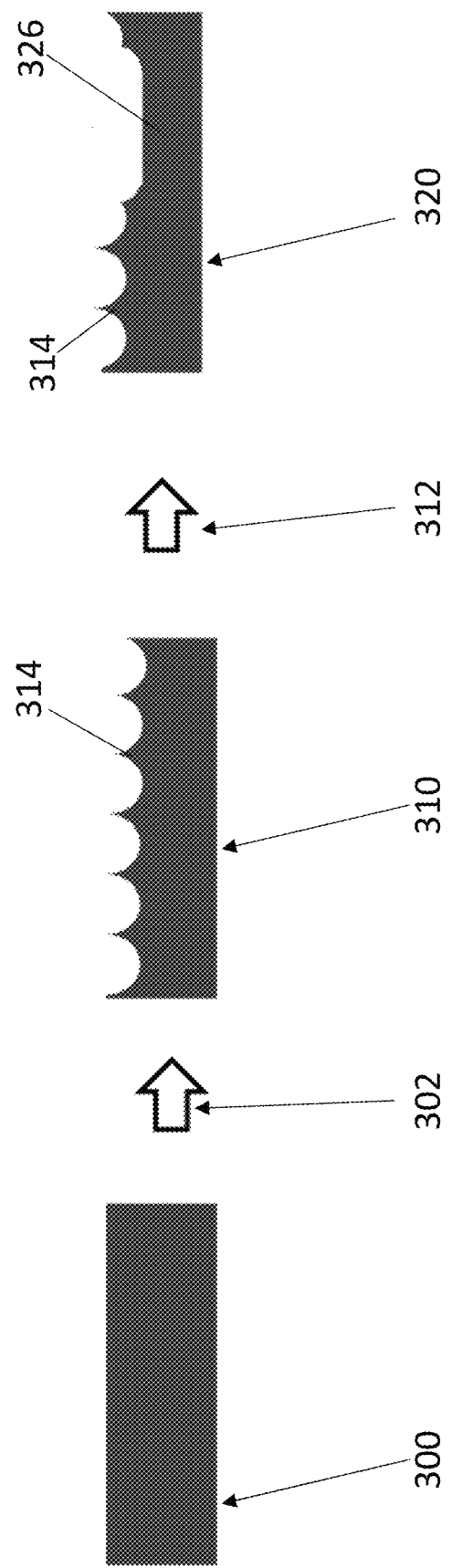
FIG. 4 is a flow diagram illustrating the cross-section of a surface throughout the production of textured glass-based articles according to an embodiment.

FIG. 4 is a flow diagram illustrating the processes disclosed herein. A glass-based substrate 300 is subjected to a texturing process 302 to produce a textured glass-based substrate 310 with a surface texture 314. The textured glass-based substrate 310 is then subjected to a local polishing process 312 to produce a glass-based article 320 including a region with a polished surface region 326 and a region with surface texture 314. As shown in FIG. 4, the polished surface region 326 has a height (as may be characterized by the thickness) that is less than the height of the region with surface texture 314.

Figure 5:
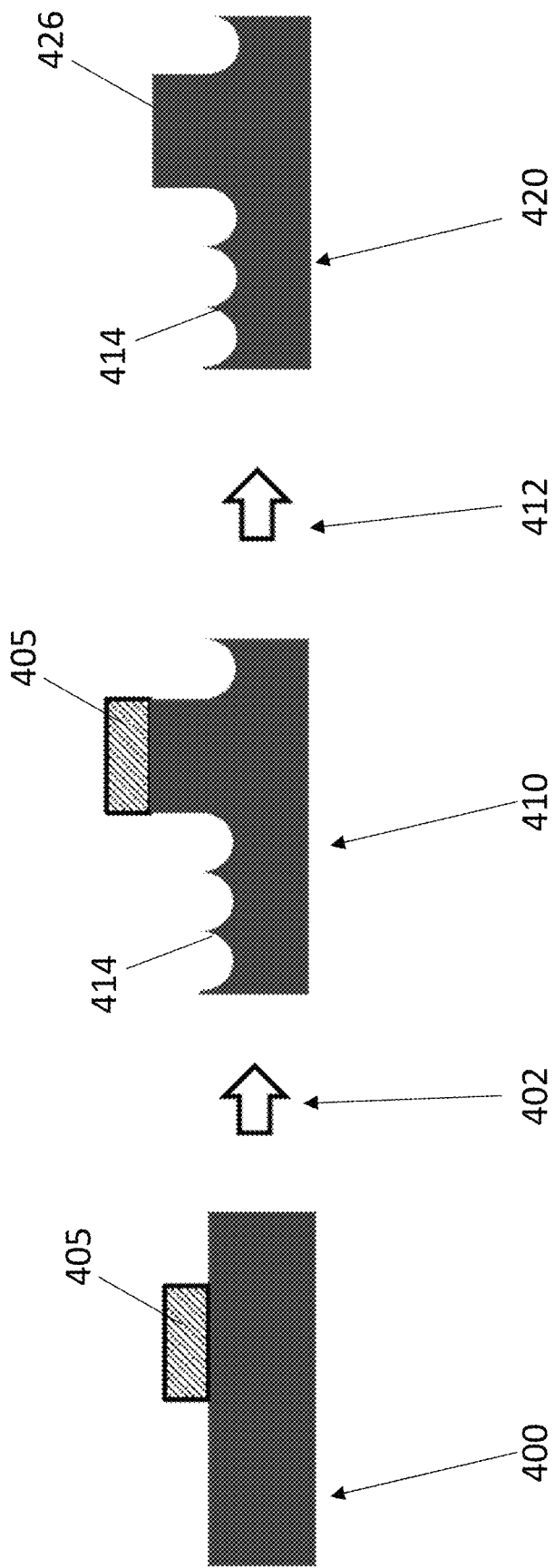
FIG. 5 is a flow diagram illustrating the cross-section of a surface throughout the production of textured glass-based articles in a mask and etch process.

For the sake of comparison, FIG. 5 is a flow diagram illustrating existing mask and etch processes for producing textured glass-based articles. A mask 405 is disposed on the surface of a glass-based substrate 400, and then the glass-based substrate is subjected to a texturing process 402 to produce a textured glass-based substrate 410 with a surface texture 414. The textured glass-based substrate 410 is then subjected to a mask removal process 412 to expose a non-textured surface region 426 on the glass-based article 420. The glass-based article includes the non-textured surface region 426 and a region with surface texture 414. As shown in FIG. 5, the non-textured surface region 426 has a height (as may be characterized by the thickness) that is greater than the height of the region with surface texture 414 and the transition from the non-textured surface region 426 to region with surface texture 414 is a step-transition.

Figure 6:
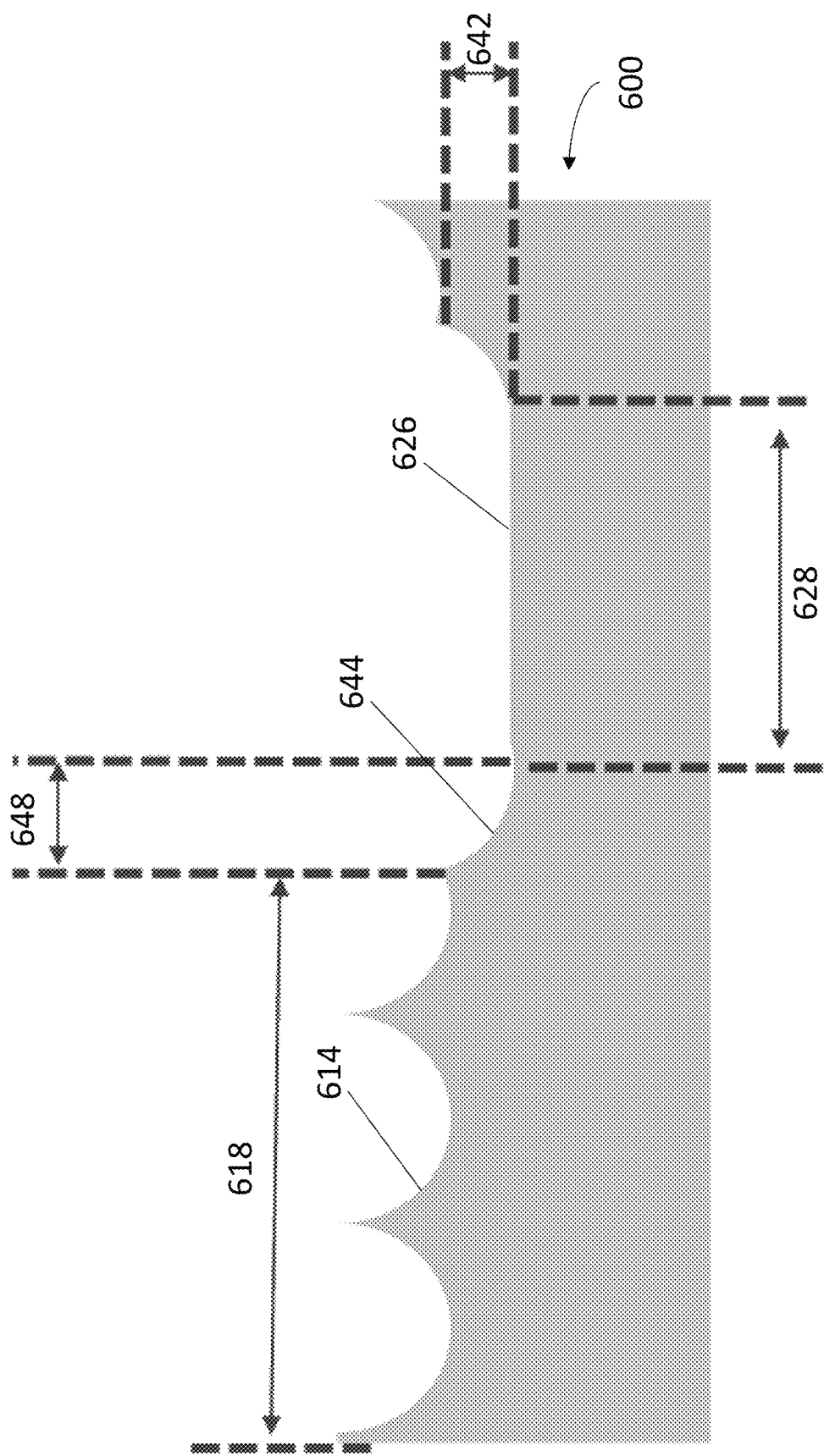
FIG. 6 is a schematic cross-sectional view of a textured glass-based article according to an embodiment.

The processes disclosed herein produce textured glass-based articles with a unique surface structure. As described above with reference to FIG. 4, the thickness of the region produced by local polishing is less than the thickness of the textured surface region, and the thickness difference may be less than 2 µm. In addition, the transition zone between the two areas with different surface textures is characterized by a smooth and gradual slope. These characteristics combine to make the transition smoother and less noticeable when a device is in use, such as when finger touching or swiping. FIG. 6 illustrates the relationship between the textured surface region 618 having a textured surface 614, the polished surface region 628 having a polished surface 626, and the transition region 648 having a transition surface 644 for a glass-based article 600 of the type described herein. As shown in FIG. 6, the transition surface 644 has a gradual slope, as opposed to the step-type transition produced by mask and etch processes. Additionally, the textured surface region 618 has a thickness that is greater than the polished surface region 628, as characterized by a height difference 642.

The processes for producing the textured glass-based articles will now be described in detail. The processes include a texturing step and a polishing step. The texturing step produces a texture on a surface of a glass-based substrate to produce a textured glass-based substrate having a first thickness $t_1$, a first surface roughness $R_{a1}$, and a first haze $H_1$. The polishing step is applied to a region of the textured glass-based substrate to a produce a glass-based article comprising a polished region with a second thickness $t_2$, a second surface roughness $R_{a2}$, and a second haze $H_2$. The polished region does not encompass the entirety of the surface of the glass-based article, such that the glass-based article includes a region characterized by $t_1$, $R_{a1}$, and $H_1$ in addition to the polished region. The characteristics of the textured glass-based articles produced by the methods described herein may be any of those detailed below with respect to the textured glass-based articles.

The texturing step may include any texturing process capable of producing the desired surface texture. In embodiments, the texturing may include at least one of etching, abrading and etching, and mechanically lapping and etching the surface of the glass-based substrate. The texturing may be applied to the entirety of the surface of the glass-based substrate, producing a textured glass-based substrate with a substantially uniform surface texture. In embodiments, the texturing does not employ a mask on the surface of the glass-based substrate. Alternatively, the texturing may be applied to a portion of the surface of the glass-based substrate, such that after the texturing the glass-based substrate includes at least one non-textured surface region. Where the texturing is conducted on only a portion of the surface of the glass-based substrate is performed a mask may be utilized on the surface of the glass-based substrate during the texturing.

In embodiments, the texturing includes etching the surface of the glass-based substrate with an etchant. The etchant is selected to remove the desired amount of the surface of the glass-based substrate and produce the desired surface texture and may be selected from the etchants commonly utilized to texture the surface of glass-based substrate. In embodiments, the etchant may include an alkali hydroxide or hydrofluoric acid. In embodiments, the etchant is substantially free or free of hydrofluoric acid. In embodiments, the etchant includes sodium hydroxide, such as an aqueous solution of sodium hydroxide.

In embodiments, the texturing includes abrading the surface of the glass-based substrate and then etching the abraded surface with an etchant. In embodiments, the abrading includes media blasting, which may be commonly referred to as sand blasting, the surface of the glass-based substrate to introduce flaws. The etchant applied to the abraded surface may be selected as described above.

In embodiments, the texturing includes mechanically lapping the surface of the glass-based substrate. The mechanical lapping may be performed utilizing a slurry including abrasive particles. The particles in the slurry may include at least one of $Al_2O_3$ and $CeO_2$. The particles may have a size from greater than or equal to 5 µm to less than or equal to 22 µm, such as greater than or equal to 6 µm to less than or equal to 21 µm, greater than or equal to 7 µm to less than or equal to 20 µm, greater than or equal to 8 µm to less than or equal to 19 µm, greater than or equal to 9 µm to less than or equal to 18 µm, greater than or equal to 10 µm to less than or equal to 17 µm, greater than or equal to 11 µm to less than or equal to 16 µm, greater than or equal to 12 µm to less than or equal to 15 µm, greater than or equal to 13 µm to less than or equal to 14 µm, and any and all sub-ranges formed from any of the foregoing endpoints. In embodiments, the mechanical lapping may employ a pad impregnated with abrasive particles. In addition to the particles that may be employed in the slurry, the abrasive particles impregnated in the pad may be diamond particles. The diamond particles may have a size from greater than or equal to 9 µm to less than or equal to 20 µm, such as greater than or equal to 10 µm to less than or equal to 19 µm, greater than or equal to 11 µm to less than or equal to 18 µm, greater than or equal to 12 µm to less than or equal to 17 µm, greater than or equal to 13 µm to less than or equal to 16 µm, greater than or equal to 14 µm to less than or equal to 15 µm, and any and all sub-ranges formed from any of the foregoing endpoints. In embodiments, the mechanical lapping utilizes a pad including diamond particles with a size from greater than or equal to 9 µm to less than or equal to 20 µm. The mechanically lapped glass-based substrate may be etched utilizing any of the etchants described herein.

The texturing step may be selected to remove any appropriate amount from the surface of the glass-based substrate. The texturing may remove greater than or equal to 5 µm to less than or equal to 50 µm, such as greater than or equal to 10 µm to less than or equal to 45 µm, greater than or equal to 15 µm to less than or equal to 40 µm, greater than or equal to 20 µm to less than or equal to 35 µm, greater than or equal to 25 µm to less than or equal to 30 µm, and any and all sub-ranges formed from any of the foregoing endpoints.

The polishing step may include any polishing process capable of producing the desired polished region surface texture. In embodiments, the polishing includes mechanically polishing the desired region of the textured glass-based substrate. The polishing removes the texture imparted to the surface of the glass-based substrate, resulting in a height of the polished region that is less than the height of the textured regions. The polishing processes described herein may also be applied to glass-based substrates that do not include a textured surface. In embodiments, the polishing utilizes a polishing tool impregnated with an abrasive, such as a $CeO_2$ impregnated polishing tool. The polishing may utilize a polishing machine that employs computer numerical control (CNC), such a polishing process allows precise control of the polished region and a relatively quick polishing time.

The polish tool may be operated on the basis of a desired pressure exerted on the textured glass-based substrate. In embodiments, a spring extension may be added to the polish tool to convert a CNC machine from distance control to pressure control, and other more expensive approaches to pressure control may also be utilized. The pressure control reduces the polishing process time, minimizes the polishing tool consumption and damage, and also achieves a high level of polish control. The polishing process can produce a $R_a$ surface roughness of less 10 nm and peak-to-valley distance of less than 100 nm and may be adjusted by selection of the polishing tool diameter, polishing tool binder medium, coolant type, polishing tool spindle speed, polishing pattern, and feed rate.

The polishing process utilizing a CNC machine can provide multiple benefits. Such machines are often utilized in glass processing, for purposes such as finishing cut edges of the glass or drill holes in the glass. As a result, utilizing a CNC machine to polish a portion of a glass-based substrate may not require the purchase of additional manufacturing equipment. However, polishing processes are primarily pressure-controlled while CNC machines typically operate in a distance-control regime. A CNC process generally provides the advantage of being a fast process, requiring limited cleaning of the processed part, and providing a near-net shape finish. Polishing processes provide optimized surface quality. A modified CNC process of the type described herein combine the benefits of a CNC process and a polishing process, which are especially suited to providing the polished windows, such as for cameras, described herein.

A CNC machine may be converted to perform a polishing process by altering the tool utilized in the machine. A first tool modification option is to utilize a polishing pad and an abrasive slurry. Such an approach requires additional cleaning of the polished article to remove the abrasive slurry residue. A second tool modification option is to utilize an abrasive-embedded polishing tool. Utilizing an abrasive-embedded tool extends the tool lifetime and allows easier conversion of the CNC machine to traditional milling purposes, by merely replacing the abrasive-embedded tool with a traditional milling tool. The use of a abrasive-embedded polishing tool is preferred for the performance of the polishing processes described herein as a result. The CNC machine is also beneficially modified to operate in a pressure-controlled mode or a pressure and distance-controlled mode as opposed to a simple distance-controlled mode. Aspects of the CNC polishing process including machine specifications, polishing tool properties and geometry, pressure-control system, coolant type, and process operation parameters (tool rotation speed, feed rate, and polishing pattern) all impact the properties of the polished article.

The rotary polishing tool applies a pressure to the glass-based substrate. In embodiments, the pressure applied to the glass-based substrate by the rotary polishing tool is greater than or equal to 1 psi to less than or equal to 15 psi, such as greater than or equal to 1 psi to less than or equal to 6 psi, greater than or equal to 1 psi to less than or equal to 4 psi, greater than or equal to 2 psi to less than or equal to 5 psi, greater than or equal to 3 psi to less than or equal to 4 psi, greater than or equal to 3 psi to less than or equal to 10 psi, greater than or equal to 2 psi to less than or equal to 12 psi, and any and all sub-ranges formed between any of the foregoing endpoints. The pressure applied to the glass-based substrate may be determined when the area of the rotary polishing tool in contact with the glass-based substrate and the force applied to the rotary polishing tool in the z-direction is known. To control the pressure applied to the glass-based substrate, the rotary polishing tool may be moved away from the glass-based substrate when the pressure is too high and towards the glass-based substrate when the pressure is insufficient.

CNC machines utilized in the polishing processes utilize rotary polishing tools and have a high degree of accuracy and repeatability. In embodiments, the CNC machine has a positional accuracy of less than or equal to 2 µm, and a positional repeatability in all directions (x-, y-, and z-direction) of less than or equal to 3 µm. The rotary polishing tool may operate at any rotational speed that produces the desired polishing effect. In embodiments, the rotation polishing tool rotates at a rotation speed greater than or equal to 500 rpm to less than or equal to 60,000 rpm, such as greater than or equal to 500 rpm to less than or equal to 35,000 rpm, greater than or equal to 500 rpm to less than or equal to 20,000 rpm, greater than or equal to 500 rpm to less than or equal to 4,000 rpm, and any and all sub-ranges formed between any of the foregoing endpoints. A higher rotational speed is generally selected when utilizing smaller rotary polishing tools.

The rotary polishing tool utilized in the polishing processes is an abrasive-embedded tool. The use of an abrasive-impregnated rotary polishing tool increases tool lifetime and allows easier conversion of the machine to other milling processes, as compared to a pad and loose abrasive or abrasive slurry approach. The rotary polishing tool includes an abrasive component and a binder, wherein the abrasive component is embedded in the binder. The abrasive component may include silica, cerium oxide, manganese oxide, alumina, zinc oxide, magnesium oxide, ferric oxide, silicon carbide, diamond, zirconia, or silicon nitride. In a preferred embodiment, the abrasive component includes $CeO_2$. The abrasive component may have any appropriate particle size. In preferred embodiments, the abrasive component has a D50 particle size greater than or equal to 1 µm to less than or equal to 3 µm. The binder may include a polymer. In a preferred embodiment, the binder includes a polyurethane, polyacrylate, a polymethacrylate, or a polyphenol. Generally, the rotary polishing tool is formed from a relatively hard, brittle, and porous material to minimize surface damager and provide repeatable performance and long tool life. The rotary polishing tool is also formed from materials that do not react chemically with the glass-based substrate.

Figure 8:
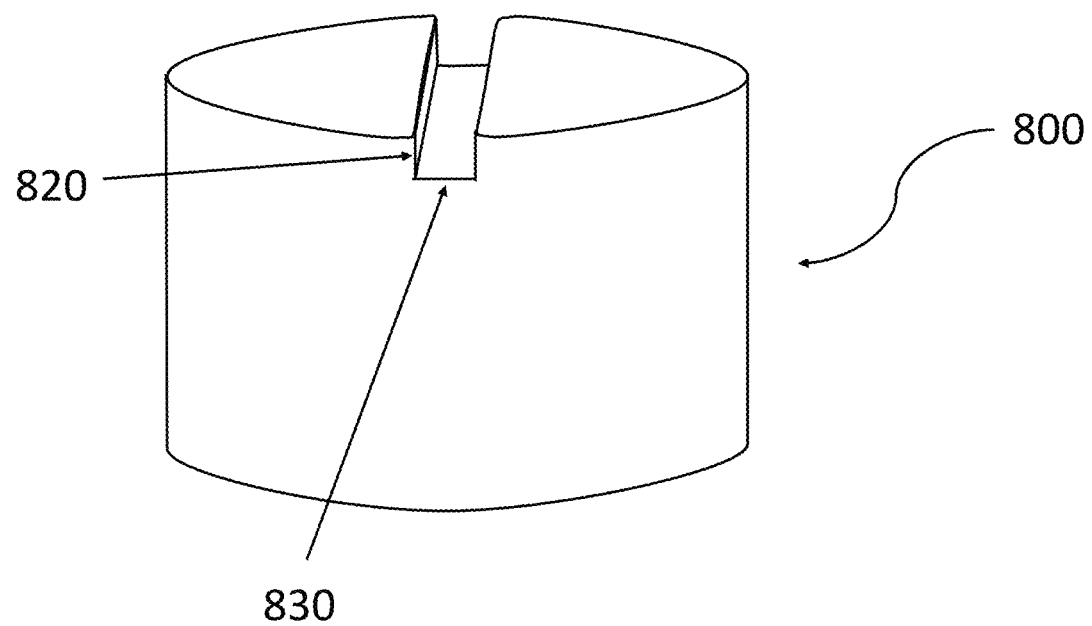
FIG. 8 is a view of a rotary polishing tool according to an embodiment.

The rotary polishing tool 800 has a cylindrical shape, as shown in FIG. 8. The diameter of the rotary polishing tool is selected based on the desired polished window size, with the tool diameter being less than or equal to half of the diameter of the desired polished region. In a preferred embodiment, the rotary polishing tool has a diameter greater than or equal to 0.1 mm to less than or equal to 8 mm. Generally, a rotary polishing tool with a smaller diameter produces a polished region with a more uniform surface and is less susceptible to tool burn, extending tool lifetime. However, rotary polishing tools with smaller diameters are more prone to deformation or breakage. The polishing surface of the rotary polishing tool may include a notch. The inclusion of a notch on the polishing surface reduces the changes of tool burn, especially for larger tool diameters and higher rotational speeds. The length of the notch may be equal to the diameter of the rotary polishing tool, such that the notch extends across the entirety of the polishing surface. The notch may have a depth 820 greater than or equal to 0.001 mm to less than or equal to 5 mm. The notch may have a width 830 greater than or equal to 0.1 mm to less than or equal to 4 mm. In a preferred embodiment, the rotation axis of the rotary polishing tool is orthogonal to the surface of the glass-based substrate.

As described above, CNC machines typically operate with a distance-control approach, while polishing processes are beneficially implemented by controlling the pressure applied to the surface being polished by the polishing tool, which may be referred to as a pressure-control approach. To convert a CNC machine to pressure-control, a spring may be added to the polishing tool. Utilizing a spring with a high spring strength increases the process speed, but a spring strength that is too high may damage the tool or glass-based substrate surface. In a preferred embodiment, the spring may have a strength greater than or equal to 50 gr/mm to less than or equal to 300 gr/mm.

A coolant may be used during the polishing process. The coolant may be water or a water-based coolant. In embodiments, the coolant may be deionized water. In a preferred embodiment, the coolant is a water-based coolant, such as commercially available BlueKool coolant produced by Universal Photonics. The use of the coolant as opposed to a polishing slurry reduces the process and maintenance costs. The coolant type, coolant nozzle angle, and coolant flow rate are selected to avoid hydrodynamic lubrication during the polishing process.

Figure 9:
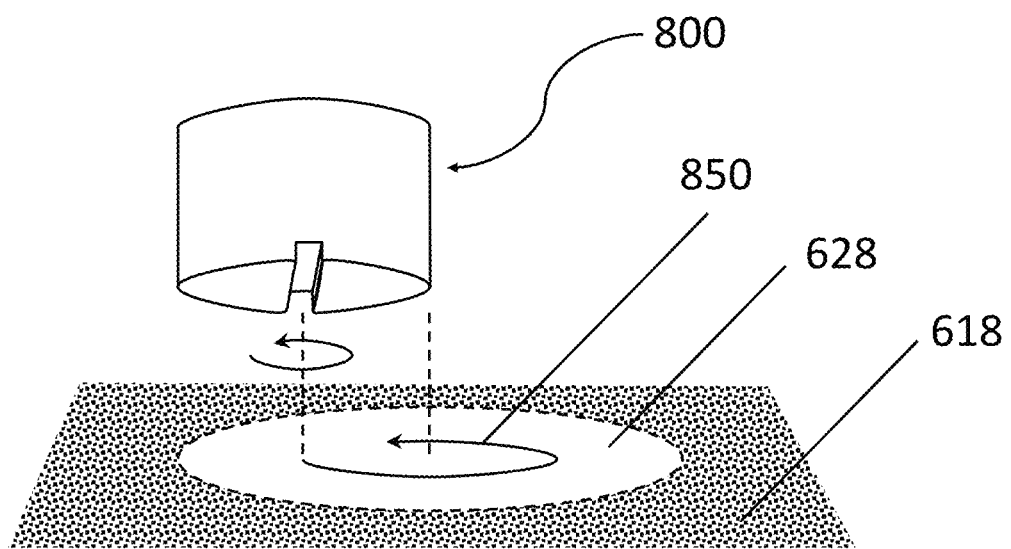
FIG. 9 is a schematic representation of the rotary polishing tool relative to the glass-based article according to an embodiment.

The polishing process operation parameters are selected to decrease polishing time and provide improved surface quality. The operation parameters include the tool polishing pattern, tool feed rate, rotational speed, and applied pressure. A schematic representation of the rotary polishing tool 800 polishing path 850 as it relates to the polished surface region 628 and the textured surface region 618 is depicted in FIG. 9.

The polishing pattern may be any appropriate pattern that produces the desired polished region geometry. Exemplary polishing patterns include spiral patterns, trochoidal patterns, zig-zag patterns, and combinations thereof. In a preferred embodiment, the polishing pattern is a zig-zag pattern. The linear speed at which the rotary polishing tool is moved through the polishing pattern is referred to herein as the feed rate. In embodiments, the rotary polishing tool is moved at a feed rate greater than or equal to 500 mm/min to less than or equal to 2,000 mm/min, such as 1,500 mm/min. The polishing pattern may be characterized by the step over size, where the step over size refers to the overlap of each polishing path. In embodiments, the step over size may be greater than or equal to 2% to less than or equal to 6% of the rotary polishing tool.

Figure 11:
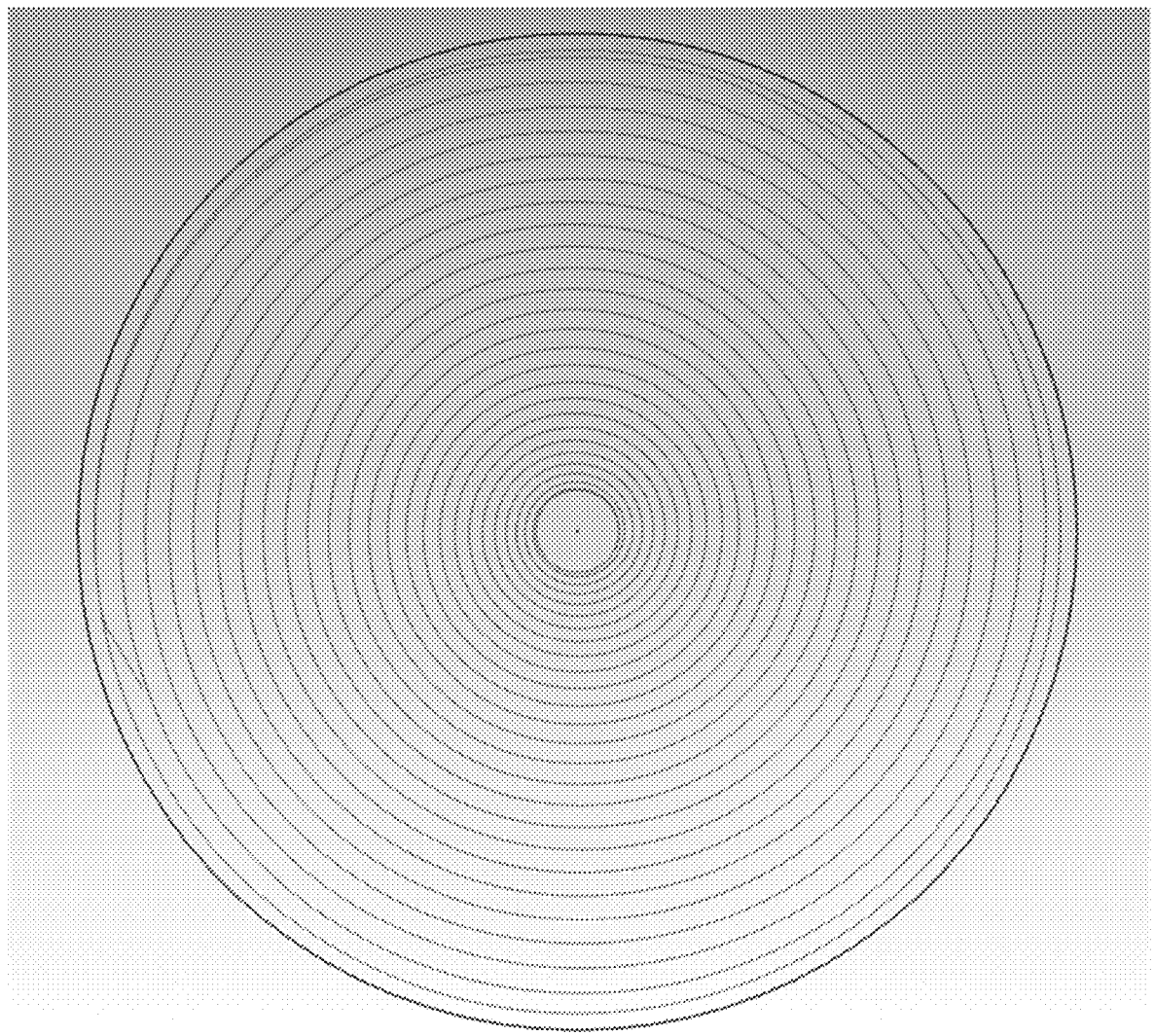
FIG. 11 is a schematic representation of a spiral polishing pattern.
Figure 12:
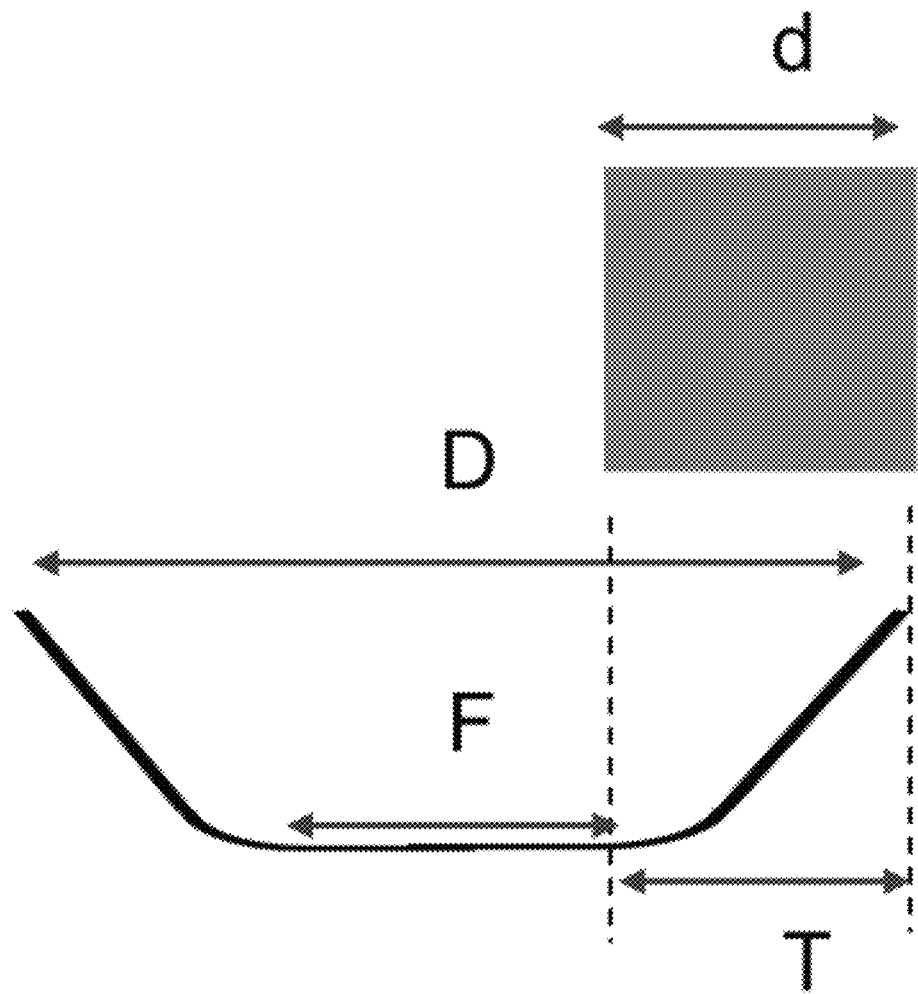
FIG. 12 is a schematic representation of the polished region diameter, polished region flat region diameter, rotary polishing tool diameter, and transition region width according to an embodiment.

A spiral polishing pattern may provide desirable polished region flatness, especially when small step over sizes are utilized. An exemplary spiral pattern is shown in FIG. 11. The spiral pattern allows precise control over the amount of material removed at the center of the pattern. Differences in removal at the center of the rotary polishing tool and the edge of the polishing tool can be controlled over the first spiral ring formation. The maximum flat region in the produced polished window region is provided by the formula:

$$F = D - (2d)/2$$

wherein F is the diameter of the flat region, D is the diameter of the polished window, d is the diameter of the rotary polishing tool. As shown in FIG. 12, the width of the transition region T may be equivalent to the diameter of the rotary polishing tool d. This means that rotary polishing tool with a smaller diameter produces a larger flat region diameter F and minimizes the width of the transition region T.

Generally, a spiral pattern provides desirable flatness in the center of the polished region and control over the amount of material removal at the center of the polished region. The surface roughness of the polished region and the width of the transition region produced by a spiral pattern are determined by the polishing tool geometry and step over size.

Figure 13:
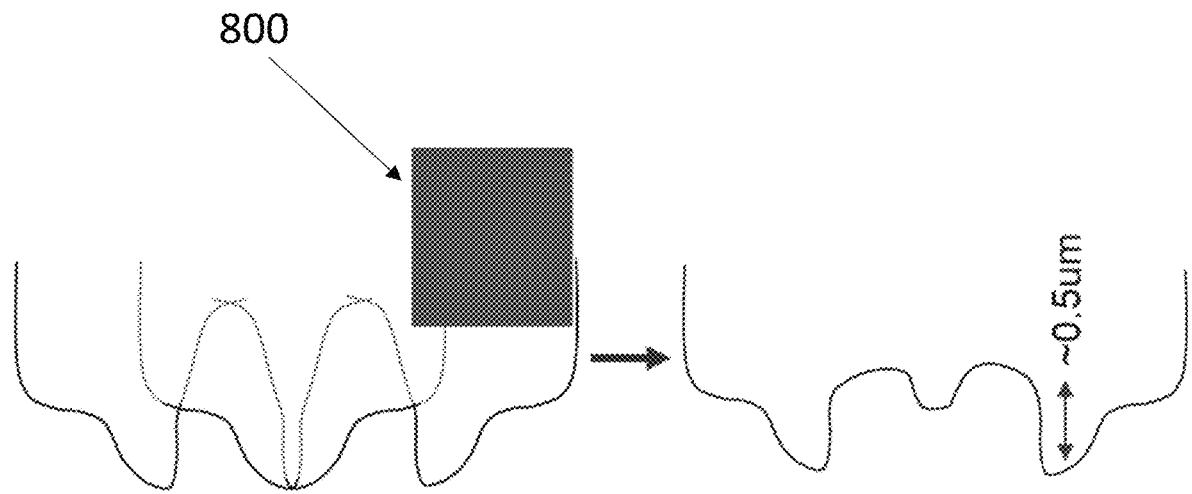
FIG. 13 shows a schematic representation of a cross-section of a polished area produced with a rotary polishing tool in a spiral pattern according to an embodiment.
Figure 14:
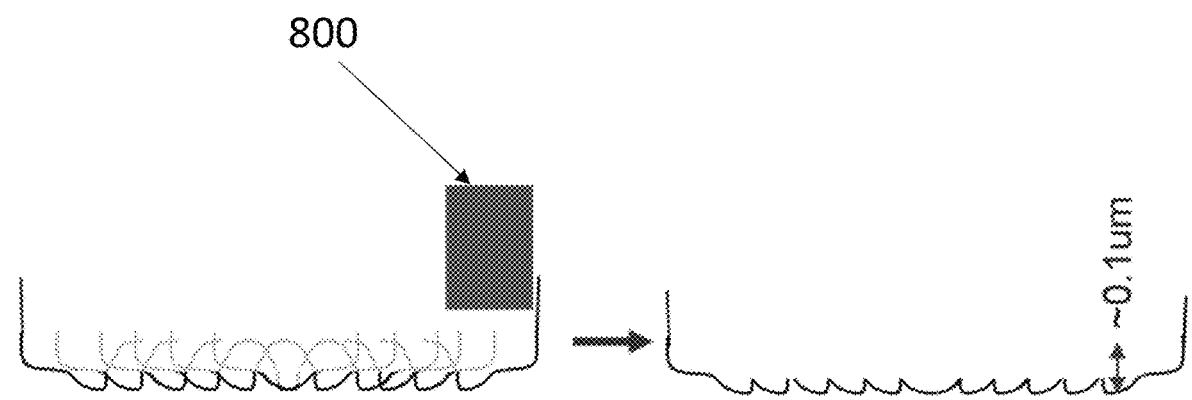
FIG. 14 shows a schematic representation of a cross-section of a polished area produced with a rotary polishing tool in a spiral pattern according to an embodiment.

The rotary polishing tool diameter is also proportional to the removal variation from the edge to the center. FIG. 13 shows a schematic representation of a cross-section of a polished area produced with a rotary polishing tool with a 6 mm diameter and a spiral pattern. FIG. 14 shows a schematic representation of a cross-section of a polished area produced with a rotary polishing tool with a 3 mm diameter and a spiral pattern. As shown in FIGS. 13 and 14, a smaller tool diameter reduces the edge to center removal variation and provides a smaller peak-to-valley (PV) value. In general, smaller tool diameters and smaller step over sizes produce smaller peak-to-valley measurements.

It has been observed that increased profile depths improve the surface quality of the polished region and reduces the width of the transition region for spiral patterns. The profile depth is analogous to the amount of material removed by the polishing and the difference between the thickness of the polished region and the non-polished region.

Figure 15:
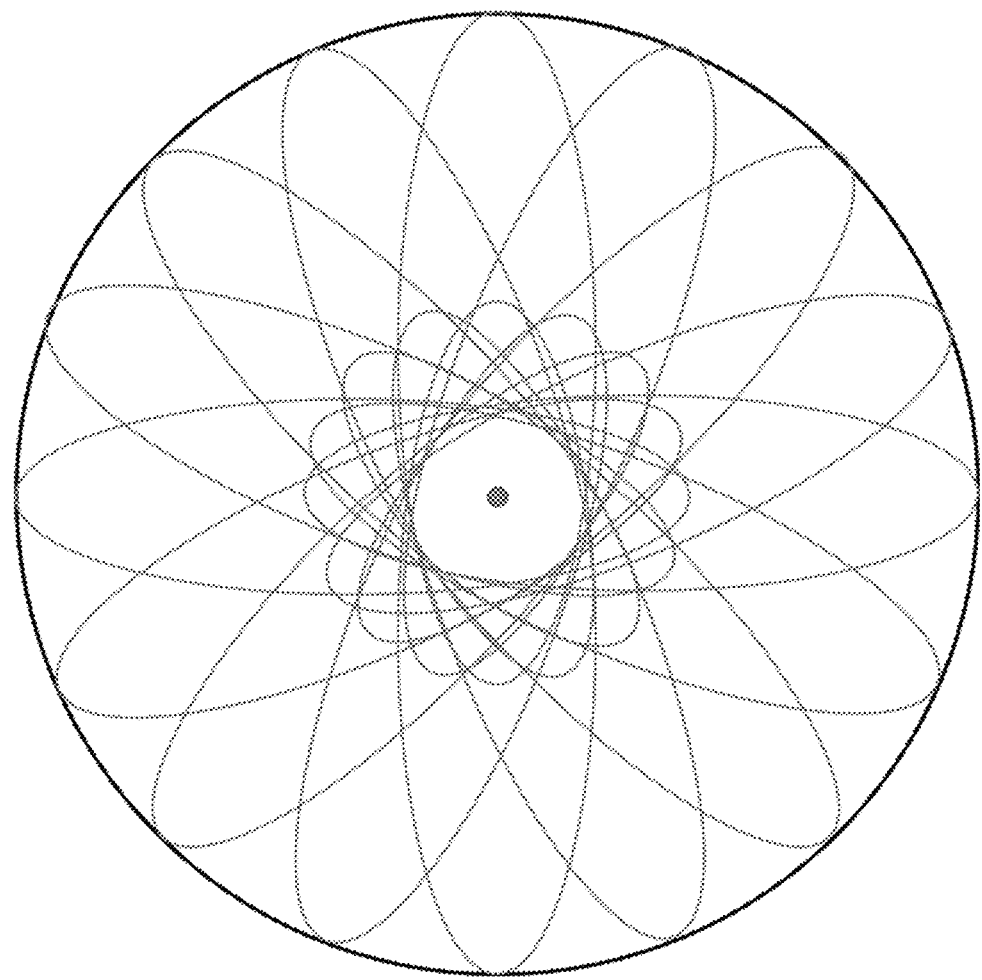
FIG. 15 is a schematic representation of a trochoidal polishing pattern.

A trochoidal polishing pattern may provide improved surface roughness in the polished region and a low peak-to-valley value. An exemplary trochoidal polishing pattern is shown in FIG. 15. Controlling the flatness of the center of the polished region is more challenging for a trochoidal pattern than a spiral pattern. To improve the flatness in the center of the polished region, the trochoidal pattern may be divided into sections and a different feed rate may be employed in each section. The offset of the trochoidal pattern also affects the size of the flat region of the polished region. As utilized herein, the "offset" of the trochoidal pattern is the distance from the center at which the tool begins to turn back to the starting point of a pattern trace, such that if the tool returns to the trace starting spot from the center of the polished region the offset is 0 and if the tool returns to the trace starting spot from the opposite edge of the polished region the offset is the half the diameter (D/2) of the polished window. Generally, increasing the offset of the trochoidal pattern increases the size of the flat region of the polished region. The trochoidal polishing pattern provides improved surface roughness, a smoother transition from the transition region to the flat region of the polished region, ability to reduce the width of the transition region by modifying the offset, and a high removal rate.

A spiral polishing pattern may be combined with a trochoidal polishing pattern. The combined polishing pattern provides the desirable polished region flatness of the spiral pattern and the improved surface quality and smaller transition region of the trochoidal pattern. In embodiments, a combined polishing pattern may start with a spiral pattern and finish with a trochoidal pattern.

Spiral and trochoidal polishing patterns both have a propensity to produce large variations in the height of the surface at the center of the polished region. This may occur because the patterns have a small operation window between under-polishing and over-polishing the center of the polished region. The polishing of the center of the polished region is primarily produced by the edge of the polishing tool in spiral and trochoidal patterns, and as a result small flaws at the edge of the tool, such as chips, may reduce the repeatability and predictability of the polished region center height. For many applications, such as camera windows, the center of the polished region is the most optically important area and non-uniformities in the height of the center region can produce undesirable performance issues.

Figure 16:
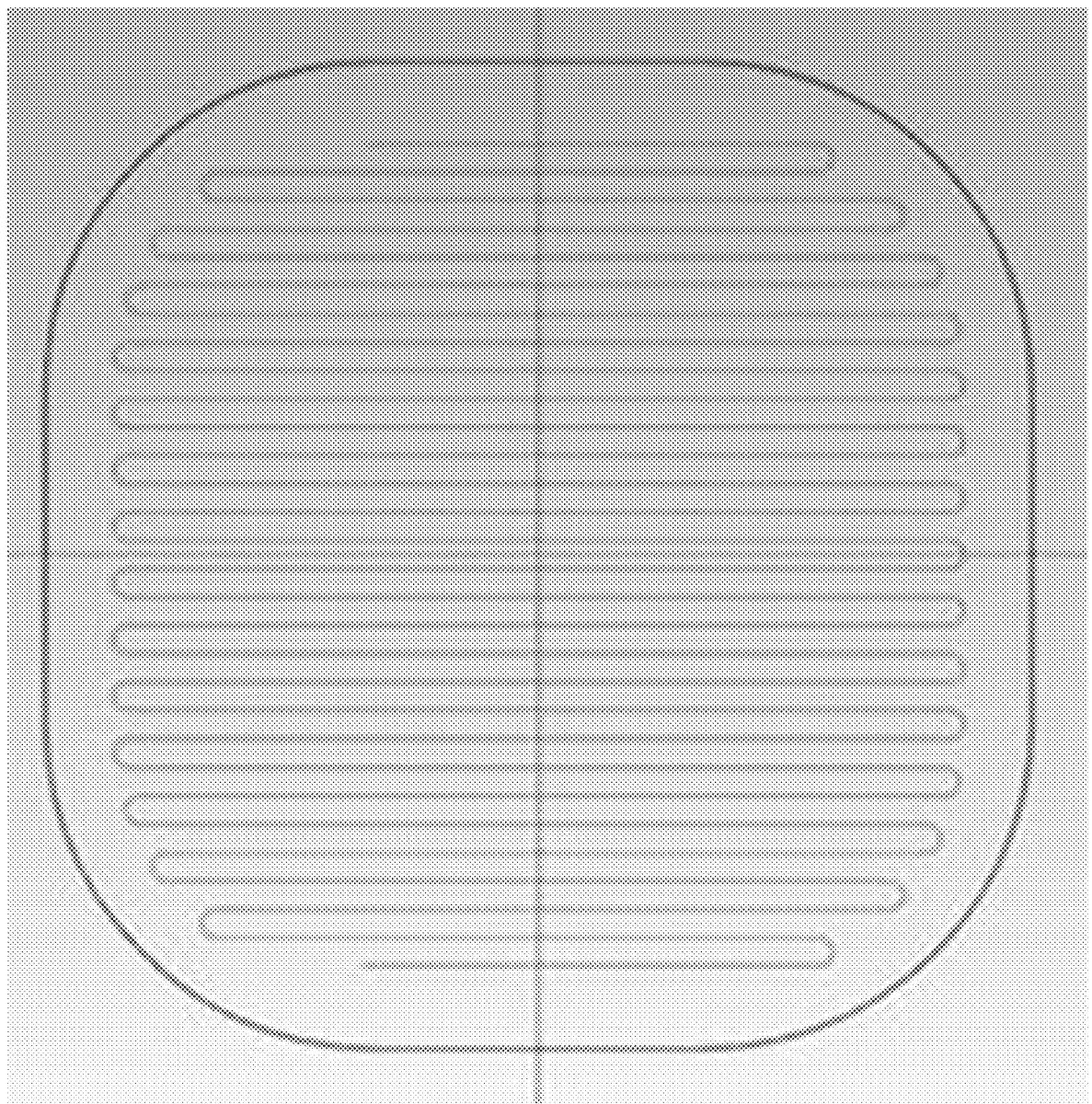
FIG. 16 is a schematic representation of a zig-zag polishing pattern.
Figure 17:
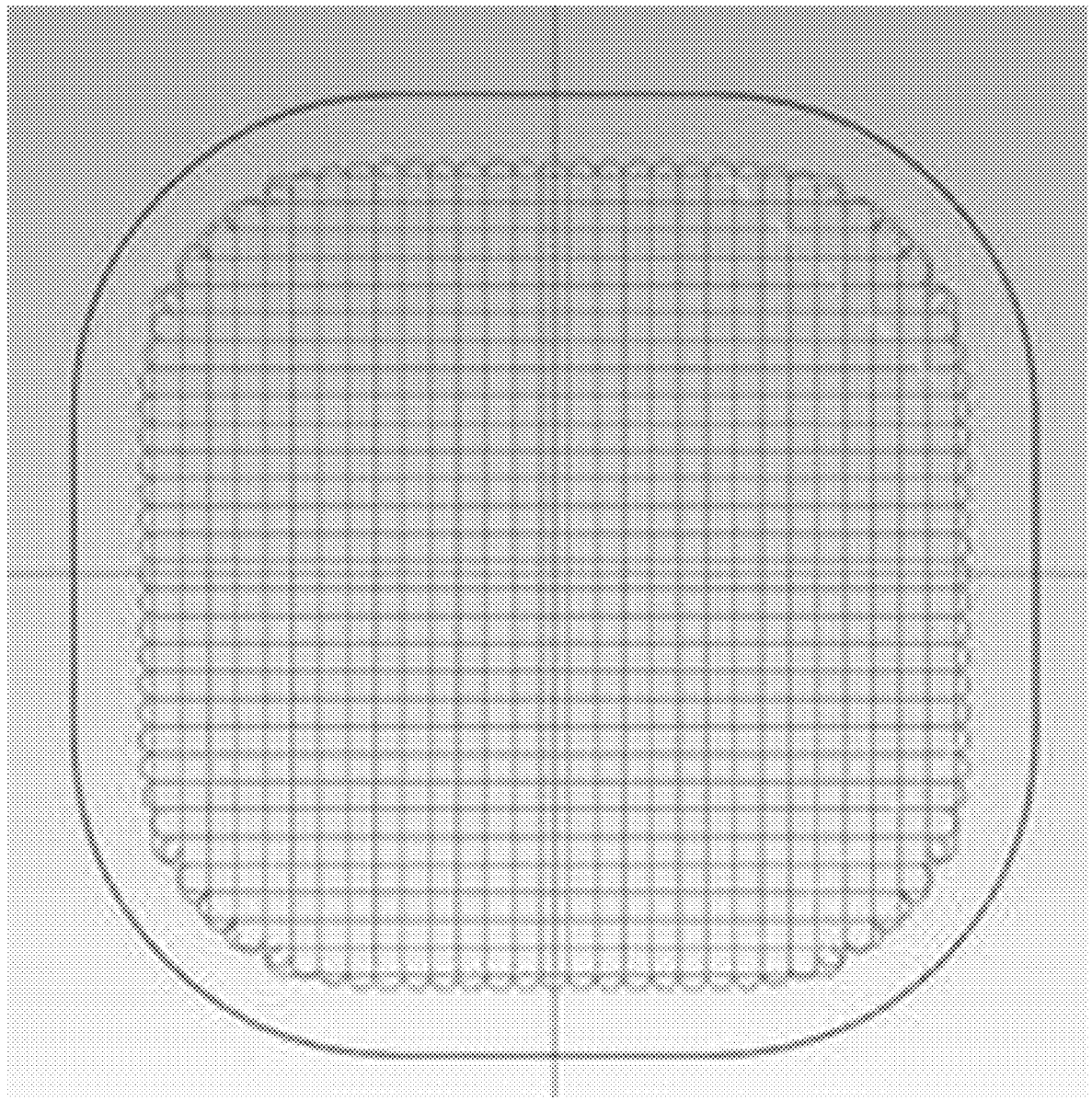
FIG. 17 is a schematic representation of a two-pass zig-zag polishing pattern.

A zig-zag polishing pattern may be beneficially employed to move the less-uniform and less-reproducible areas of the polished regions away from critical areas, such as to the edges of the polished regions. An exemplary zig-zag polishing pattern is shown in FIG. 16. The zig-zag pattern may be performed a second time, as a second pass over the polished region, after rotating the pattern by 90° to reduce polished surface variability. An exemplary two-pass zig-zag polishing pattern is shown in FIG. 17. The zig-zag patterns provide increased repeatability of the polished region surface, with polishing variability primarily located at the edges of the polished region where the tool is changing direction. The improved repeatability of the surfaces of the center of the polished regions produced by a zig-zag pattern improve production yield when compared to other polishing patterns. Zig-zag patterns also are less sensitive to tool quality and condition. As a result, tool dressing frequency may be reduced when a zig-zag pattern is employed, increasing process "up-time."

Figure 10A:
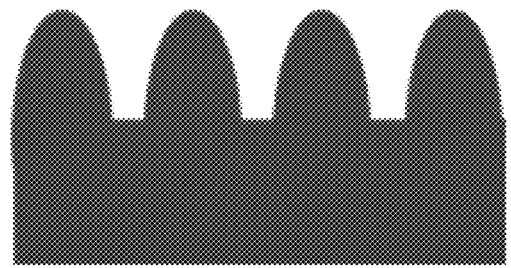
FIG. 10A shows a fresh, non-glazed tool, the top image is a schematic cross-section and the bottom image is a photograph of the tool surface.
Figure 10A:
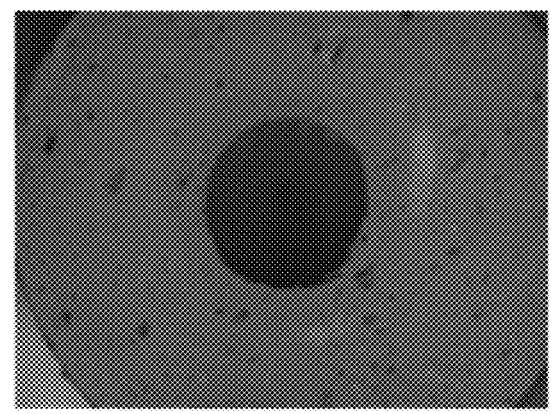
Figure 10B:
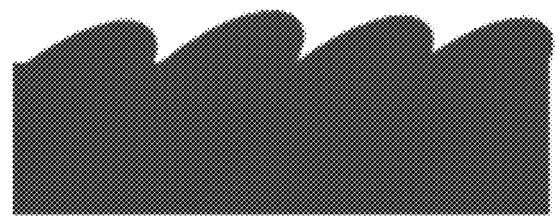
FIG. 10B shows a glazed tool, the top image is a schematic cross-section and the bottom image is a photograph of the glazed tool surface.
Figure 10B:
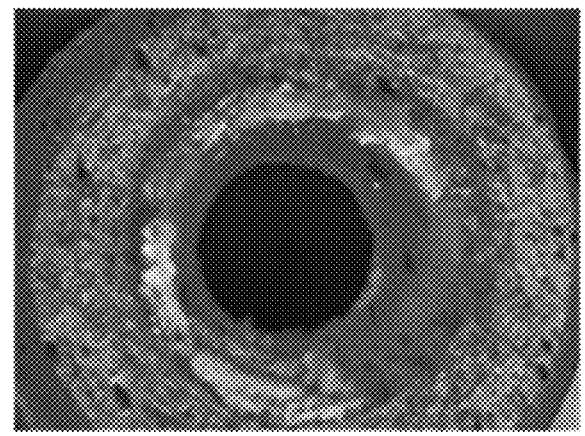

To maintain polishing performance, the tool may be regularly dressed to avoid tool glazing. Tool glazing produces undesired variations in the characteristics of the polished surface region. Other types of tool damage or imperfections, such as edge chipping also may negatively affect the polished surface. A fresh, non-glazed tool surface is shown in FIG. 10A, with the top image a schematic cross-section and the bottom image a photograph of the tool surface. A glazed tool surface is shown in FIG. 10B, with the top image a schematic cross-section and the bottom image a photograph of the tool surface. The frequency of tool dressing is selected to maintain polishing performance while avoiding excessive tool wear and process down time. In a preferred embodiment, the tool is dressed with a silicon carbide disk, such as a 320# silicon carbide disk at 500 rpm.

The processes for producing the textured glass-based articles may further include polishing an additional region of the surface of the textured glass-based substrate. The additional polishing produces a region with a third thickness $t_3$, a third surface roughness $R_{a1}$, and a third haze $H_3$. The textured glass-based article may then be characterized by $R_{a1} > R_{a3} > R_{a2}$, $H_1 > H_3 > H_2$, and $t_1 > t_3 > t_2$. The additional polishing step may include any of the above-described polishing conditions.

The glass-based substrates utilized to form the textured glass-based articles may have any suitable composition. In embodiments, the glass-based substrate may include a glass ceramic. Exemplary glass ceramic materials are those described in U.S. Patent App. Pub. No. 2016/0102010 A1, titled "High Strength Glass-Ceramics Having Petalite and Lithium Silicate Structures," published Apr. 14, 2016, the contents of which are incorporated herein by reference in their entirety. In embodiments, the glass-based substrate may include an alkali aluminosilicate glass, such as a lithium aluminosilicate glass. Exemplary glass materials are those described in U.S. Patent App. Pub. No. 2019/0300422 A1, titled "Glasses Having High Fracture Toughness," published Oct. 3, 2019, the contents of which are incorporated herein by reference in their entirety.

In embodiments, the texturing and polishing processes described herein may be performed on only one surface of the glass-based substrate. In such embodiments, at least one surface of the textured glass-based article may retain its characteristics as formed.

The characteristics of the textured glass-based articles will now be described in detail. The textured glass-based articles include a first surface region with a first thickness $t_1$, a first surface roughness $R_{a1}$, and a first haze $H_1$; and a second surface region having a second thickness $t_2$, a second surface roughness $R_{a2}$, and a second haze $H_2$. The textured glass-based articles are characterized by $R_{a1} > R_{a2}$, $H_1 > H_2$, and $t_1 > t_2$.

The difference in thickness between the first surface region and the second surface region provides a desirable tactile feel. In embodiments, $t_1 - t_2$ is less than or equal to 2 µm, such as less than or equal to 1.9 µm, less than or equal to 1.8 µm, less than or equal to 1.7 µm, less than or equal to 1.6 µm, less than or equal to 1.5 µm, less than or equal to 1.4 µm, less than or equal to 1.3 µm, less than or equal to 1.2 µm, less than or equal to 1.1 µm, less than or equal to 1 µm, or less. In embodiments, $t_1 - t_2$ is greater than or equal to 0.5 µm to less than or equal to 5 mm, such as greater than or equal to 0.5 µm to less than or equal to 50 µm, greater than or equal to 1 µm to less than or equal to 50 µm, greater than or equal to 5 µm to less than or equal to 50 µm, greater than or equal to 10 µm to less than or equal to 40 µm, greater than or equal to 20 µm to less than or equal to 30 µm, and any and all sub-ranges formed between any of the foregoing endpoints.

The second surface region may have any appropriate size and shape. The second surface region may alternatively be referred to as a polished region or a polished window. In embodiments, the second surface region has a diameter greater than or equal to 1 mm to less than or equal to 20 mm, such as greater than or equal to 2 mm to less than or equal to 19 mm, greater than or equal to 3 mm to less than or equal to 18 mm, greater than or equal to 4 mm to less than or equal to 17 mm, greater than or equal to 5 mm to less than or equal to 16 mm, greater than or equal to 6 mm to less than or equal to 15 mm, greater than or equal to 7 mm to less than or equal to 14 mm, greater than or equal to 8 mm to less than or equal to 13 mm, greater than or equal to 9 mm to less than or equal to 12 mm, greater than or equal to 10 mm to less than or equal to 11 mm, and any and all sub-ranges formed between any of the foregoing endpoints. As utilized herein, the diameter of the second surface region refers to the minimum distance that connects two edges of the second surface region and passes through the center of the second surface region. For example, a rectangular second surface region has a diameter that is equivalent to the shortest side of the rectangle and an oval second surface region has a diameter equivalent to the minor axis of the oval.

The $R_a$ surface roughness of the first surface region $R_{a1}$ is relatively high when compared to other regions of the textured glass-based article, and may provide desirable optical properties, tactile feel, and aesthetic appearance. In embodiments, $R_{a1}$ is greater than or equal to 300 nm, such as greater than or equal to 350 nm, greater than or equal to 400 nm, greater than or equal to 450 nm, greater than or equal to 500 nm, greater than or equal to 550 nm, greater than or equal to 600 nm, greater than or equal to 650 nm, greater than or equal to 700 nm, greater than or equal to 750 nm, greater than or equal to 800 nm, greater than or equal to 850 nm, greater than or equal to 900 nm, greater than or equal to 950 nm, greater than or equal to 1000 nm, greater than or equal to 1050 nm, greater than or equal to 1100 nm, greater than or equal to 1150 nm, greater than or equal to 1200 nm, greater than or equal to 1250 nm, greater than or equal to 1300 nm, greater than or equal to 1350 nm, greater than or equal to 1400 nm, greater than or equal to 1450 nm, greater than or equal to 1500 nm, greater than or equal to 1550 nm, or more. In embodiments, $R_{a1}$ is greater than or equal to 300 nm to less than or equal to 1600 nm, such as greater than or equal to 350 nm to less than or equal to 1550 nm, greater than or equal to 400 nm to less than or equal to 1500 nm, greater than or equal to 450 nm to less than or equal to 1450 nm, greater than or equal to 500 nm to less than or equal to 1400 nm, greater than or equal to 550 nm to less than or equal to 1350 nm, greater than or equal to 600 nm to less than or equal to 1300 nm, greater than or equal to 650 nm to less than or equal to 1250 nm, greater than or equal to 700 nm to less than or equal to 1200 nm, greater than or equal to 750 nm to less than or equal to 1150 nm, greater than or equal to 800 nm to less than or equal to 1100 nm, greater than or equal to 850 nm to less than or equal to 1050 nm, greater than or equal to 900 nm to less than or equal to 1000 nm, greater than or equal to 900 nm to less than or equal to 950 nm, and any and all sub-ranges formed between any of the foregoing endpoints. As used herein, unless otherwise specified, "surface roughness" refers to $R_a$, the arithmetical mean deviation of a measured profile. Unless otherwise specified, $R_a$ is measured on a Zygo 7000 with the following settings: Scan size was 180 microns by 220 microns; Objective: 20× Mirau; Image Zoom 2×; Camera resolution 0.2777 microns; Filter: low Pass; Filter Type: Average; Filter Low Wavelength 0; Filter High Wavelength: 0.83169 microns.

The haze of the first surface region $H_1$ is relatively high when compared to other regions of the textured glass-based article and may provide desirable optical properties and aesthetic appearance. In embodiments, $H_1$ is greater than or equal to 30% to less than or equal to 100%, such as greater than or equal to 35% to less than or equal to 95%, greater than or equal to 40% to less than or equal to 90%, greater than or equal to 45% to less than or equal to 85%, greater than or equal to 50% to less than or equal to 80%, greater than or equal to 55% to less than or equal to 75%, greater than or equal to 60% to less than or equal to 70%, greater than or equal to 30% to less than or equal to 65%, and any and all sub-ranges formed between any of the foregoing endpoints. As used herein, haze refers to "transmittance haze," and is measured using a Haze-gard Transparency Transmission Haze Meter, according to ASTM D1003 "Standard Test Method for Haze and Luminous Transmittance of Transparent Plastics" using Illuminant C.

The $R_a$ surface roughness of the second surface region $R_{a2}$ is relatively low when compared to other regions of the textured glass-based article and may provide desirable optical properties and aesthetic appearance. In embodiments, $R_{a2}$ is greater than or equal to 0.2 nm to less than or equal to 20 nm, such as greater than or equal to 0.2 nm to less than or equal to 10 nm, greater than or equal to 0.5 nm to less than or equal to 9.5 nm, greater than or equal to 1.0 nm to less than or equal to 9.0 nm, greater than or equal to 1.5 nm to less than or equal to 8.5 nm, greater than or equal to 2.0 nm to less than or equal to 8.0 nm, greater than or equal to 2.5 nm to less than or equal to 7.5 nm, greater than or equal to 3.0 nm to less than or equal to 7.0 nm, greater than or equal to 3.5 nm to less than or equal to 6.5 nm, greater than or equal to 4.0 nm to less than or equal to 6.0 nm, greater than or equal to 4.5 nm to less than or equal to 5.5 nm, greater than or equal to 5.0 nm to less than or equal to 10.0 nm, and any and all sub-ranges formed between any of the foregoing endpoints.

The haze of the second surface region $H_2$ is relatively low when compared to other regions of the textured glass-based article and may provide desirable optical properties and aesthetic appearance. In embodiments, $H_2$ is less than or equal to 0.2%, such as less than or equal to 0.20%, less than or equal to 0.19%, less than or equal to 0.18%, less than or equal to 0.17%, less than or equal to 0.16%, less than or equal to 0.15%, less than or equal to 0.14%, less than or equal to 0.13%, less than or equal to 0.12%, less than or equal to 0.11%, less than or equal to 0.10%, less than or equal to 0.09%, less than or equal to 0.08%, less than or equal to 0.07%, less than or equal to 0.06%, less than or equal to 0.05%, less than or equal to 0.04%, less than or equal to 0.03%, less than or equal to 0.02%, less than or equal to 0.01%, or less. In embodiments, $H_2$ is greater than or equal to 0.0001% to less than or equal to 0.2%, such as greater than or equal to 0.001% to less than or equal to 0.19%, greater than or equal to 0.01% to less than or equal to 0.18%, greater than or equal to 0.02% to less than or equal to 0.17%, greater than or equal to 0.03% to less than or equal to 0.16%, greater than or equal to 0.04% to less than or equal to 0.15%, greater than or equal to 0.05% to less than or equal to 0.14%, greater than or equal to 0.06% to less than or equal to 0.13%, greater than or equal to 0.07% to less than or equal to 0.12%, greater than or equal to 0.08% to less than or equal to 0.11%, greater than or equal to 0.09% to less than or equal to 0.1%, and any and all sub-ranges formed between any of the foregoing endpoints.

The textured glass-based articles may include a third surface region having a third thickness $t_3$, a third surface roughness $R_{a3}$, and a third haze $H_3$. The textured glass-based articles may then be characterized by $R_{a1} > R_{a3} > R_{a2}$, $H_1 > H_3 > H_2$, and $t_1 > t_3 > t_2$.

The $R_a$ surface roughness of the third surface region $R_{a3}$ may be between the surface roughness of the other regions. In embodiments, $R_{a3}$ is greater than or equal to 10 nm to less than or equal to 300 nm, such as greater than or equal to 20 nm to less than or equal to 290 nm, greater than or equal to 30 nm to less than or equal to 280 nm, greater than or equal to 40 nm to less than or equal to 270 nm, greater than or equal to 50 nm to less than or equal to 260 nm, greater than or equal to 60 nm to less than or equal to 250 nm, greater than or equal to 70 nm to less than or equal to 240 nm, greater than or equal to 80 nm to less than or equal to 230 nm, greater than or equal to 90 nm to less than or equal to 220 nm, greater than or equal to 100 nm to less than or equal to 210 nm, greater than or equal to 120 nm to less than or equal to 200 nm, greater than or equal to 130 nm to less than or equal to 190 nm, greater than or equal to 140 nm to less than or equal to 180 nm, greater than or equal to 150 nm to less than or equal to 170 nm, greater than or equal to 160 nm to less than or equal to 300 nm, and any and all sub-ranges formed between any of the foregoing endpoints.

The haze of the third surface region $H_3$ may be between the haze of the other regions. In embodiments, $H_3$ is greater than or equal to 3% to less than or equal to 30%, such as greater than or equal to 4% to less than or equal to 29%, greater than or equal to 6% to less than or equal to 28%, greater than or equal to 7% to less than or equal to 27%, greater than or equal to 8% to less than or equal to 26%, greater than or equal to 9% to less than or equal to 25%, greater than or equal to 10% to less than or equal to 24%, greater than or equal to 11% to less than or equal to 23%, greater than or equal to 12% to less than or equal to 22%, greater than or equal to 13% to less than or equal to 21%, greater than or equal to 14% to less than or equal to 20%, greater than or equal to 15% to less than or equal to 19%, greater than or equal to 16% to less than or equal to 18%, greater than or equal to 17% to less than or equal to 30%, and any and all sub-ranges formed between any of the foregoing endpoints.

The textured glass-based articles include a transition region between the first surface region and the second surface region. The transition between the surface characteristics of the first region and the surface characteristics is gradual. Stated differently, the transition between the first region and the second region is not a step-type transition. The gradual transition provides a pleasing feel when a user swipes a finger over the transition region. In embodiments, the transition region includes a surface that is not perpendicular to the surface plane of the glass-based article, where the surface plane of the glass-based article is defined by the glass-based article as a whole. The transition region may be characterized by the transition between the first region with the thickness $t_1$ and the second region with the thickness $t_2$. The transition region may have a width greater than or equal to 0.1 mm to less than or equal to 8 mm, such as greater than or equal to 0.5 mm to less than or equal to 7 mm, greater than or equal to 1 mm to less than or equal to 6 mm, greater than or equal to 2 mm to less than or equal to 5 mm, greater than or equal to 3 mm to less than or equal to 4 mm, and any and all sub-ranges formed between any of the foregoing endpoints.

The second surface region is characterized by a flat region bounded by the transition region. The flat region is determined by measuring the height (z) of the article surface as a function of the lateral (x, y) position on the glass-based article surface with an optical surface profiler, such as a Zygo NewView 7300, with a 10× objective, 0.05× zoom, a plane filter, and 10×1, 10×2, 15×1, 15×2, or 15×15 stitching. Pixels were 2.47 μm square and noise was removed with a Hampel filter with 12 neighbors per side of each data point, data beyond three standard deviations was removed, and then a Savitzky-Golay finite impulse response smoothing filter of polynomial order 2 and frame length of three pixels to generate a processed XYZ matrix. An over-smoothed XYZ matrix was then generated from the processed XYZ matrix using a second Savitzky-Golay finite impulse response smoothing filter of polynomial order 2 and frame length of 249 pixels. A deviation XYZ matrix was generated by subtracting the over-smoothed XYZ matrix from the processed XYZ matrix. The maximum central roughness (MCR) value is defined as the maximum value in the center region of the second surface region, where the center region is defined as the center of the second surface region±10% of the scan width. The maximum roughness of the first surface region (MAR) was calculated as $99.7^{th}$ percentile of the deviation XYZ matrix. A binary XYZ matrix was then generated with values of 1 where deviation XYZ matrix was greater than both 3MCR and 0.1MAR, and values of 0 elsewhere. The binary XYZ matrix was filtered using a Gaussian filter of length equal to 0.3% of the length of the XYZ matrix, and the edges of the second surface region (DL and DR) were set as the points where the value of the Gaussian-filtered binary XYZ matrix was first greater than 0.3 when scanning from center of the second surface region to the left (DL) and to the right (DR). Reference points on the left and right sloped edges of the second surface region, the transition region, were chosen as points at 25% of the height difference between the lowest point of the over-smoothed XYZ matrix and the highest point of the over-smoothed XYZ matrix above the lowest point of the over-smoothed XYZ matrix. The slope of the edge of the second surface region calculated at the reference points, and moving from the reference points to the center of the second surface region point FL was set as the point where the slope of the over-smoothed XYZ matrix reached a value less than 8% of the slope at the left-edge reference point and the point FR was set as the point where the slope of the over-smoothed XYZ matrix reached a value less than 8% of the slope at the right-edge reference point. The mean value of the processed XYZ matrix was calculated for the z-values of the first surface region (points outside DL and DR). The height H of the polishing profile was set as the difference between the mean z-value of the first surface region and the minimum z-value of the processed XYZ matrix.

The above reference points are utilized to calculate the diameter of the second surface region D, the diameter of the flat region F, the peak-to-valley value in the flat region PV, and the maximal diameter in the flat region in which the peak-to-valley height was less than 80 nm PV80. The diameter of the second surface region D is provided by the following formula:

$$D=DR-DL$$

The diameter of the flat region F is provided by the following formula:

$$F=FR-FL$$

Figure 18:
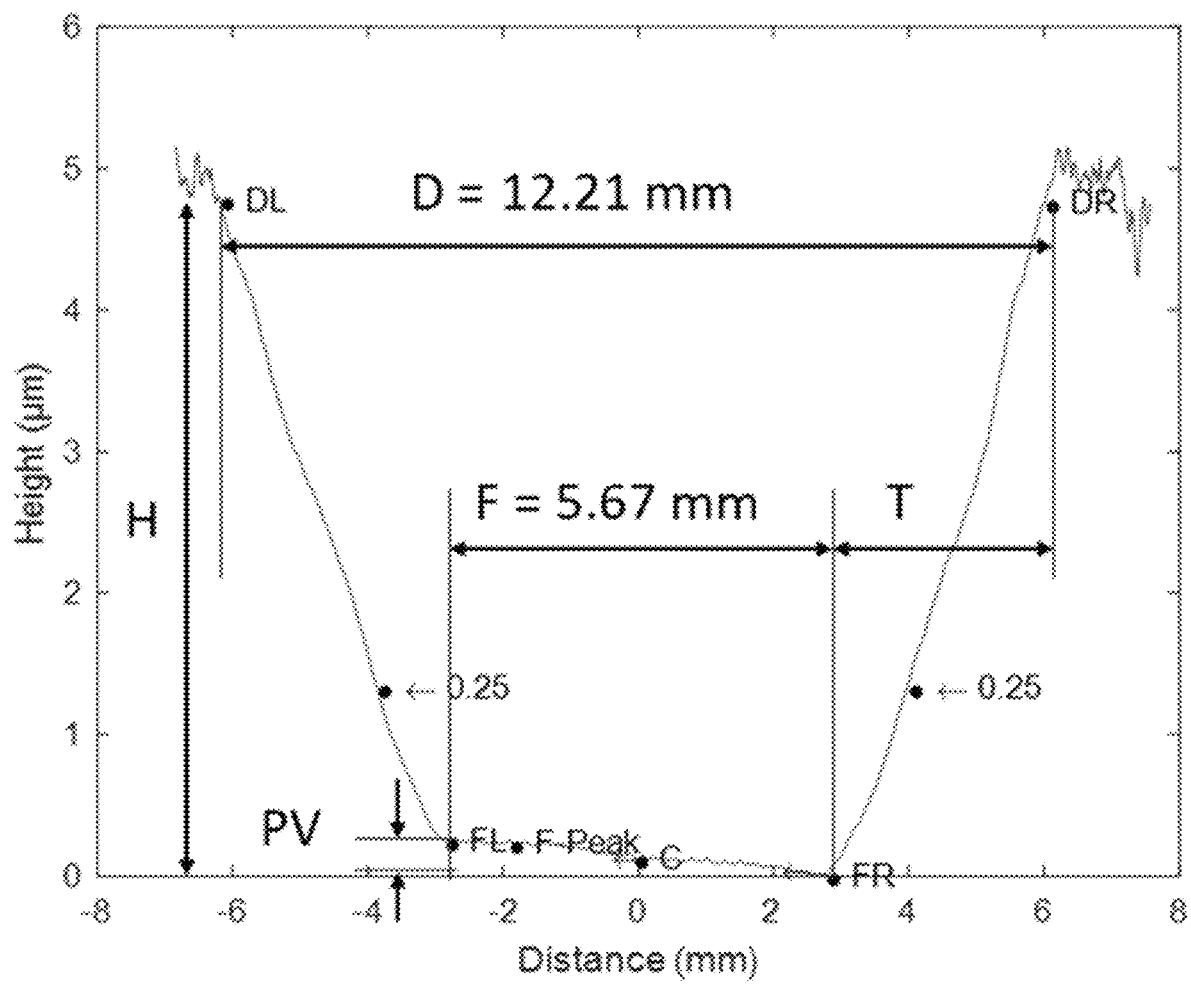
FIG. 18 is a profile of a measured surface profile of a second surface region in the xz plane according to an embodiment.

The peak-to-valley value in the flat region PV is defined as the difference between the largest z-value in the region bounded by FL and FR (Fpeak) and the minimum z-value. An exemplary scan profile is shown in FIG. 18 with the DL, DR, D, FL, FR, Fpeak, T, H, PV, reference points (0.25), and center (C) labelled.

The flat region may be characterized by any of the above properties. In embodiments, the flat region diameter F is greater than or equal to 0.1 mm to less than or equal to 19.8 mm. In embodiments, the peak-to-valley value in the flat region PV is greater than or equal to 0.2 nm to less than or equal to 600 nm. Additionally, because the flat region is a subset of the second surface region, any of the properties described with respect to the second surface region may also be characteristic of the flat region.

Another measure of the second surface region was based on a typical model camera with a 1.05-mm effective focal length (EFL), F/2.0 aperture, and setback of 0.6 mm. Dividing the focal length by the aperture gives a 0.525-mm aperture stop, which is the diameter of the circle of optical rays (the ray bundle) that strikes the user-facing side of the second surface region, passes through the glass, and converges at any pixel of a sensor. The aperture stop defines the size of the field of view for each pixel in the sensor. The quality of the image reaching the sensor through the second surface region depends in part on the peak-to-valley fluctuations of the second surface region surface relative to the long-scale tilt and height of the second surface region surface within this field of view. Profilometry data were measured with a Zygo NewView 3D optical profilometer to obtain the height (z) of the second surface region as a function of horizontal (x,y) position with a 2.47-μm pixel size. For a slice in the yz-plane of a polished window, z(y), the locations of FL and FR (the left and right endpoints of the flat region of the window) were determined as described above. The measured second surface region profile between FL and FR was fit to a polynomial curve of order 8-16. The polynomial curve fit was subtracted from the measured second surface region profile to generate a curve of difference in height, ΔHeight (μn), as a function of y. The peak-to-valley (PV) deviation was measured within a 0.525-mm-wide section of the window's ΔHeight(y), starting at y=FL, and calculated this PV deviation traveling along the 0.525-mm section across the flat region of the window, one pixel at a time, from FL to FR. Lastly, the maximum and median value for this PV deviation was calculated for all values of y for each window. The process of finding PV deviation for each polished window was repeated for a slice of each window in the xz-plane.

The optical characteristics of the flat region may also be characterized on the basis of a modulation transfer function degradation value. In embodiments, the flat region has a modulation transfer function degradation greater than or equal to 0% to less than or equal to 1%. The profilometry (x,y,z) data as measured above was converted to a 2-dimensional (2D) matrix and convoluted 0-4 times using a 2×2 unity matrix, until the pixel size reached approximately 50 μm×50 μm (typically 2-4 convolution cycles). The 2D grid of pixels was then converted into a continuous surface intersecting all the points as measured. This process is called "draping" in computer-aided design (CAD) software and provides an accurate, continuous surface based on separated measurement points. Interpolation was performed with a cubic non-uniform rational B-splines (NURBS) technique, based on first-order derivative surface slope matching of two curves connecting three points. During wavefront error (WFE) computation in Zemax optical modelling software, the window tilt was removed from the convoluted 2D matrix, which was then reconverted into a format similar to Zernike decomposition using cubic spline fitting. The optical modelling software simulated and computed the wavefront deformation transmitted through the second surface region at a wavelength of 500 nm. The software translated the degradation of the optical beam quality into modulation transfer function (MTF) curves by modeling a diffraction-limited camera, which was assumed to be perfect. Using a perfect camera (i.e., the optical chain being otherwise perfect) meant that any MTF degradation arose from the second surface region itself. The model camera had a 1.05-mm effective focal length (EFL), F/2.2 aperture, 88° optical diagonal field of view (FOV), a ⅛" (2.822 mm) sensor, and a variable (340-μm or 600-μm) setback between the lens of the camera and the camera-facing side of the window. A Zemax simulation was then conducted to calculate the MTF (with the diffraction effect included) of a perfect second surface region and of the sample second surface region. The MTF degradation for the sample second surface region was then calculated as the difference between the MTF of the perfect second surface region and the MTF of the sample second surface region.

Figure 7:
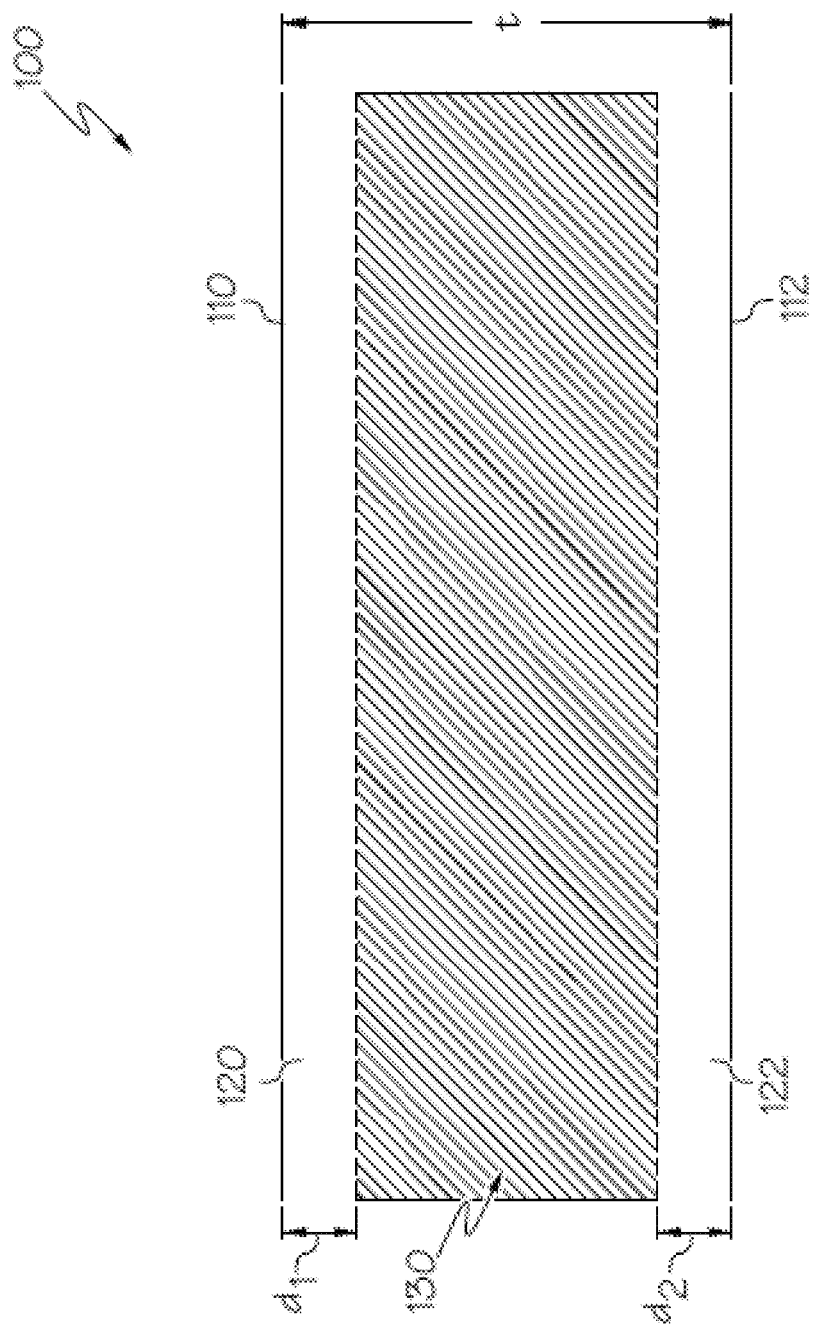
FIG. 7 is a schematic depiction of a cross-sectional view of a glass-based article having compressive stress layers on surfaces thereof according to embodiments disclosed and described herein.

In embodiments, the textured glass-based articles are also chemically strengthened, such as by ion exchange, producing a textured glass-based article that is damage resistant for applications such as, but not limited to, display covers. The chemical strengthening of the textured glass-based articles increases the strength of the textured glass-based articles. With reference to FIG. 7, the strengthened textured glass-based article has a first region under compressive stress (e.g., first and second compressive layers 120, 122 in FIG. 7) extending from the surface to a depth of compression (DOC) of the strengthened textured glass-based article and a second region (e.g., central region 130 in FIG. 7) under a tensile stress or central tension (CT) extending from the DOC into the central or interior region of the textured glass-based article. As used herein, DOC refers to the depth at which the stress within the strengthened textured glass-based article changes from compressive to tensile. At the DOC, the stress crosses from a positive (compressive) stress to a negative (tensile) stress and thus exhibits a stress value of zero.

According to the convention normally used in the art, compression or compressive stress is expressed as a negative (<0) stress and tension or tensile stress is expressed as a positive (>0) stress. Throughout this description, however, CS is expressed as a positive or absolute value—i.e., as recited herein, CS=|CS⊕. The compressive stress (CS) may have a maximum at the surface of the strengthened textured glass-based article, and the CS may vary with distance d from the surface according to a function. Referring again to FIG. 7, a first compressive layer 120 extends from first surface 110 to a depth di and a second compressive layer 122 extends from second surface 112 to a depth dz. Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the strengthened textured glass-based article. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The compressive stress of both compressive stress regions (120, 122 in FIG. 7) is balanced by stored tension in the central region (130) of the strengthened textured glass-based article. The maximum central tension (CT) and DOC values are measured using a scattered light polariscope (SCALP) technique known in the art.

In the ion exchange treatment, the textured glass-based article is contacted with a molten salt bath to produce the ion-exchanged textured glass-based article. In embodiments, the textured glass-based article may be submerged in the molten salt bath. In embodiments, the molten salt bath includes a molten nitrate salt. In embodiments, the molten nitrate salt may be $KNO_3$, $NaNO_3$, or combinations thereof. In embodiments, the molten salt bath may additionally include silicic acid.

The textured glass-based article may be exposed to the molten salt bath by dipping the glass-based article into the molten salt bath. Upon exposure to the textured glass-based article, the molten salt bath may, according to embodiments, be at a temperature of greater than or equal to 350° C. to less than or equal to 550° C. In embodiments, the textured glass-based article may be exposed to the molten salt bath for a time period greater than or equal to 30 minutes to less than or equal to 48 hours.

The ion exchanged textured glass-based article includes a compressive stress layer extending from the surface thereof to a depth of compression, as described above with reference to FIG. 7. In embodiments, the depth of compression is greater than or equal to 10 μm, such as greater than or equal to 15 μm, greater than or equal to 20 μm, greater than or equal to 25 μm, greater than or equal to 30 μm, greater than or equal to 35 μm, greater than or equal to 40 μm, greater than or equal to 45 μm, greater than or equal to 50 μm, greater than or equal to 55 μm, or more. In embodiments, the depth of compression is greater than or equal to 10 μm to less than or equal to 200 μm, such as greater than or equal to 15 μm to less than or equal to 55 μm, greater than or equal to 20 μm to less than or equal to 175 μm, greater than or equal to 25 μm to less than or equal to 150 μm, greater than or equal to 30 μm to less than or equal to 125 μm, greater than or equal to 35 μm to less than or equal to 100 μm, and any and all sub-ranges formed from any of the foregoing endpoints.

The compressive stress layer of the ion exchanged textured glass-based article includes a maximum compressive stress. In embodiments, the maximum compressive stress is greater than or equal to 200 MPa, such as greater than or equal to 250 MPa, greater than or equal to 300 MPa, greater than or equal to 350 MPa, greater than or equal to 400 MPa, greater than or equal to 450 MPa, greater than or equal to 500 MPa, greater than or equal to 550 MPa, greater than or equal to 600 MPa, or more. In embodiments, the maximum compressive stress is greater than or equal to 200 MPa to less than or equal to 1000 MPa, such as greater than or equal to 250 MPa to less than or equal to 950 MPa, greater than or equal to 300 MPa to less than or equal to 900 MPa, greater than or equal to 350 MPa to less than or equal to 850 MPa, greater than or equal to 400 MPa to less than or equal to 800 MPa, greater than or equal to 450 MPa to less than or equal to 750 MPa, greater than or equal to 500 MPa to less than or equal to 700 MPa, greater than or equal to 550 MPa to less than or equal to 650 MPa, greater than or equal to 500 MPa to less than or equal to 600 MPa, and any and all sub-ranges formed from any of the foregoing endpoints.

EXAMPLES

Embodiments will be further clarified by the following examples. It should be understood that these examples are not limiting to the embodiments described above.

Example 1

A transparent glass ceramic substrate including petalite as a crystal phase was slurry lapped and etched to form a textured glass ceramic article. The glass ceramic substrates were squares with a side length of 50 mm and had a thickness of 0.8 mm. The slurry included alumina particles and the lapping removed 50 μm from the surface of the glass substrate. The particle size utilized in the slurry is reported in Table I. The lapped surface was then etched with a 50% NaOH etchant solution. The etch time and amount of material removed by the etching are reported in Table I. The lapping and etching were both performed on the same side of the substrates and were only performed on one surface of the substrates.

TABLE I

| Article | Etch Removal (μm) | Particle Size (μm) | Etch Time (hrs) | $R_a$ (nm) | Gloss 20 (%) | Gloss 60 (%) | Gloss 85 (%) |
|---|---|---|---|---|---|---|---|
| 1 | 0 | 5 | 0.0 | 453.66 | 0.5 | 7.9 | 44.3 |
| 2 | 5 | 5 | 1.8 | 531.24 | 0.4 | 14.8 | 41.7 |
| 3 | 15 | 5 | 5.4 | 559.98 | 1.9 | 14.0 | 46.6 |
| 4 | 30 | 5 | 10.9 | 540.26 | 3.6 | 17.0 | 54.2 |
| 5 | 0 | 9 | 0.0 | 472.18 | 0.6 | 8.1 | 44.8 |
| 6 | 5 | 9 | 1.8 | 545.87 | 0.4 | 14.7 | 39.8 |
| 7 | 15 | 9 | 5.4 | 551.49 | 1.7 | 13.8 | 44.5 |
| 8 | 30 | 9 | 10.9 | 573.26 | 3.5 | 16.8 | 49.5 |
| 9 | 0 | 15 | 0.0 | 676.16 | 0.1 | 8.3 | 27.5 |
| 10 | 5 | 15 | 1.8 | 1005.57 | 0.0 | 13.9 | 16.8 |
| 11 | 15 | 15 | 5.4 | 961.67 | 0.7 | 13.6 | 18.2 |
| 12 | 30 | 15 | 10.9 | 905.49 | 1.7 | 13.7 | 16.2 |
| 13 | 0 | 22 | 0.0 | 996.54 | 0.0 | 8.3 | 13.6 |
| 14 | 5 | 22 | 1.8 | 1544.65 | −0.1 | 12.6 | 7.1 |
| 15 | 15 | 22 | 5.4 | 1552.83 | 0.2 | 13.4 | 7.9 |
| 16 | 30 | 22 | 10.9 | 1462.80 | 0.9 | 13.8 | 9.2 |

| Article | DOI (%) | Haze (%) | Rq (nm) | Rsk | Rku |
|---|---|---|---|---|---|
| 1 | 0.0 | 80.8 | 598.19 | −0.335 | 4.2 |
| 2 | 0.0 | 91.0 | 754.05 | −0.576 | 4.2 |
| 3 | 0.8 | 71.6 | 729.73 | −0.512 | 3.2 |
| 4 | 0.8 | 52.0 | 687.23 | −0.183 | 2.6 |
| 5 | 0.0 | 79.8 | 617.99 | −0.465 | 5.1 |
| 6 | 0.0 | 91.8 | 730.67 | −0.651 | 4.2 |
| 7 | 0.7 | 73.6 | 716.42 | −0.520 | 3.2 |
| 8 | 0.3 | 52.8 | 735.75 | −0.243 | 2.7 |
| 9 | 0.0 | 90.2 | 900.40 | −0.731 | 6.5 |

TABLE I-continued

| | | | | | |
|---|---|---|---|---|---|
| 10 | 0.0 | 97.1 | 1544.99 | −1.258 | 7.2 |
| 11 | 0.0 | 88.3 | 1614.04 | −0.357 | 4.7 |
| 12 | 0.1 | 74.5 | 1451.39 | 0.395 | 7.7 |
| 13 | 0.0 | 93.4 | 1577.16 | −0.571 | 8.3 |
| 14 | 0.0 | 98.8 | 2327.01 | −1.581 | 8.4 |
| 15 | 0.0 | 93.7 | 2274.36 | −0.351 | 4.9 |
| 16 | 0.0 | 85.1 | 2125.25 | −0.082 | 6.5 |

The optical properties of the textured glass ceramic articles of Example 1 were measured with a commercially available Rhopoint Glossmeter device where Gloss 20, Gloss 60, and Gloss 85 refer to a measurements taken at 20°, 60°, and 85° from vertical using, the surface morphology was measured with a commercially available Zygo 7000 device, and the haze was measured as described above.

Example 2

A transparent lithium aluminosilicate glass substrate was lapped with a diamond pad and etched to form a textured glass ceramic article. The glass substrates were squares with a side length of 50 mm and had a thickness of 0.8 mm. The diamond pads were classified as 9 μm or 20 μm, as reported in Table II. The lapping removed 25 μm or 50 μm from the surface of the glass substrate, as indicated in Table II. The lapped surface was then etched with a 50% NaOH etchant solution. The amount of material removed by the etching is reported in Table II. The lapping and etching were both performed on the same side of the substrates and were only performed on one surface of the substrates.

TABLE II

| Article | Pad (μm) | Etch Removal (μm) | Transmittance (%) | $R_a$ (nm) | Haze (%) |
|---|---|---|---|---|---|
| 17 | 9 | 0 | 84.2 | 593.13 | 100.0 |
| 18 | 9 | 0 | 84.2 | 567.66 | 99.7 |
| 19 | 9 | 0 | 82.3 | 744.64 | 100.0 |
| 20 | 20 | 0 | 85.6 | 552.42 | 85.2 |
| 21 | 20 | 0 | 84.5 | 845.30 | 90.2 |
| 22 | 20 | 0 | 84.4 | 894.17 | 91.4 |
| 23 | 9 | 5 | 88.0 | 861.06 | 101.0 |
| 24 | 9 | 5 | 87.4 | 915.49 | 101.0 |
| 25 | 9 | 5 | 87.8 | 865.57 | 101.0 |
| 26 | 20 | 5 | 84.8 | 1162.10 | 95.6 |
| 27 | 20 | 5 | 83.9 | 1524.56 | 96.1 |
| 28 | 20 | 5 | 83.6 | 1474.91 | 95.9 |
| 29 | 9 | 15 | 89.9 | 828.97 | 96.4 |
| 30 | 9 | 15 | 89.4 | 948.07 | 97.3 |
| 31 | 9 | 15 | 89.8 | 873.57 | 96.3 |
| 32 | 20 | 15 | 87.3 | 1493.61 | 93.4 |
| 33 | 20 | 15 | 88.6 | 1386.41 | 90.8 |
| 34 | 20 | 15 | 88.1 | 1315.43 | 92.1 |
| 35 | 9 | 30 | 90.4 | 897.44 | 90.8 |
| 36 | 9 | 30 | 89.7 | 999.55 | 95.3 |
| 37 | 9 | 30 | 90.3 | 889.20 | 90.5 |
| 38 | 20 | 30 | 89.6 | 1318.99 | 89.1 |
| 39 | 20 | 30 | 88.8 | 1424.20 | 90.6 |
| 40 | 20 | 30 | 88.0 | 1707.61 | 92.5 |

| Article | Gloss 20 (%) | Gloss 60 (%) | Gloss 85 (%) | DOI (%) | Rq (nm) | Rsk | Rku |
|---|---|---|---|---|---|---|---|
| 17 | −0.2 | 5.7 | 44.3 | 0 | 937.19 | −0.927 | 7.7 |
| 18 | −0.2 | 6.0 | 47.5 | 0 | 849.63 | −0.980 | 7.0 |
| 19 | −0.1 | 5.9 | 34.0 | 0 | 1135.00 | −1.323 | 9.8 |
| 20 | 0.7 | 9.6 | 44.0 | 0 | 876.81 | −0.911 | 6.7 |
| 21 | 0.3 | 10.2 | 28.6 | 0 | 1206.45 | −1.135 | 8.2 |
| 22 | 0.2 | 10.4 | 18.0 | 0 | 1275.42 | −1.174 | 8.6 |
| 23 | −0.1 | 5.1 | 25.3 | 0 | 1792.94 | 0.020 | 5.5 |
| 24 | −0.1 | 5.0 | 22.8 | 0 | 1757.50 | −0.341 | 5.7 |
| 25 | −0.1 | 5.1 | 23.7 | 0 | 1753.32 | −0.247 | 5.5 |
| 26 | 0.2 | 14.5 | 15.8 | 0 | 2212.77 | −1.011 | 7.8 |
| 27 | 0.1 | 11.3 | 7.2 | 0 | 2487.88 | −1.431 | 8.9 |
| 28 | 0.1 | 13.9 | 7.9 | 0 | 2492.51 | −1.185 | 7.6 |
| 29 | −0.4 | 6.7 | 26.0 | 0 | 1562.49 | −0.027 | 5.3 |
| 30 | −0.4 | 6.3 | 18.8 | 0 | 1776.33 | −0.091 | 5.9 |
| 31 | −0.4 | 6.9 | 26.1 | 0 | 1705.95 | 0.175 | 5.7 |
| 32 | 0.2 | 16.7 | 10.0 | 0 | 2508.54 | −1.103 | 7.5 |
| 33 | 0.4 | 16.0 | 15.7 | 0 | 2335.30 | −0.577 | 5.4 |
| 34 | 0.3 | 13.0 | 11.8 | 0 | 1771.03 | −1.989 | 9.7 |
| 35 | 0.3 | 7.1 | 27.8 | 0 | 1680.27 | 0.537 | 6.0 |
| 36 | 0.1 | 6.5 | 18.2 | 0 | 1861.54 | −0.057 | 4.6 |
| 37 | 0.2 | 7.0 | 26.6 | 0 | 1919.25 | 0.958 | 8.0 |
| 38 | 0.9 | 13.0 | 14.2 | 0 | 2533.51 | 0.136 | 4.5 |
| 39 | 0.7 | 14.5 | 11.0 | 0 | 2390.27 | −0.654 | 4.9 |
| 40 | 0.6 | 14.2 | 7.4 | 0 | 2895.05 | −0.205 | 5.1 |

The properties of the textured glass articles were measured as described in Example 1.

Example 3

A transparent glass ceramic substrate including petalite as a crystal phase was diamond pad lapped and etched to form a textured glass ceramic article. The glass ceramic substrates were squares with a side length of 50 mm and had a thickness of 0.8 mm. The diamond pads were classified as 9 μm or 20 μm, as reported in Table III. The lapping removed 25 μm or 50 μm from the surface of the glass ceramic substrate, as indicated in Table III. The lapped surface was then etched with a 50% NaOH etchant solution. The amount of material removed by the etching is reported in Table III. The lapping and etching were both performed on the same side of the substrates and were only performed on one surface of the substrates.

TABLE III

| Article | Pad (μm) | Etch Removal (μm) | Transmittance (%) | $R_a$ (nm) | Haze (%) |
|---|---|---|---|---|---|
| 41 | 9 | 0 | 84.8 | 534.24 | 95.2 |
| 42 | 9 | 0 | 84.9 | 486.72 | 95.2 |
| 43 | 9 | 0 | 84.7 | 477.35 | 93.1 |
| 44 | 20 | 0 | 87.0 | 670.17 | 83.9 |
| 45 | 20 | 0 | 87.1 | 645.32 | 83.3 |
| 46 | 20 | 0 | 85.4 | 1100.54 | 91.7 |
| 47 | 9 | 5 | 86.0 | 742.53 | 102.0 |
| 48 | 9 | 5 | 85.8 | 725.82 | 102.0 |
| 49 | 9 | 5 | 85.9 | 704.36 | 102.0 |
| 50 | 20 | 5 | 83.0 | 1004.82 | 96.2 |
| 51 | 20 | 5 | 82.9 | 1028.39 | 96.1 |
| 52 | 20 | 5 | 82.7 | 1095.92 | 96.5 |
| 53 | 9 | 15 | 89.4 | 766.80 | 97.9 |
| 54 | 9 | 15 | 89.5 | 750.44 | 97.9 |
| 55 | 20 | 15 | 86.4 | 1081.30 | 94.5 |
| 56 | 20 | 15 | 86.5 | 1290.84 | 94.8 |
| 57 | 20 | 15 | 86.3 | 1227.81 | 94.7 |
| 58 | 9 | 30 | 90.2 | 720.50 | 90.5 |
| 59 | 9 | 30 | 90.3 | 687.24 | 90.2 |
| 60 | 9 | 30 | 90.3 | 745.72 | 89.8 |
| 61 | 20 | 30 | 89.8 | 1440.13 | 87.7 |
| 62 | 20 | 30 | 90.2 | 1181.69 | 86.8 |
| 63 | 20 | 30 | 89.9 | 1399.10 | 87.7 |

| Article | Gloss 20 (%) | Gloss 60 (%) | Gloss 85 (%) | DOI (%) | Rq (nm) | Rsk | Rku |
|---|---|---|---|---|---|---|---|
| 41 | 0.4 | 7.5 | 39.8 | 0 | 907.10 | −0.615 | 7.6 |
| 42 | 0.4 | 7.8 | 43.7 | 0 | 872.65 | −0.659 | 9.5 |
| 43 | 0.5 | 8.7 | 43.9 | 0 | 886.45 | −0.230 | 7.7 |

TABLE III-continued

| | | | | | | | |
|---|---|---|---|---|---|---|---|
| 44 | 0.8 | 9.6 | 35.8 | 0 | 1206.83 | −0.706 | 7.1 |
| 45 | 0.8 | 9.9 | 36.9 | 0 | 1112.75 | −0.667 | 6.5 |
| 46 | 0.2 | 8.4 | 12.4 | 0 | 1672.29 | 0.683 | 7.7 |
| 47 | −0.1 | 4.7 | 30.2 | 0 | 1146.33 | −0.942 | 7.5 |
| 48 | −0.1 | 4.7 | 29.2 | 0 | 1107.83 | −0.681 | 4.9 |
| 49 | −0.2 | 4.7 | 29.9 | 0 | 1079.96 | −0.737 | 5.2 |
| 50 | 0.1 | 11.1 | 19.6 | 0 | 1529.06 | −1.374 | 7.3 |
| 51 | 0.2 | 11.1 | 20.0 | 0 | 1561.46 | −1.405 | 7.5 |
| 52 | 0.2 | 11.7 | 13.3 | 0 | 1669.73 | −1.283 | 7.4 |
| 53 | −0.2 | 6.3 | 29.5 | 0 | 1424.30 | −0.198 | 5.1 |
| 54 | −0.2 | 6.0 | 29.7 | 0 | 1277.16 | −0.418 | 4.6 |
| 55 | 0.2 | 14.9 | 13.2 | 0 | 1511.70 | −1.453 | 6.6 |
| 56 | 0.2 | 12.3 | 11.7 | 0 | 1817.21 | −1.792 | 8.5 |
| 57 | 0.2 | 12.7 | 12.6 | 0 | 1701.85 | −2.099 | 11.2 |
| 58 | 0.1 | 7.2 | 27.1 | 0 | 1059.00 | −0.120 | 3.9 |
| 59 | 0.1 | 7.3 | 29.4 | 0 | 952.08 | −0.348 | 3.5 |
| 60 | 0.1 | 7.4 | 29.6 | 0 | 1022.72 | −0.336 | 3.1 |
| 61 | 0.8 | 14.2 | 10.5 | 0 | 1909.87 | −0.457 | 0.7 |
| 62 | 0.8 | 12.2 | 12.8 | 0 | 1616.07 | −0.321 | 5.0 |
| 63 | 0.7 | 12.2 | 11.0 | 0 | 1911.46 | −0.825 | 5.2 |

The properties of the textured glass ceramic articles of Example 3 were measured as described in Example 1.

Example 4

Figure 19:
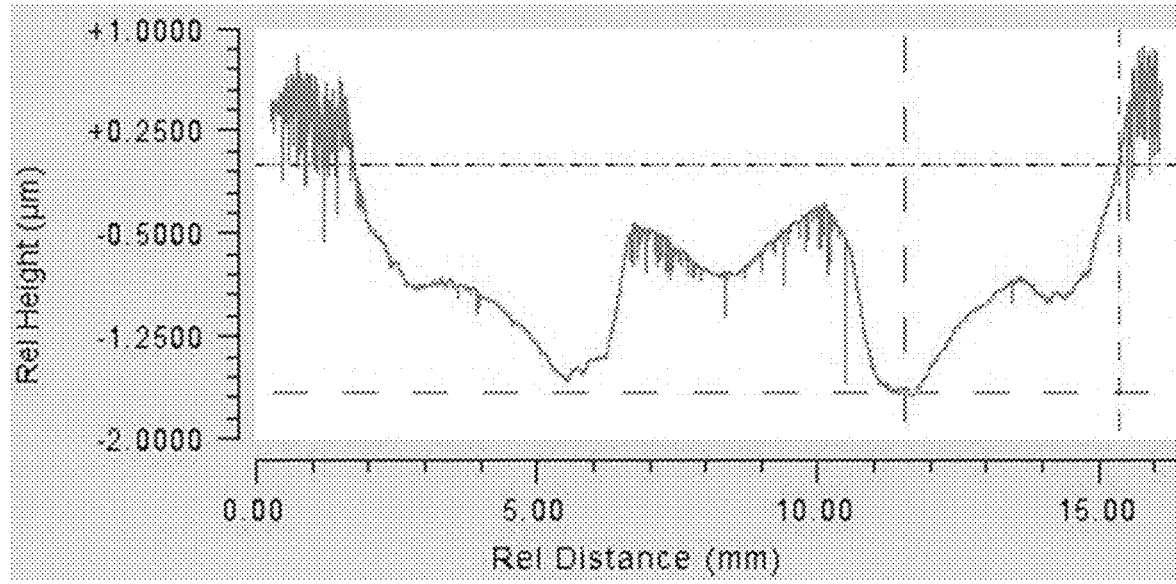
FIG. 19 shows the measured surface profile of a second surface region of a polished glass article produced by a spiral polishing pattern with a 6 mm diameter polishing tool according to an embodiment.
Figure 20:
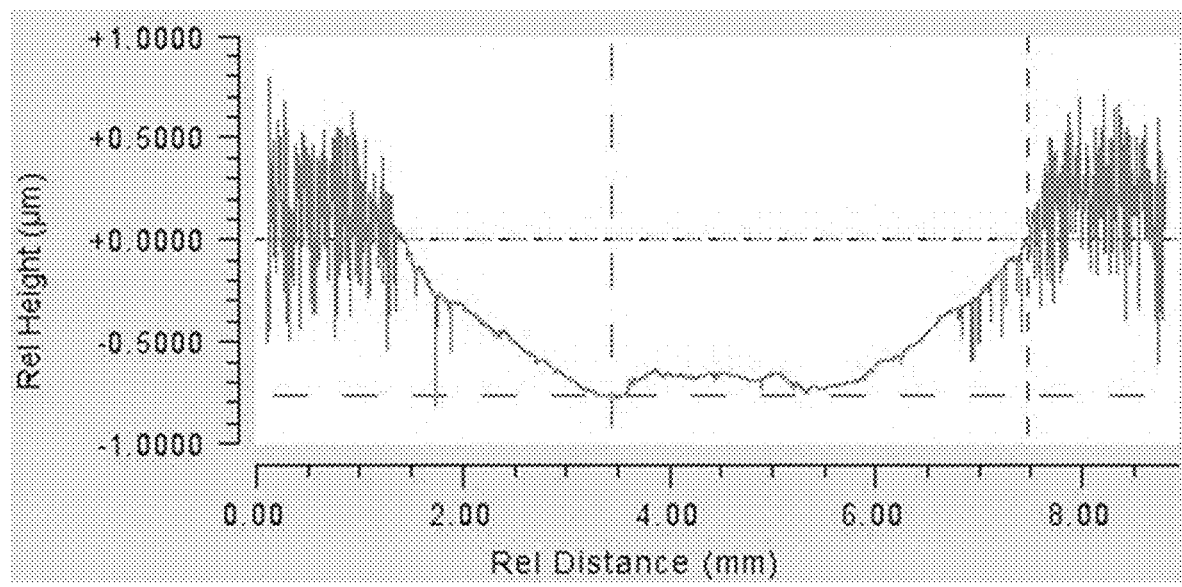
FIG. 20 shows the measured surface profile of a second surface region of a polished glass article produced by a spiral polishing pattern with a 3 mm diameter polishing tool according to an embodiment.

Sample substrates with a textured surface were subjected to a spiral polishing pattern with rotary polishing tools of different diameters. The surface profiles of the resulting polished articles were then measured as described herein. FIG. 19 shows the measured surface profile when a 6 mm diameter polishing tool was used. FIG. 20 shows the measured surface profile when a 3 mm diameter polishing tool was used. As shown by FIGS. 19 and 20, smaller tool diameters reduce provide smaller peak-to-valley values in the polished region.

Example 5

Figure 21:
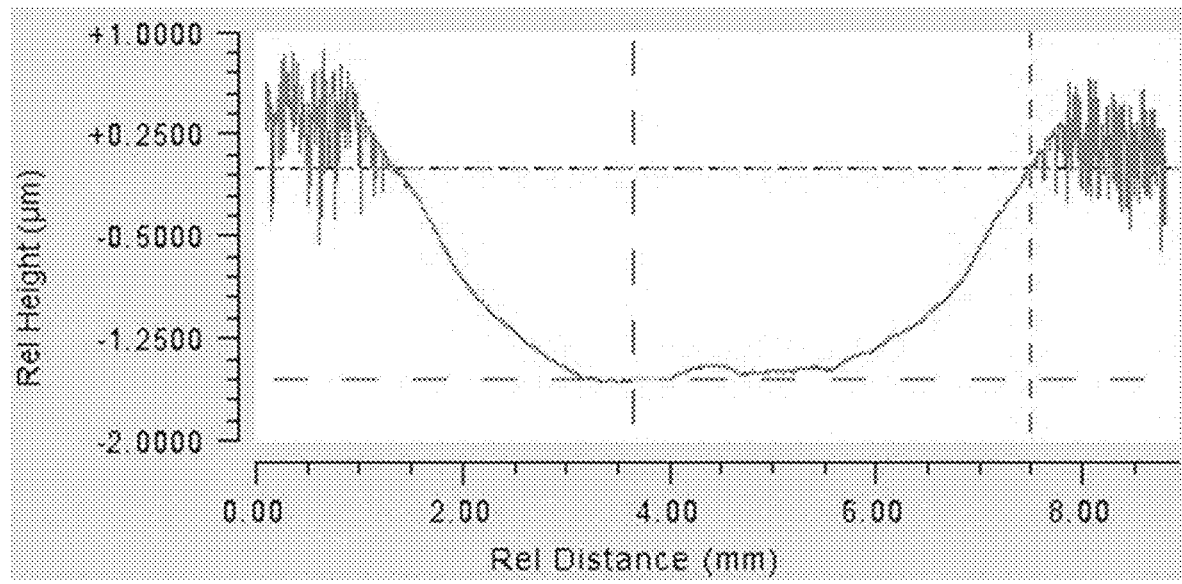
FIG. 21 shows the measured surface profile of a second surface region of a polished glass article for a <1.5 μm polishing profile depth according to an embodiment.
Figure 22:
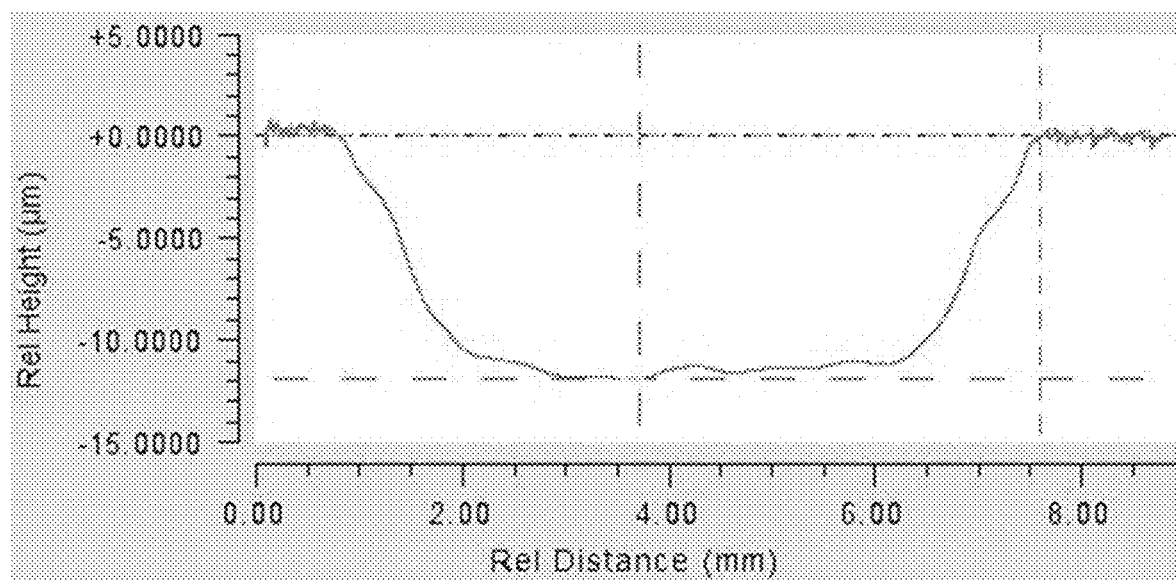
FIG. 22 shows the measured surface profile of a second surface region of a polished glass article for a ~12 μm polishing profile depth according to an embodiment.

Sample substrates with a textured surface were subjected to polishing with a rotary polishing tool and different polishing profile depths. The surface profiles of the resulting polished articles were then measured as described herein. FIG. 21 shows the measured surface profile for a <1.5 µm polishing profile depth. FIG. 22 shows the measured surface profile for a ~12 µm polishing profile depth. As shown by FIGS. 21 and 22, larger polishing profile depths improve the profile shape and reduce the size of the transition region.

Example 6

Figure 23:
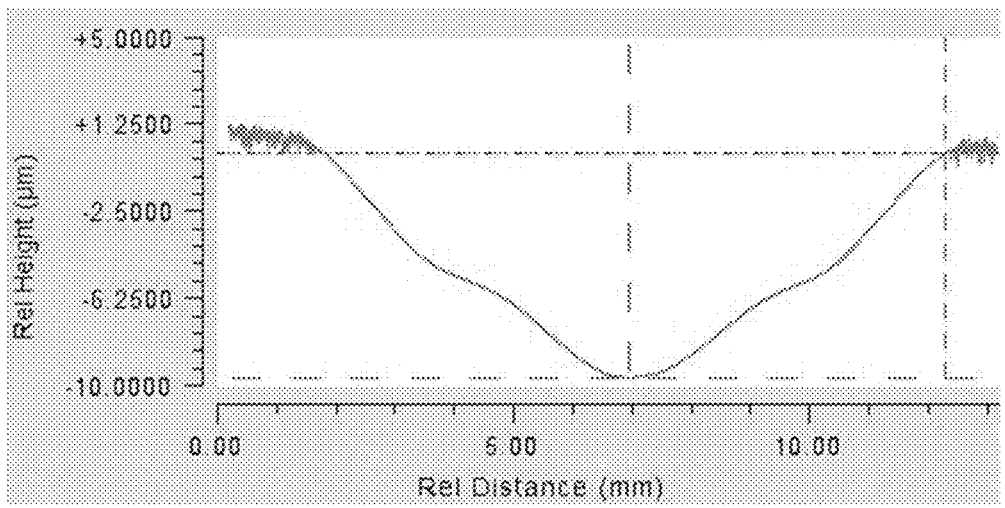
FIG. 23 shows the measured surface profile of a second surface region of a polished glass article for a trochoidal profile using a constant feed rate and zero offset according to an embodiment.
Figure 24:
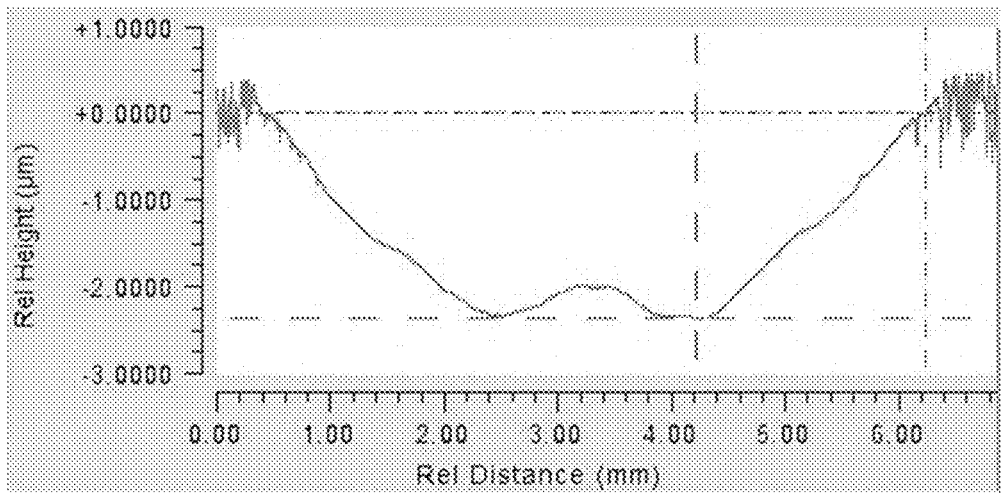
FIG. 24 shows the measured surface profile of a second surface region of a polished glass article for a trochoidal profile using a variable feed rate (feed rate reduction at the edges of the polished area) and zero offset according to an embodiment.
Figure 25:
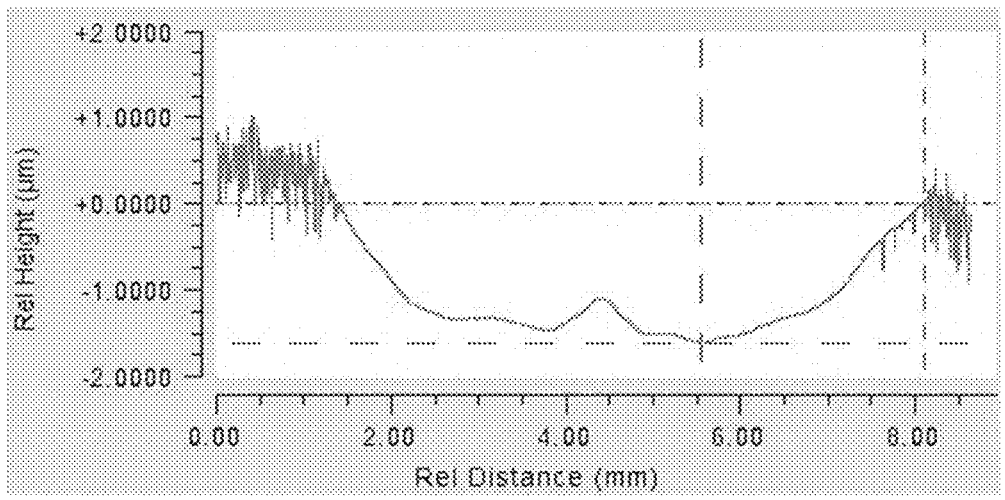
FIG. 25 shows the measured surface profile of a second surface region of a polished glass article for a trochoidal profile using a variable feed rate (feed rate reduction at the edges of the polished area) and 2.5 mm offset according to an embodiment.

Sample substrates with a textured surface were subjected to polishing with a rotary polishing tool and different trochoidal polishing patterns. The surface profiles of the resulting polished articles were then measured as described herein. FIG. 23 shows the measured surface profile for a trochoidal profile using a constant feed rate and zero offset. FIG. 24 shows the measured surface profile for a trochoidal profile using a variable feed rate (feed rate reduction at the edges of the polished area) and zero offset. FIG. 25 shows the measured surface profile for a trochoidal profile using a variable feed rate (feed rate reduction at the edges of the polished area) and 2.5 mm offset. As shown by FIGS. 23 and 24, a variable feed rate increases the flat region of the polished article. As shown by FIGS. 24 and 25, an increased offset increases the flat region of the polished article.

Example 7

Figure 26:
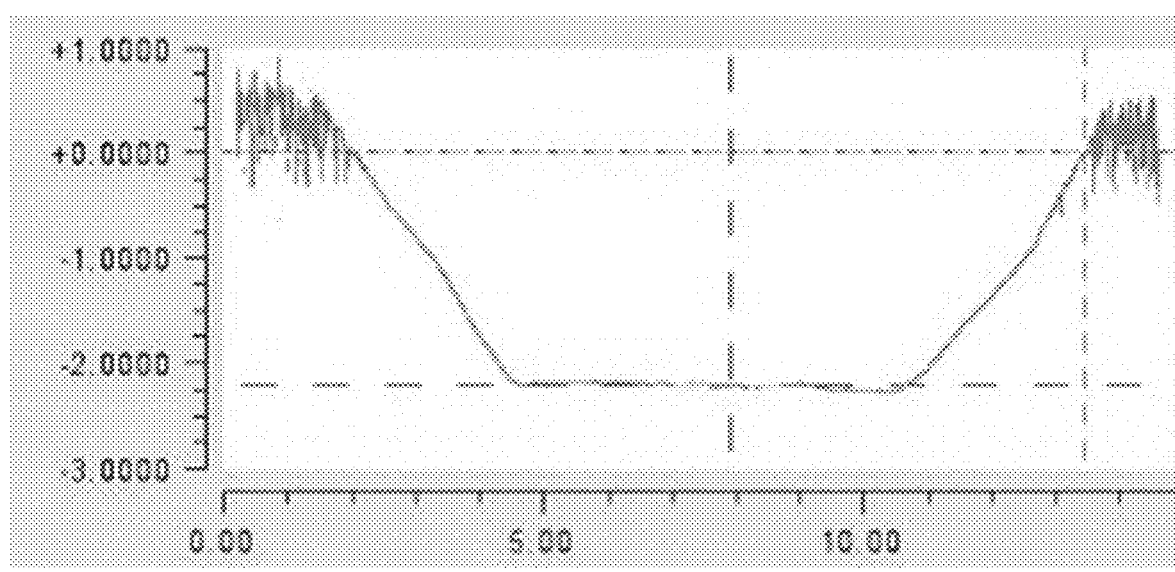
FIG. 26 shows a surface profile of a substantially ideal second surface region produced by the zig-zag polishing pattern according to an embodiment.
Figure 27:
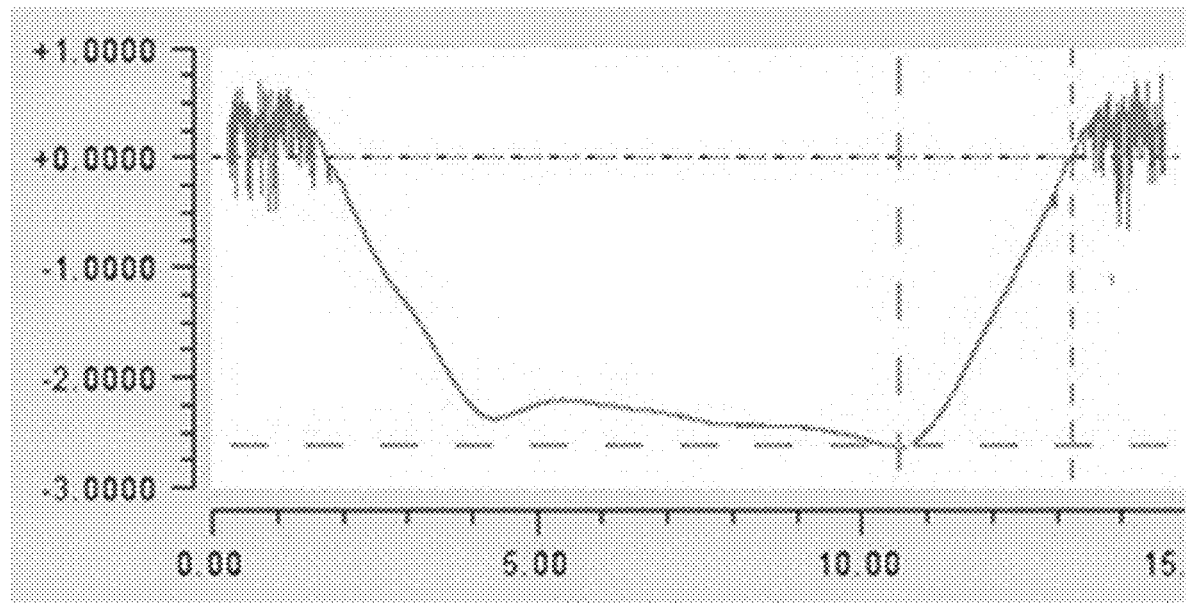
FIG. 27 shows a surface profile achieved by the zig-zag pattern that may be considered faulty, with a polished region that does not include a sufficiently flat area.
Figure 28:
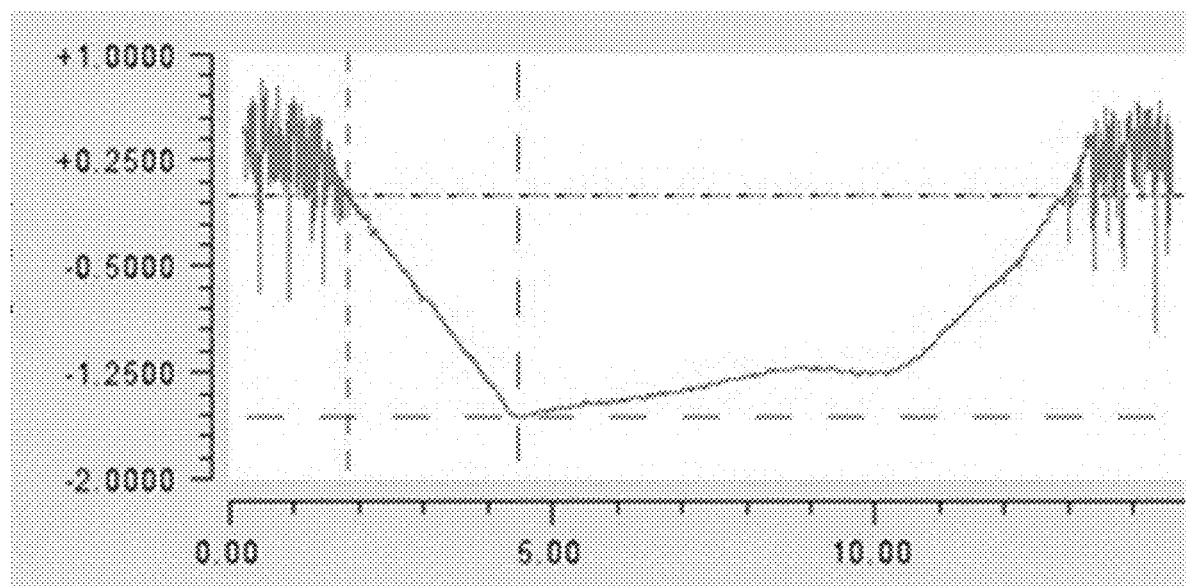
FIG. 28 shows a surface profile achieved by the zig-zag pattern that may be considered faulty, with a polished region that does not include a sufficiently flat area.
Figure 29A:
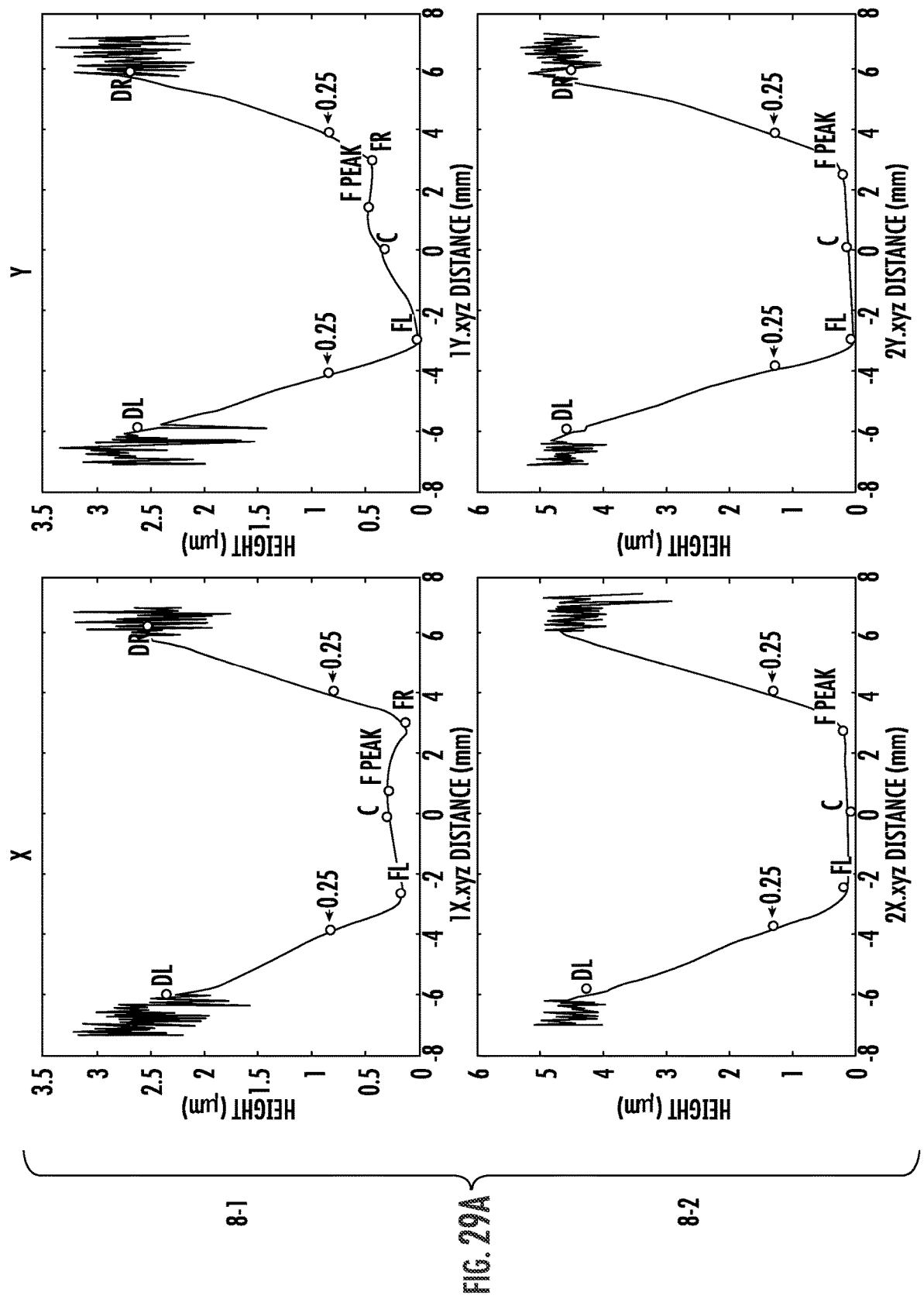
FIGS. 29A, 29B, 29C, 29D, 29E, 29F, 29G, and 29H show the measured surface profiles in the x- and y-direction for each of 15 the polished articles produced according to Example 8.
Figure 29B:
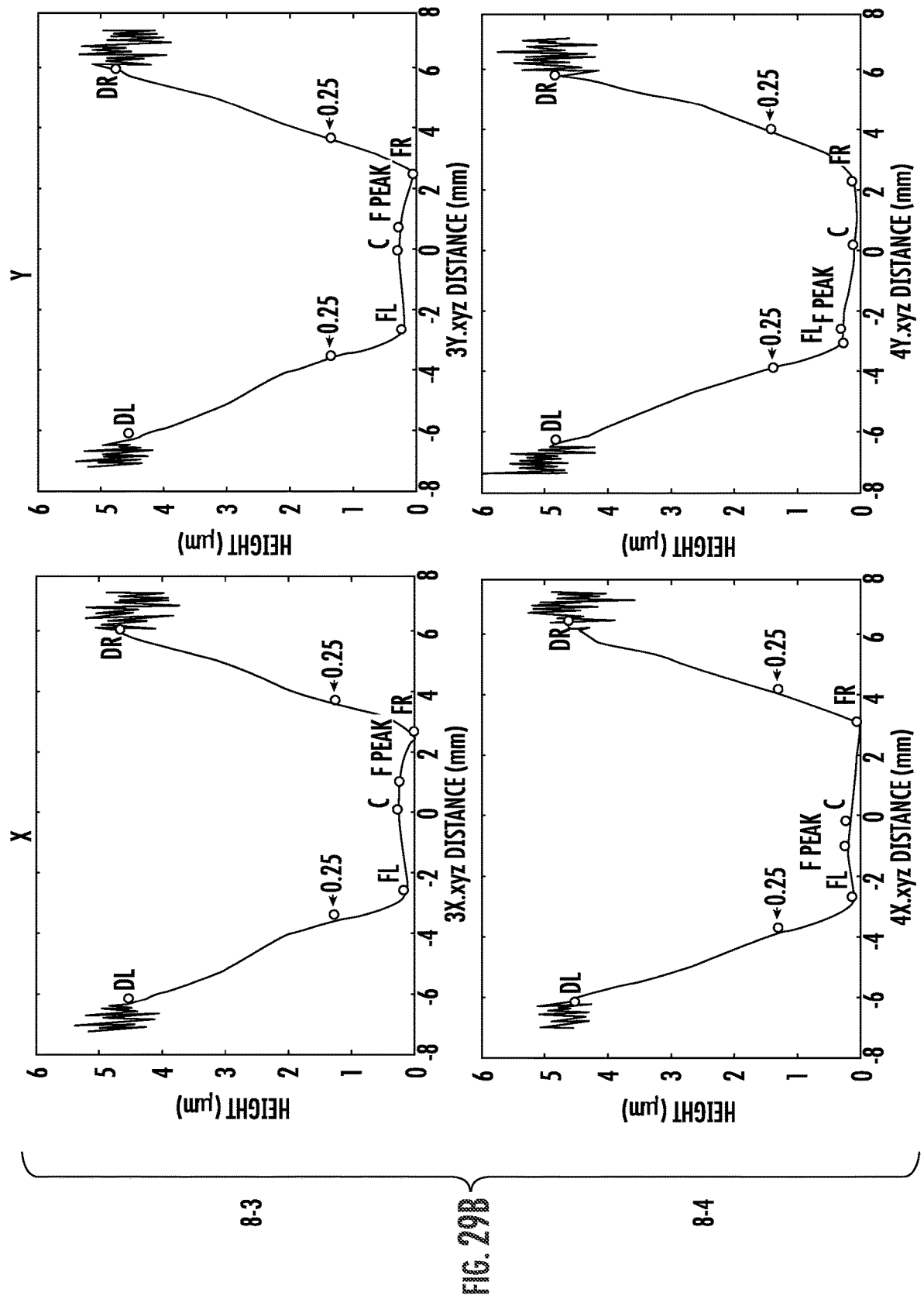
Figure 29C:
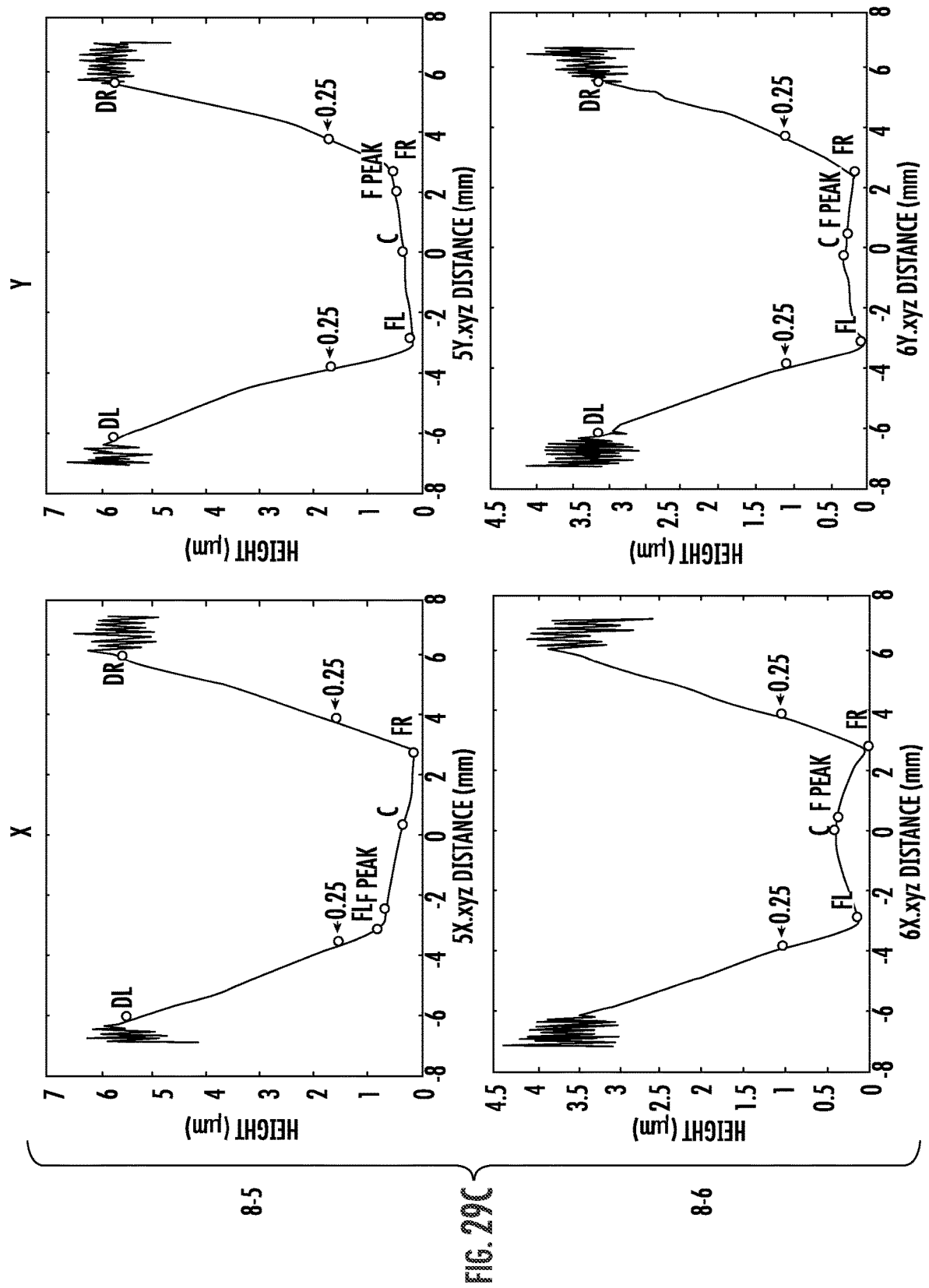
Figure 29D:
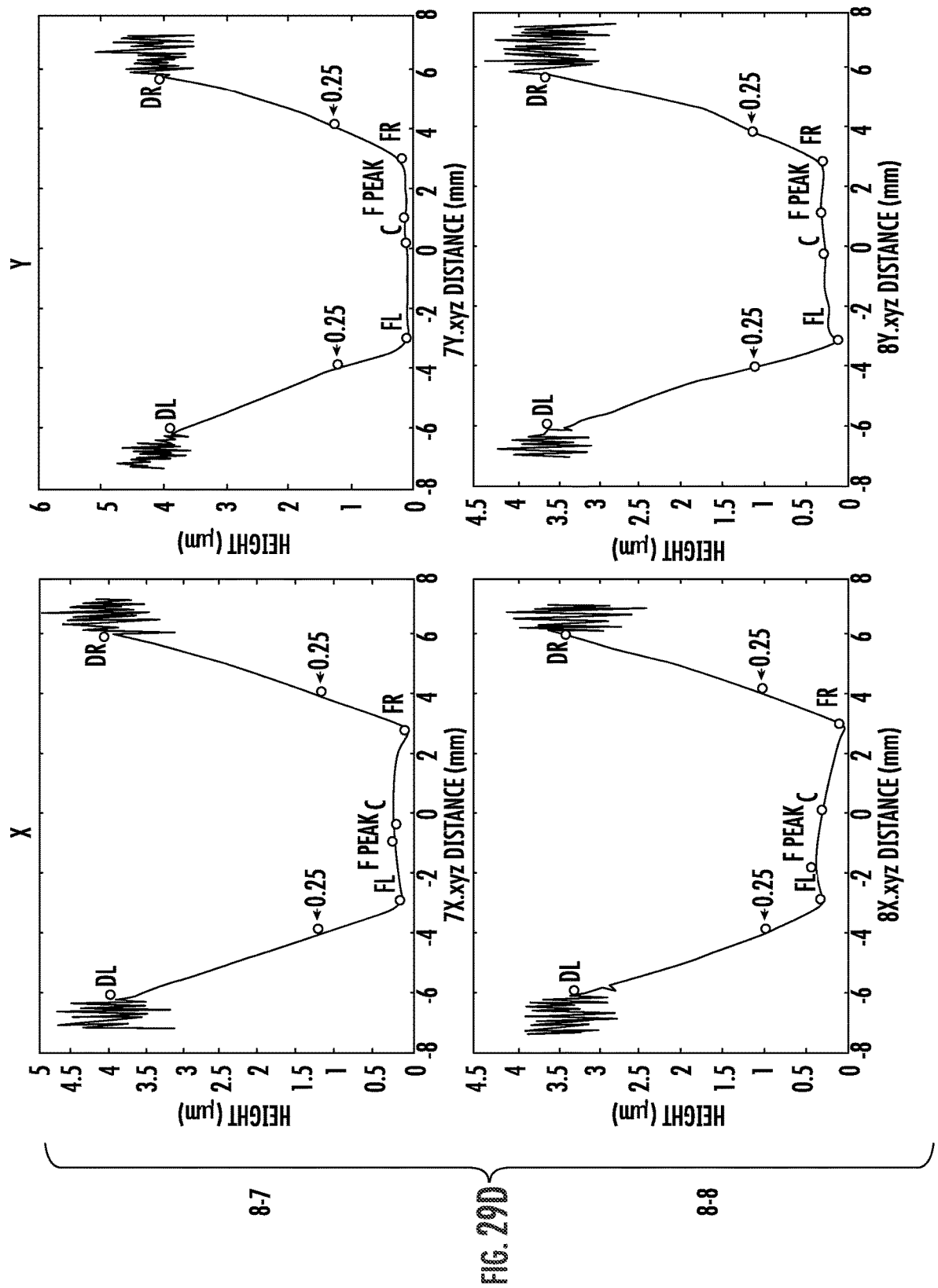
Figure 29E:
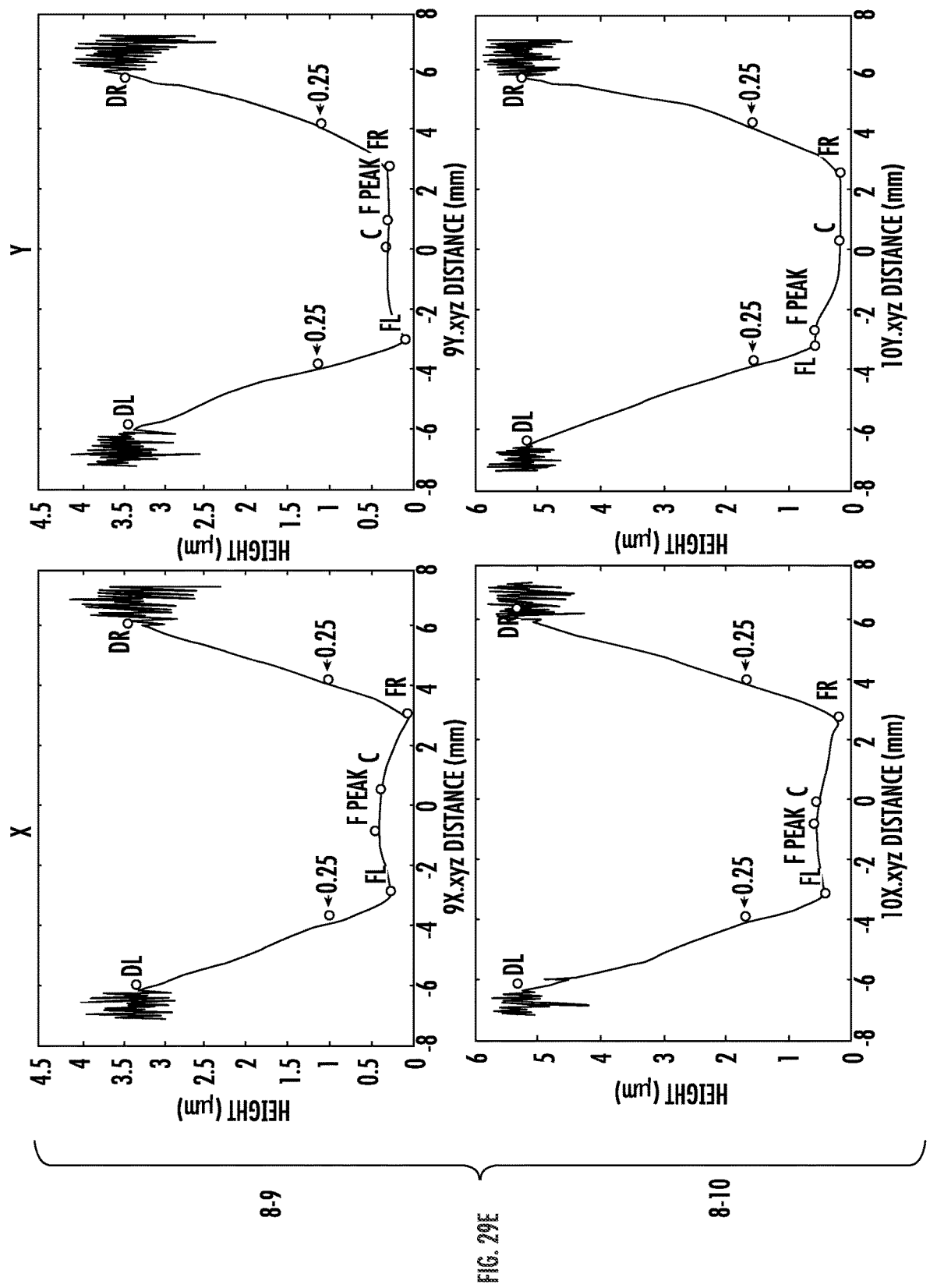
Figure 29F:
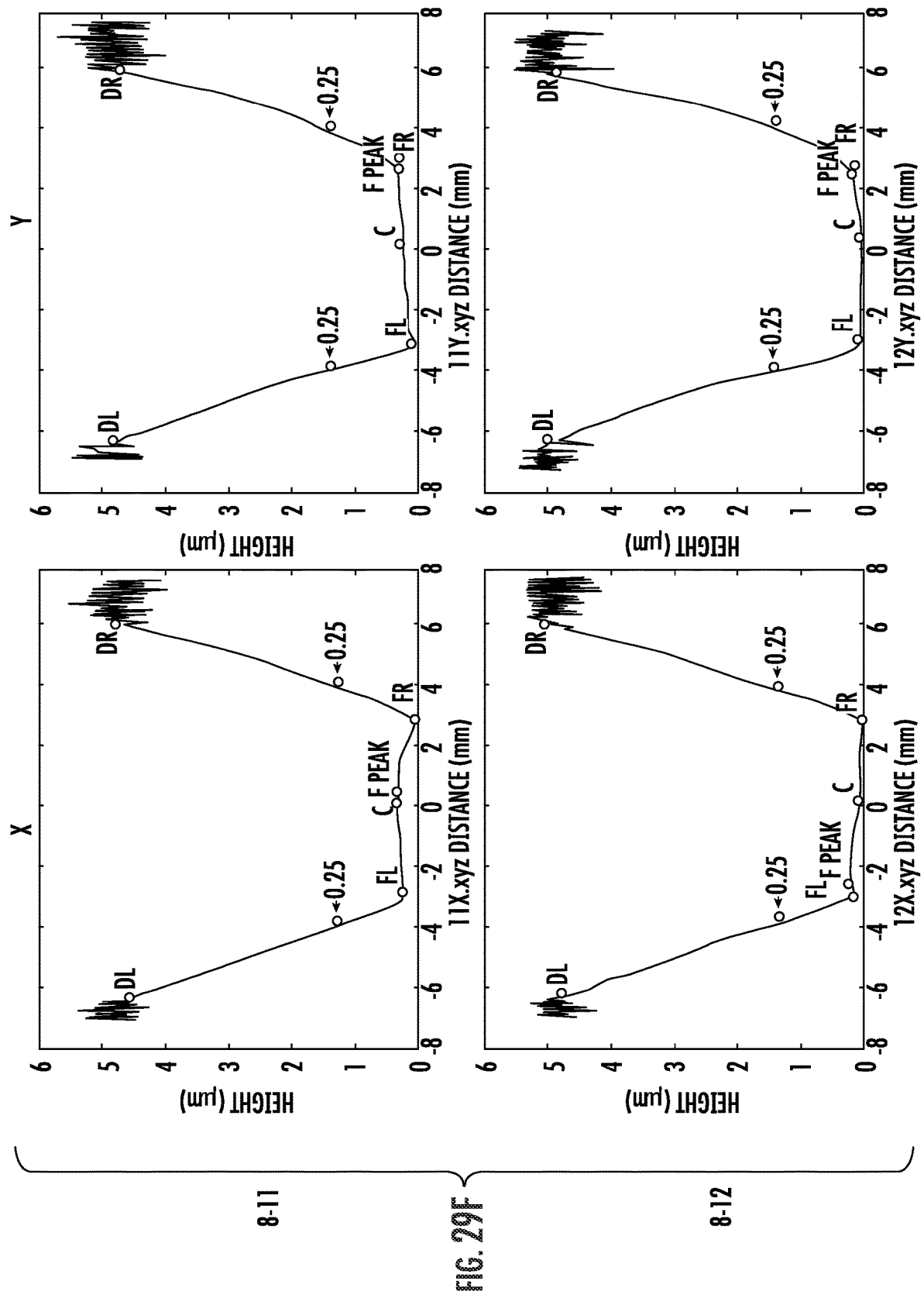
Figure 29G:
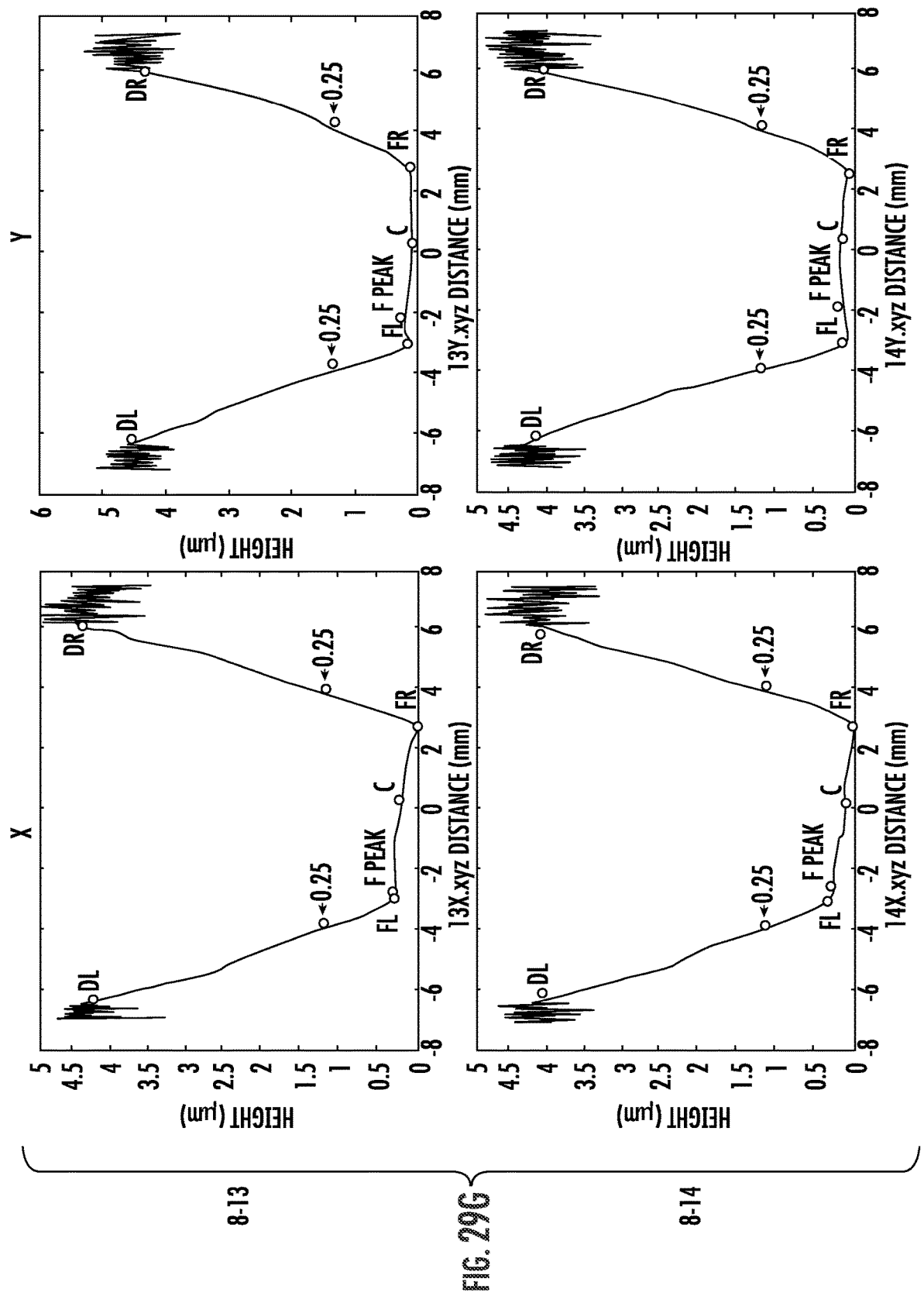
Figure 29H:
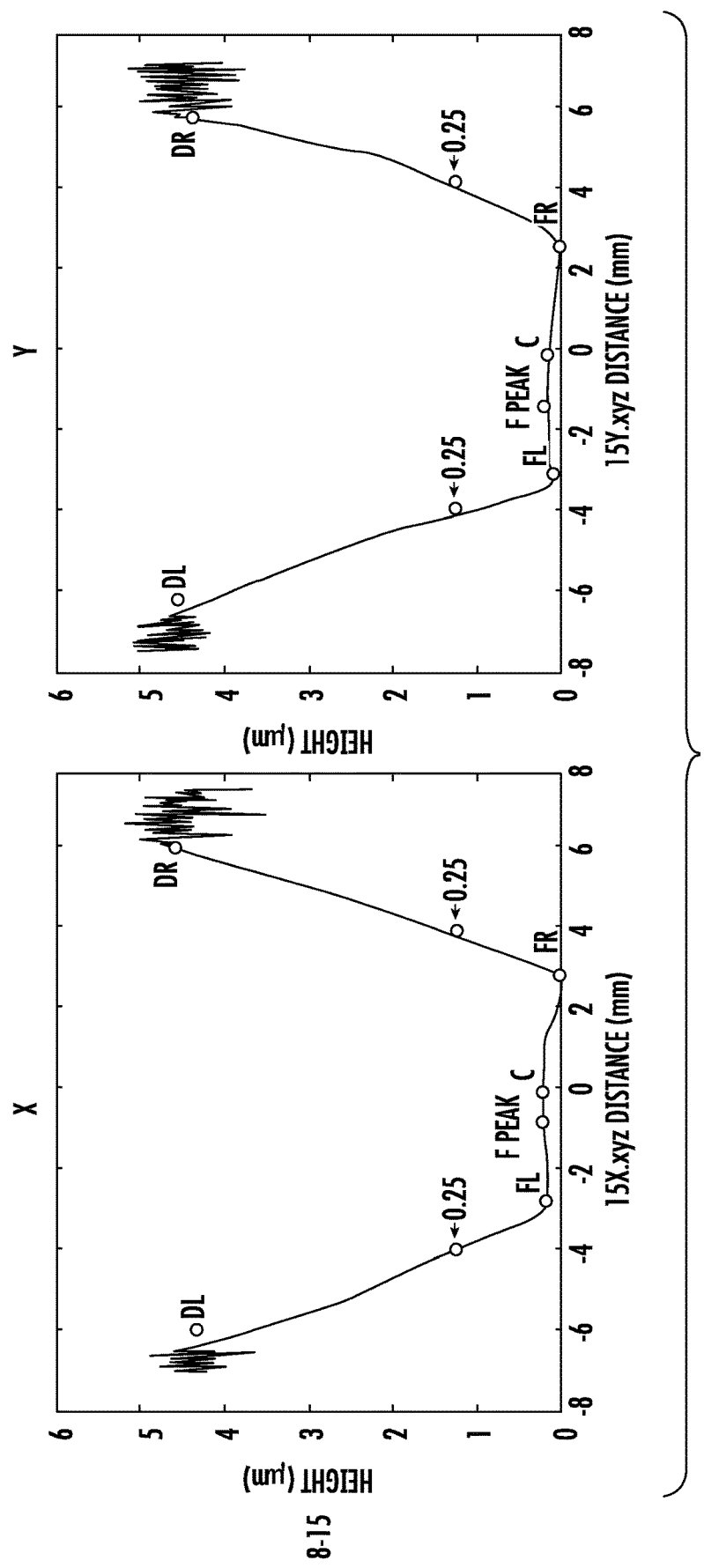

Sample substrates with a textured surface were subjected to polishing with a rotary polishing tool and zig-zag polishing patterns. The surface profiles of the resulting polished articles were then measured as described herein. FIG. 26 shows a surface profile of a substantially ideal second surface region produced by the zig-zag polishing pattern. FIGS. 27 and 28 show surface profiles achieved by the zig-zag pattern that may be considered faulty, with polished regions that do not include a sufficiently flat area.

Example 8

15 sample substrates with a textured surface were subjected to polishing with a rotary polishing tool and zig-zag polishing patterns. The surface profiles of the resulting polished articles were then measured in the x- and y-direction as described herein. The rotary polishing tool was dressed prior to the polishing of the first sample substrate (8-1) and not dressed before polishing any of the remaining substrates. The rotary polishing tool had a diameter of 6 mm and was embedded with $CeO_2$ particles having a D50 size of 1.2-1.5 µm. The step over size of the zig-zag polishing pattern was 6% and the feed rate was 1,500 mm/min. The pressure applied to the substrates by the rotary polishing tool was in the range of 2-5 psi as produced by a tool displacement of 1-2 mm. The measured surface profiles in the x- and y-direction for each of the polished articles (8-1 to 8-15) are shown in FIGS. 29A-29H. As shown in FIGS. 29A-29H, the profiles produced were all of acceptable quality.

Figure 30:
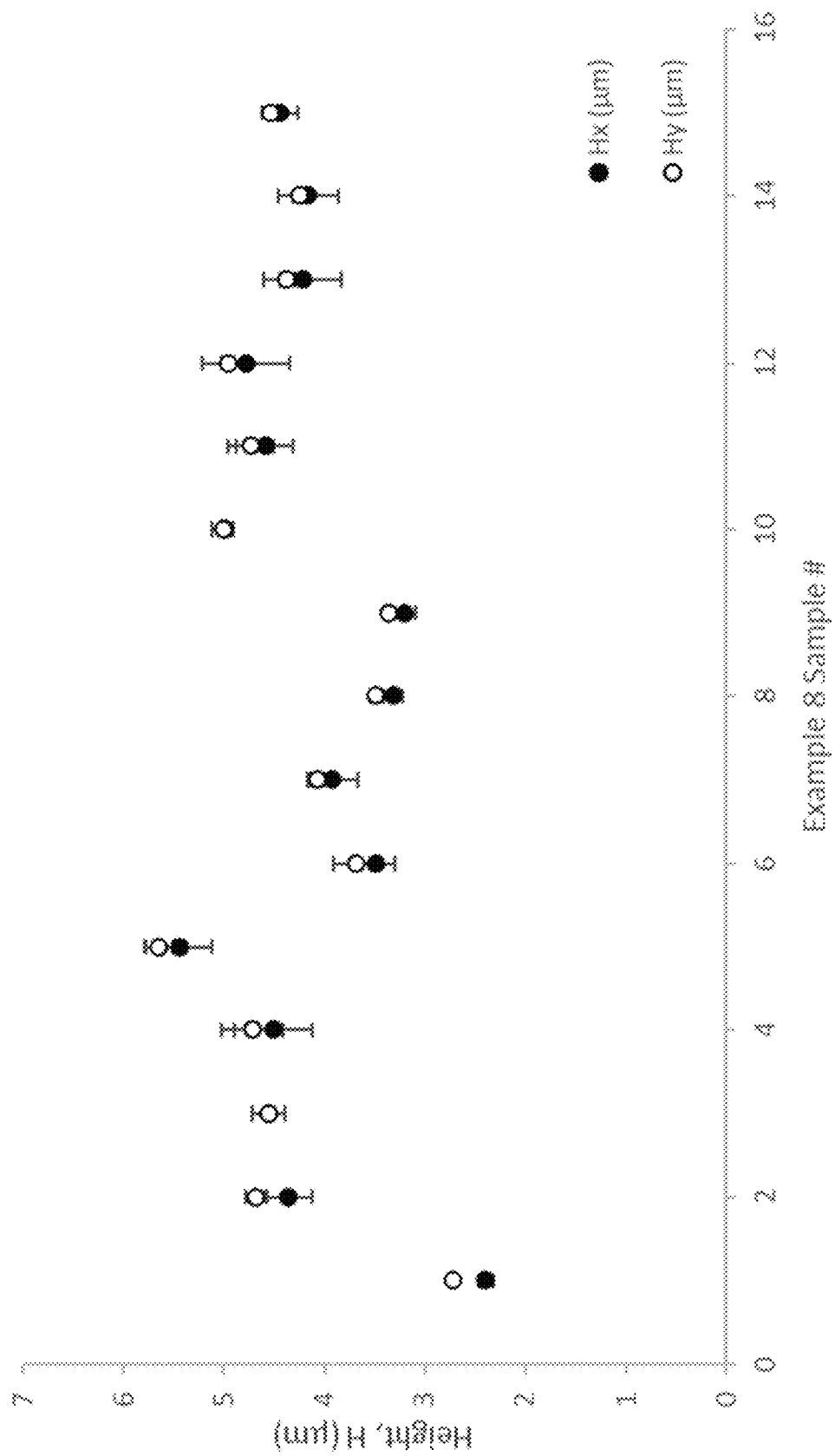
FIG. 30 shows the measured height (H) of the profiles of FIGS. 29A-29H, for both the x- and y-direction.

The height (H) of the profiles was measured for each of the polished articles, for both the x- and y-direction, and are shown in FIG. 30.

Figure 31:
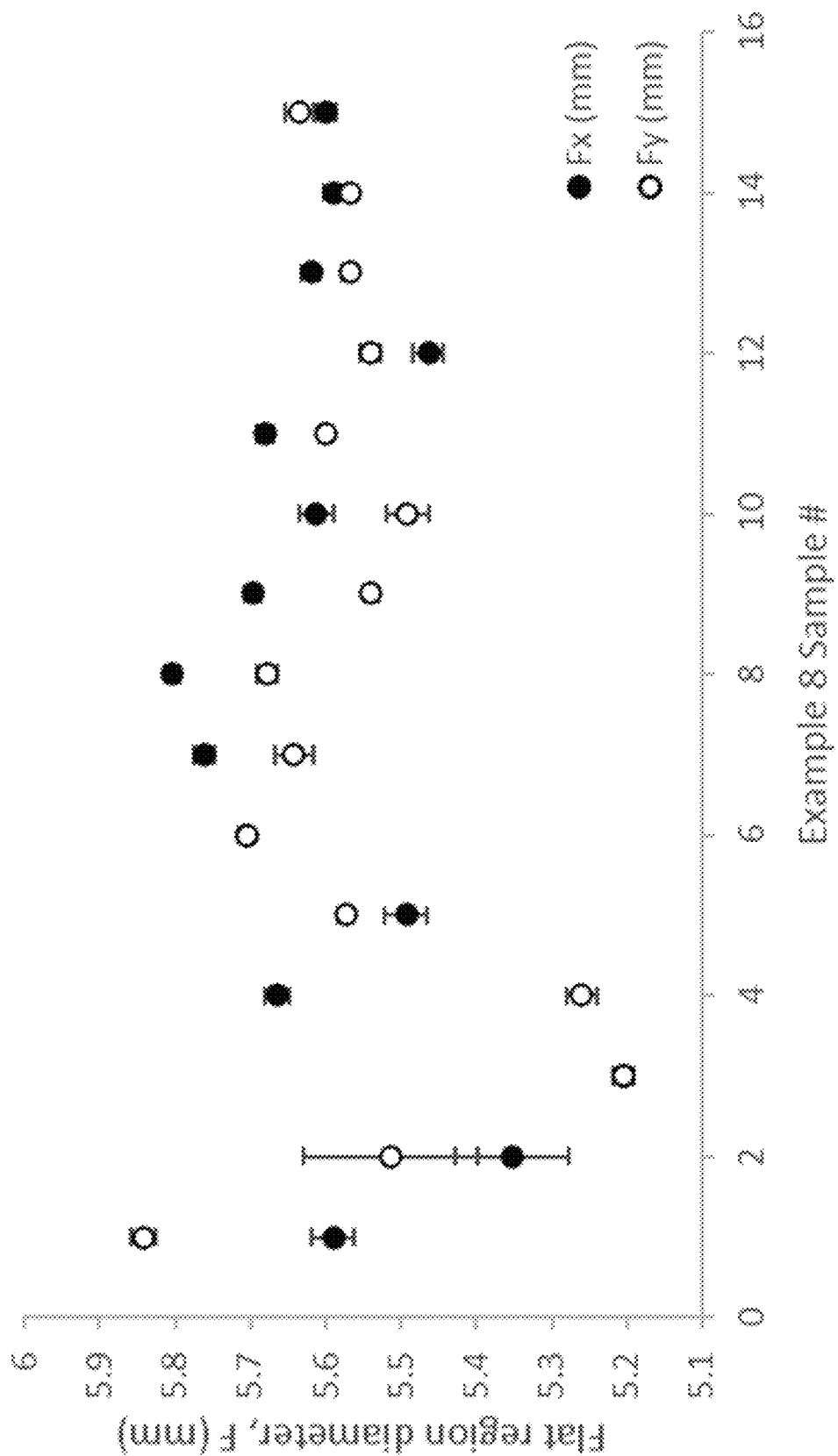
FIG. 31 shows the measured flat region diameter (F) of the profiles of FIGS. 29A-29H, for both the x- and y-direction.

The flat region diameter (F) of the profiles was measured for each of the polished articles, for both the x- and y-direction, and are shown in FIG. 31.

Figure 32:
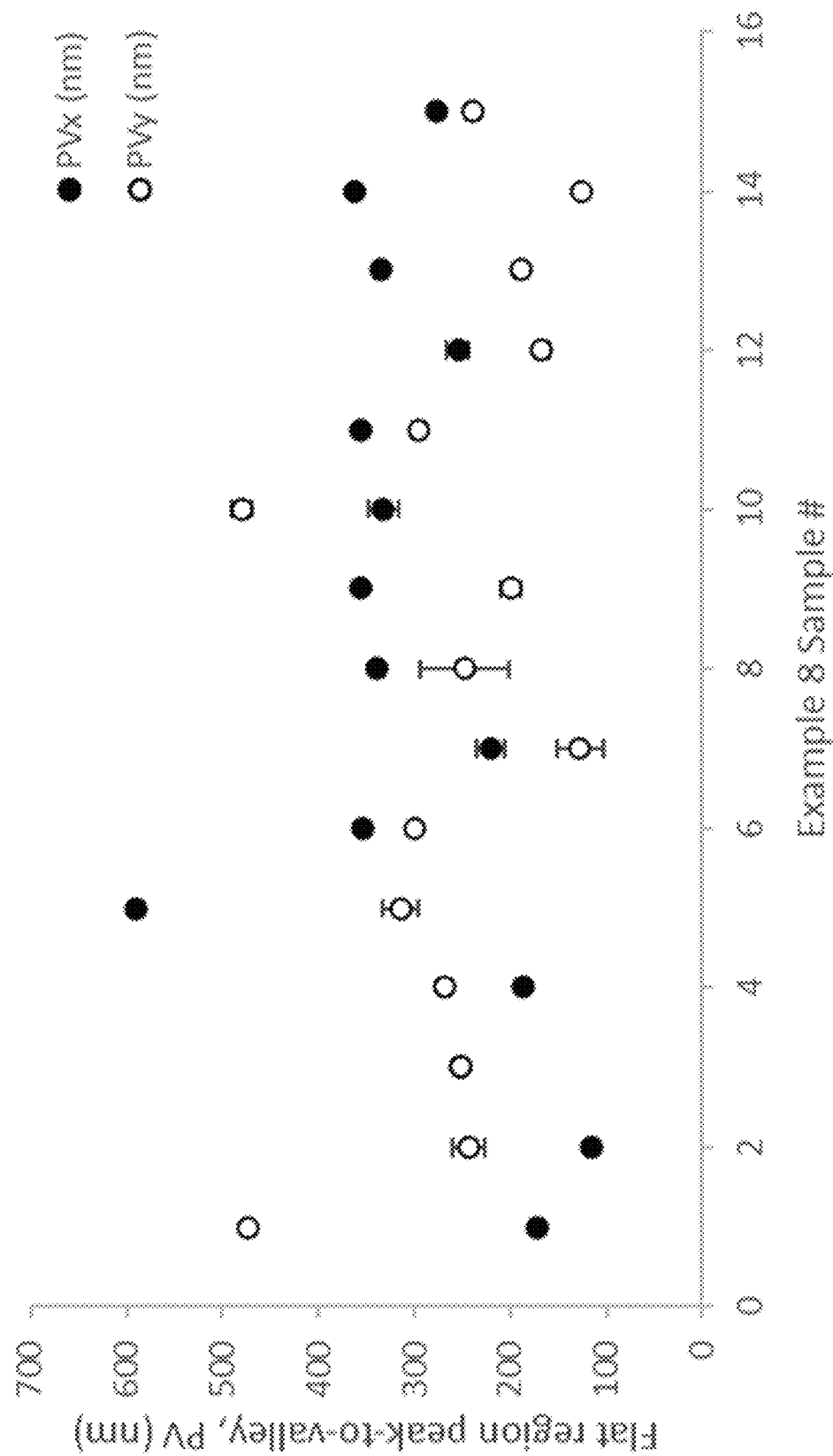
FIG. 32 shows the measured flat region peak-to-valley (PV) value of the profiles of FIGS. 29A-29H, for both the x- and y-direction.

The flat region peak-to-valley (PV) value of the profiles was measured for each of the polished articles, for both the x- and y-direction, and are shown in FIG. 32.

Figure 33:
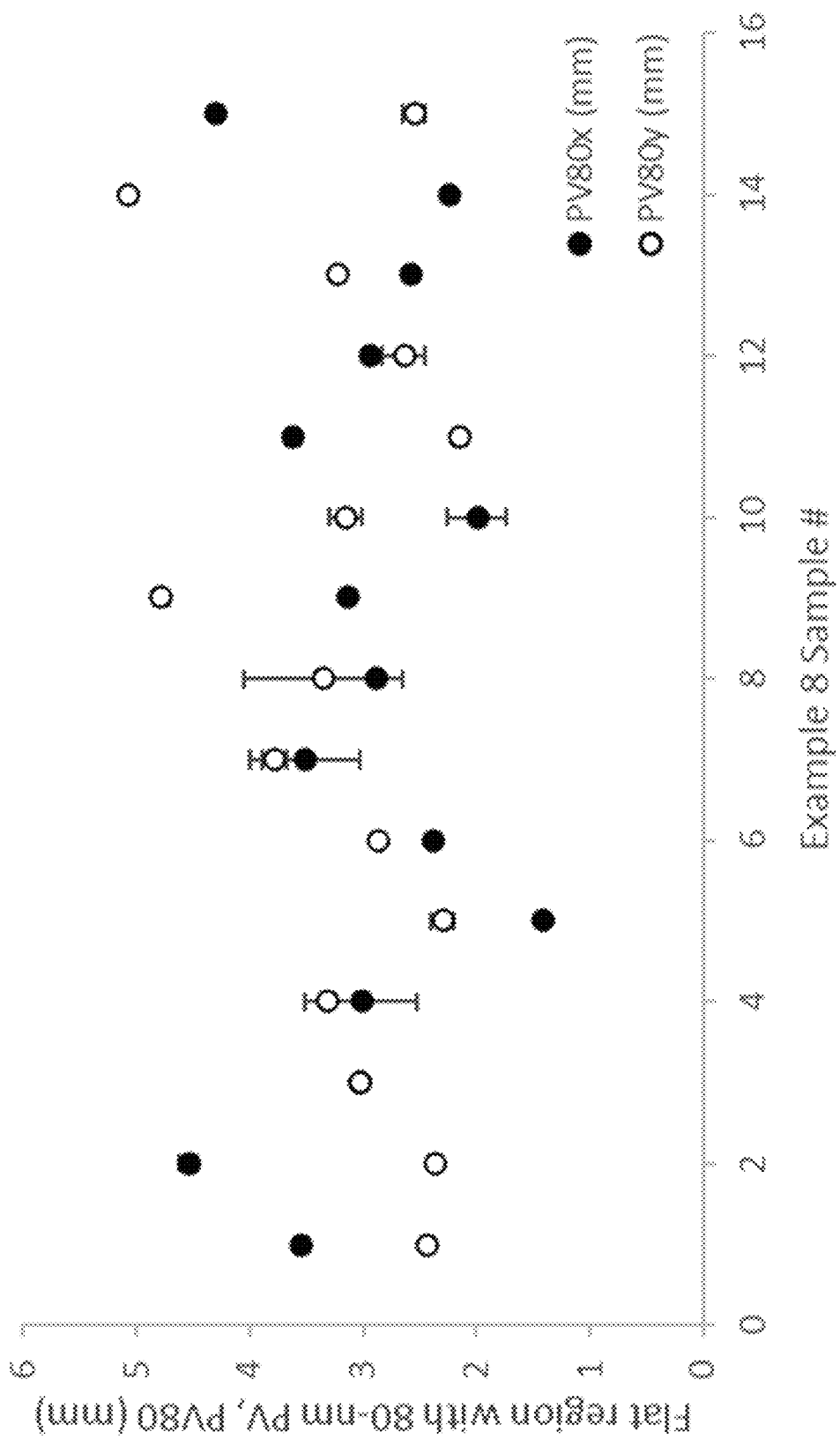
FIG. 33 shows the measured PV80 value of the profiles of FIGS. 29A-29H, for both the x- and y-direction.

The PV80 value of the profiles was measured for each of the polished articles, for both the x- and y-direction, and are shown in FIG. 33.

Figure 34:
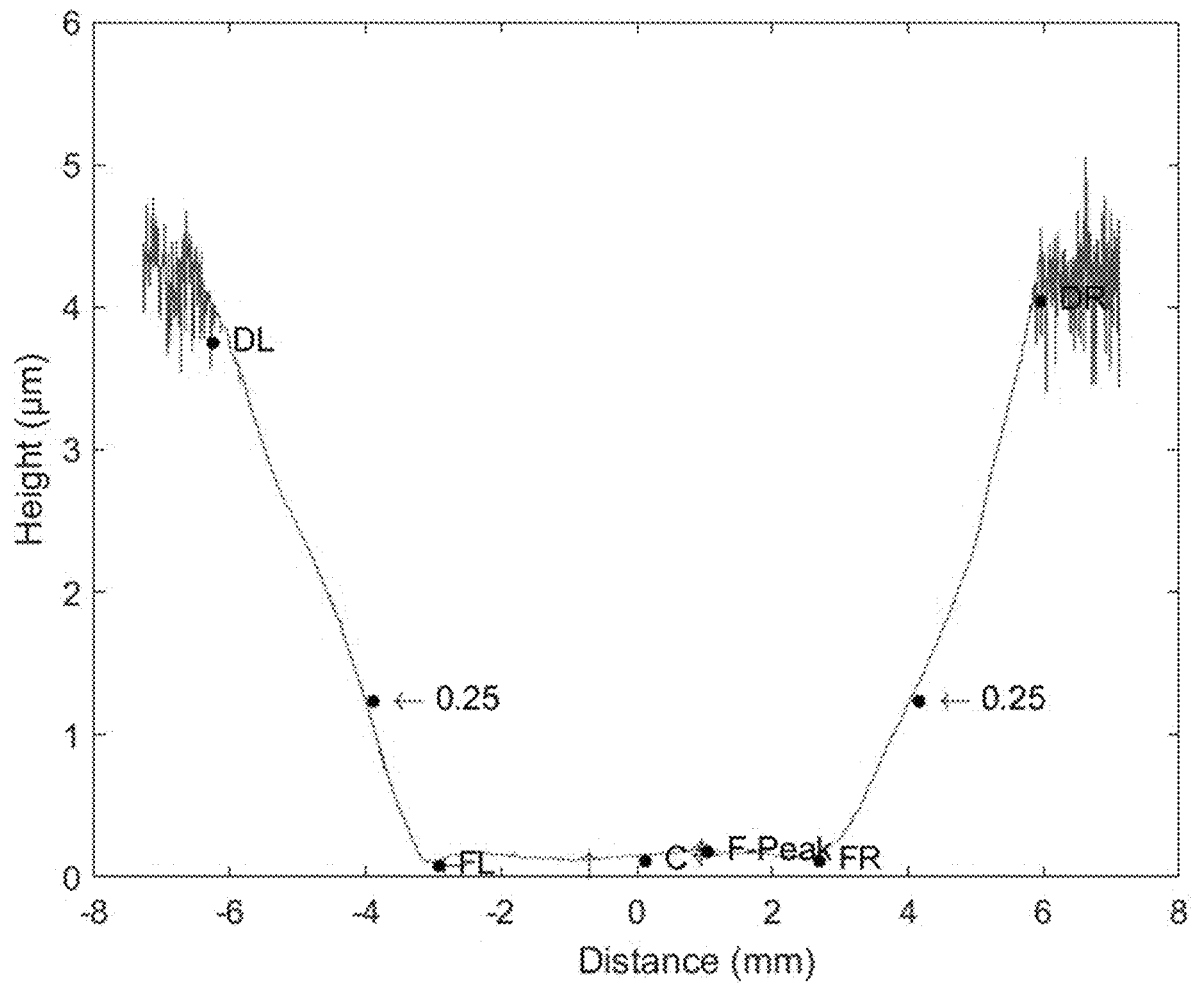
FIG. 34 is a measured surface profile representative of the profiles in FIGS. 29A-29H with the DL, DR, C, FL, FR, and Fpeak points labelled.
Figure 35:
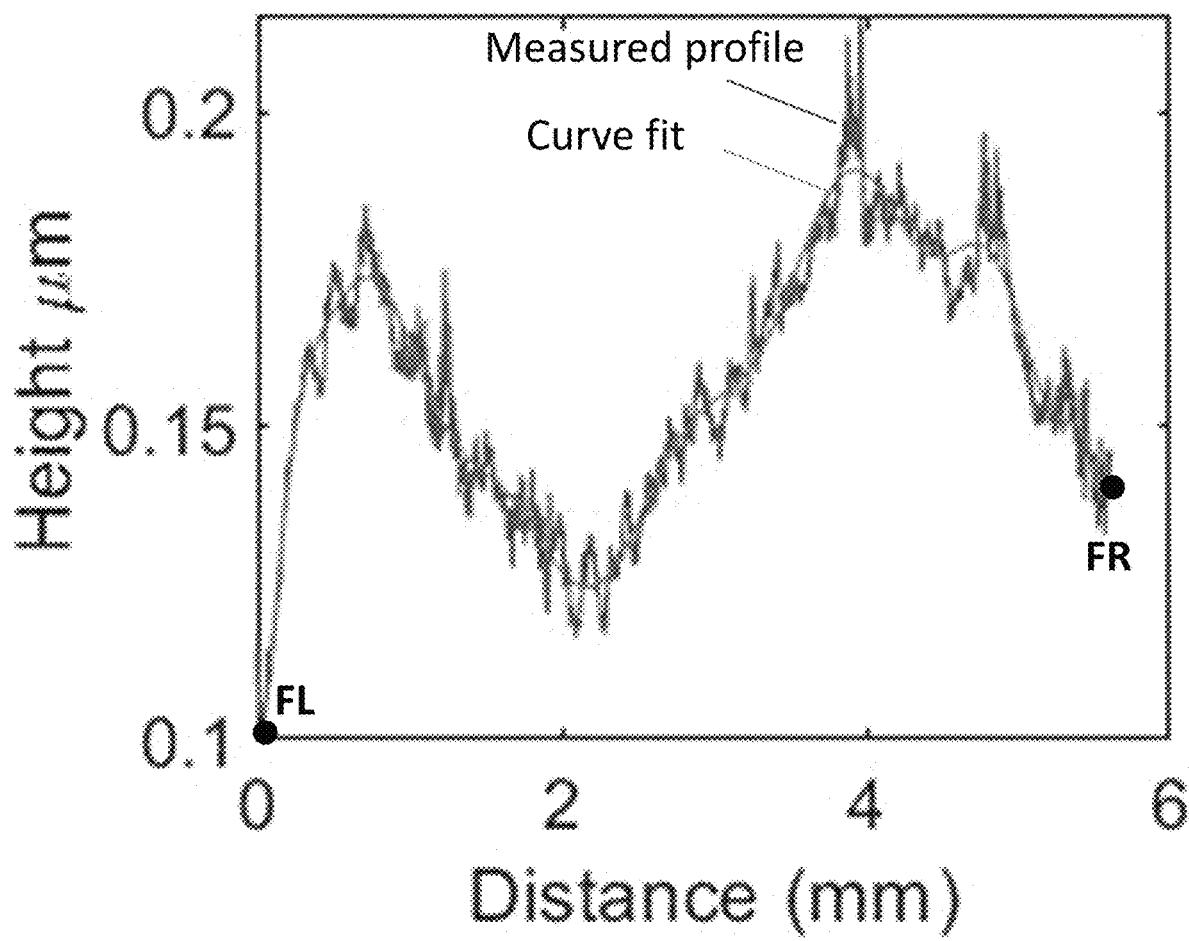
FIG. 35 is the measured profile and a curve fit between the points FL and FR of FIG. 34.
Figure 36:
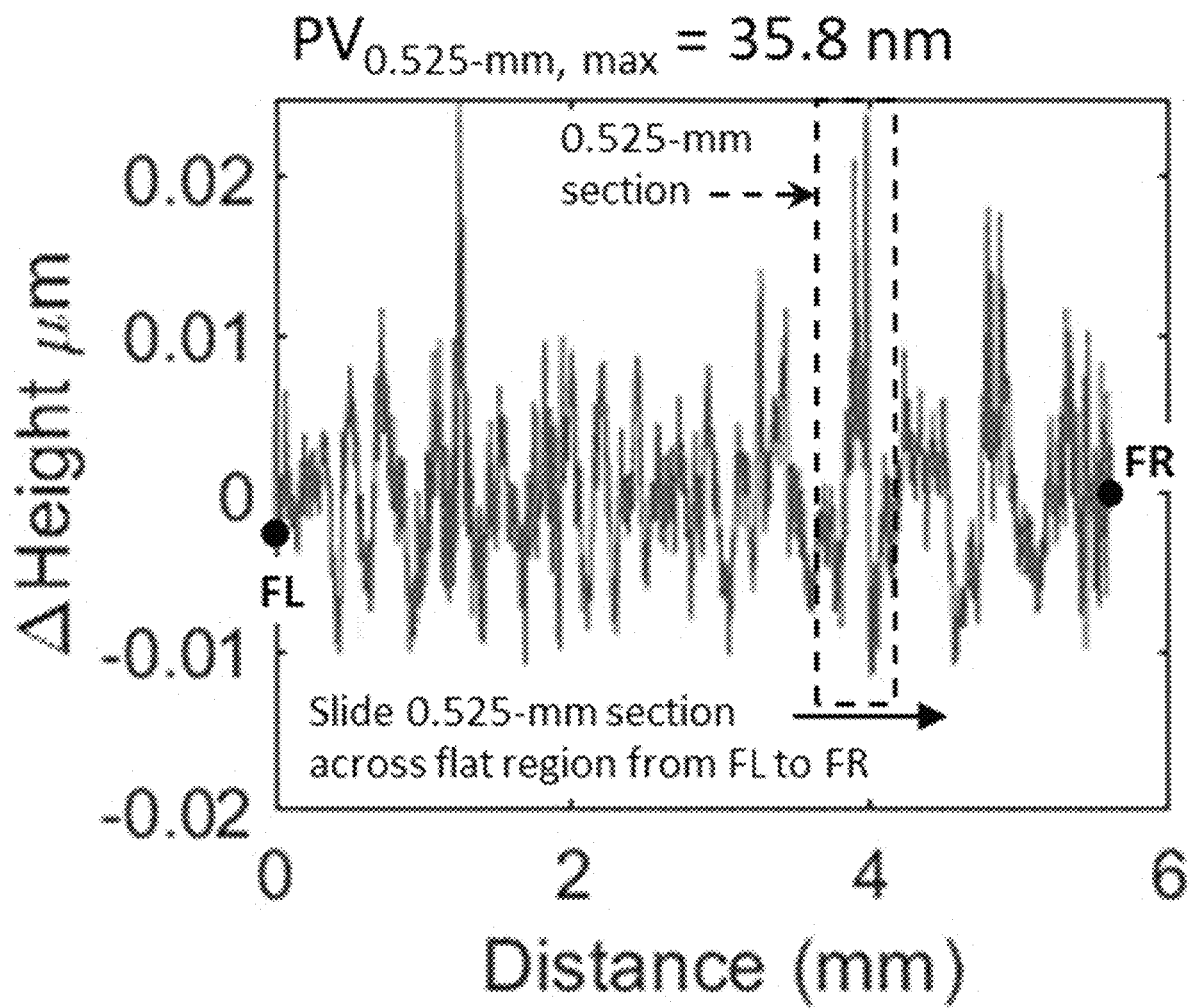
FIG. 36 is the measured difference in height (ΔHeight) for the measured profile of FIG. 34.
Figure 37:
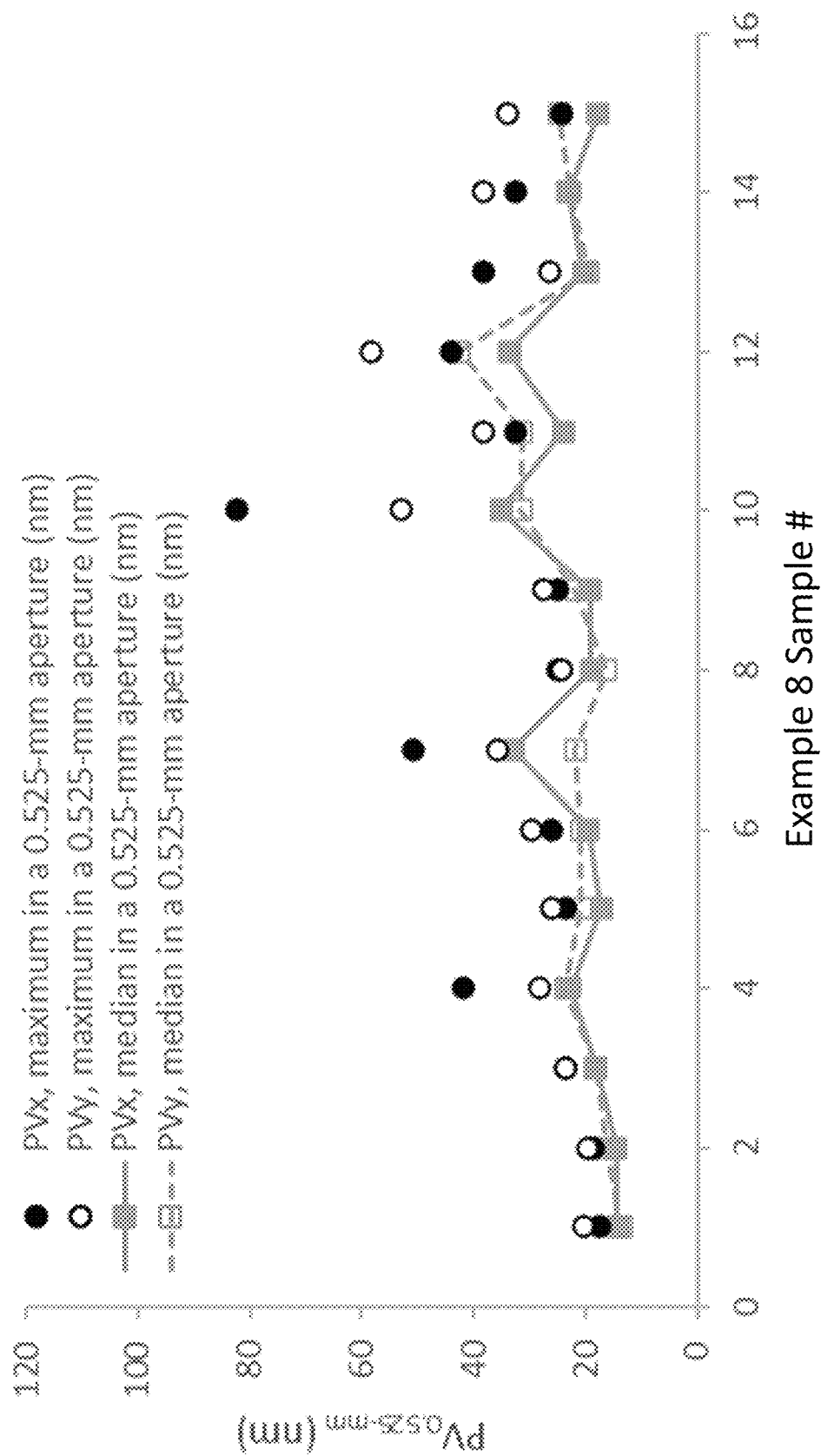
FIG. 37 is a plot of the maximum and median values of PV0.525 for all 0.525 mm wide sections of the profiles in FIGS. 29A-29H.

The DL, DR, C, FL, FR, and Fpeak points of a measured surface profile representative of the profiles in FIGS. 29A-29H were determined as described herein, and are shown in FIG. 34. A curve was fit to the measured profile between the points FL and FR of FIG. 34, as shown in FIG. 35. The difference in height, ΔHeight (µm) between points FL and FR for the profile of FIGS. 34 and 35 was calculated and is shown in FIG. 36. The dotted rectangle in FIG. 36 outlines the 0.525-mm-wide section of the polished article that had a maximum PV of 35.8 nm. The median PV for all of the 0.525-mm sections of this polished article was 21.9 nm. The maximum (circles) and median (squares) values of the PV0.525 fpr all the 0.525 wide sections of the flat regions of the profiles in FIGS. 29A-29H were measured in the x- and y-direction and are plotted in FIG. 37.

Example 9

To determine the optical quality and reproducibility of polished articles made by the same zig-zag pattern, the optics of six polished articles were modeled: five polished articles that contained the maximal range (smallest to largest) of PV and tilt in the "flat" region for the same polishing parameters; and one "control" window that had been made by protecting fusion-formed glass, sandblasting the protected glass to form a textured surface in the non-protected regions, deprotecting the glass, and etching the glass using HF.

Figure 38:
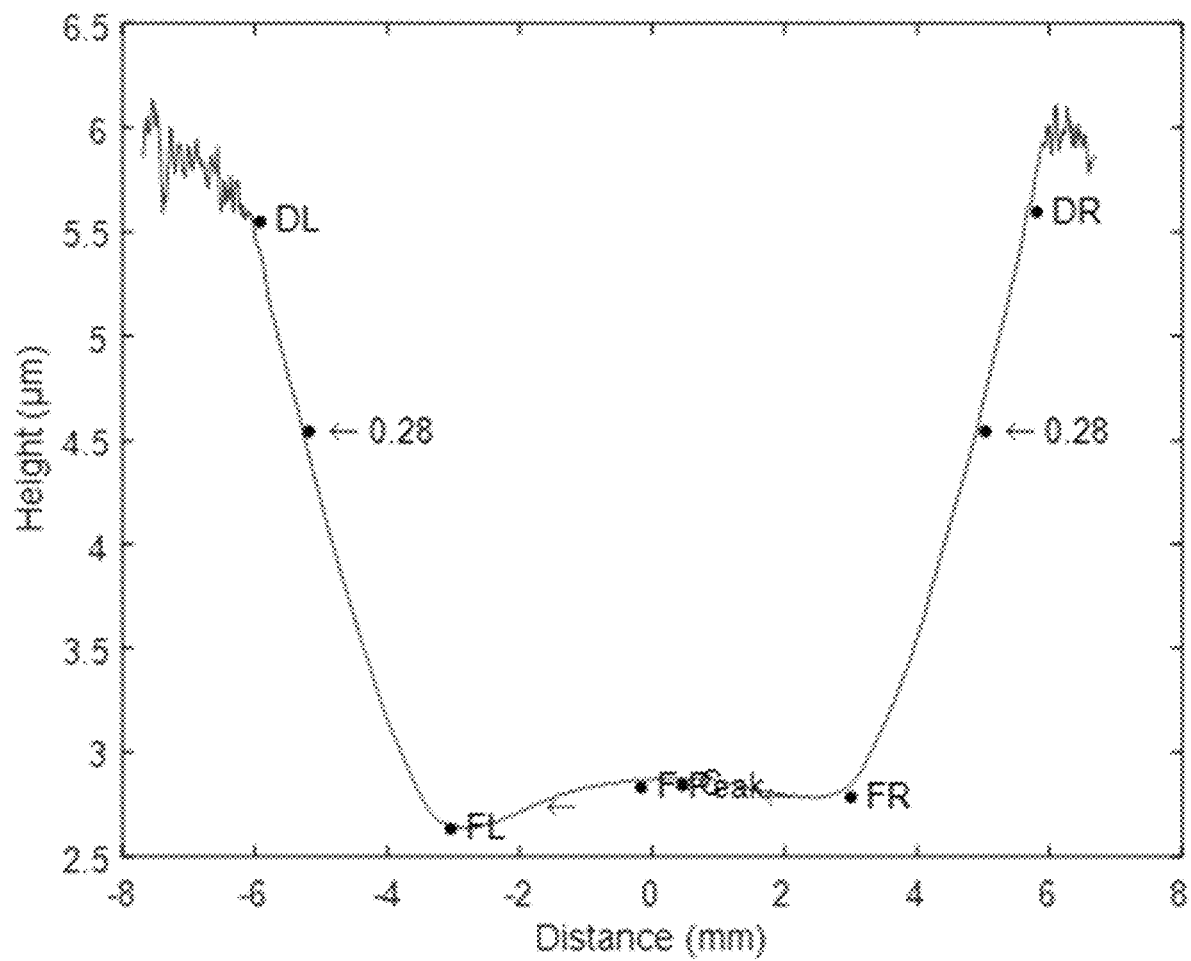
FIG. 38 shows a 1-dimensional slice of a representative polished region, with z as a function of x.
Figure 39:
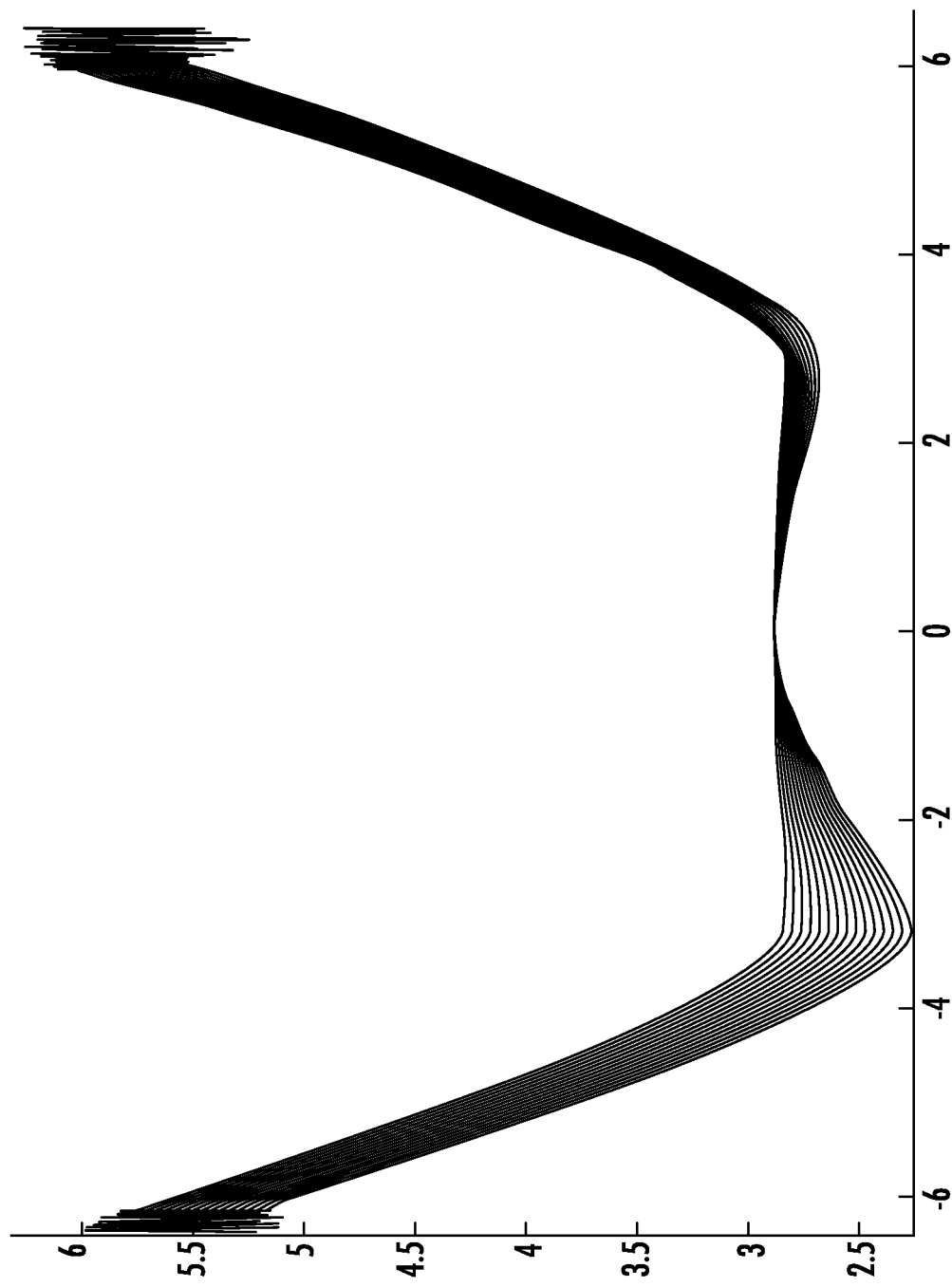
FIG. 39 shows 41 slices through the same window with z as a function of lines in the xy-plane at angles of −45° to +45° from the x axis.

The optics of the polished articles were modelled as described herein to compute the wavefront deformation transmitted through the polished region at a wavelength of 500 nm. FIG. 38 shows a 1-dimensional slice of a representative polished region, with z as a function of x. FIG. 39 shows 41 slices through the same window with z as a function of lines in the xy-plane at angles of −45° to +45° from the x axis.

Figure 40:
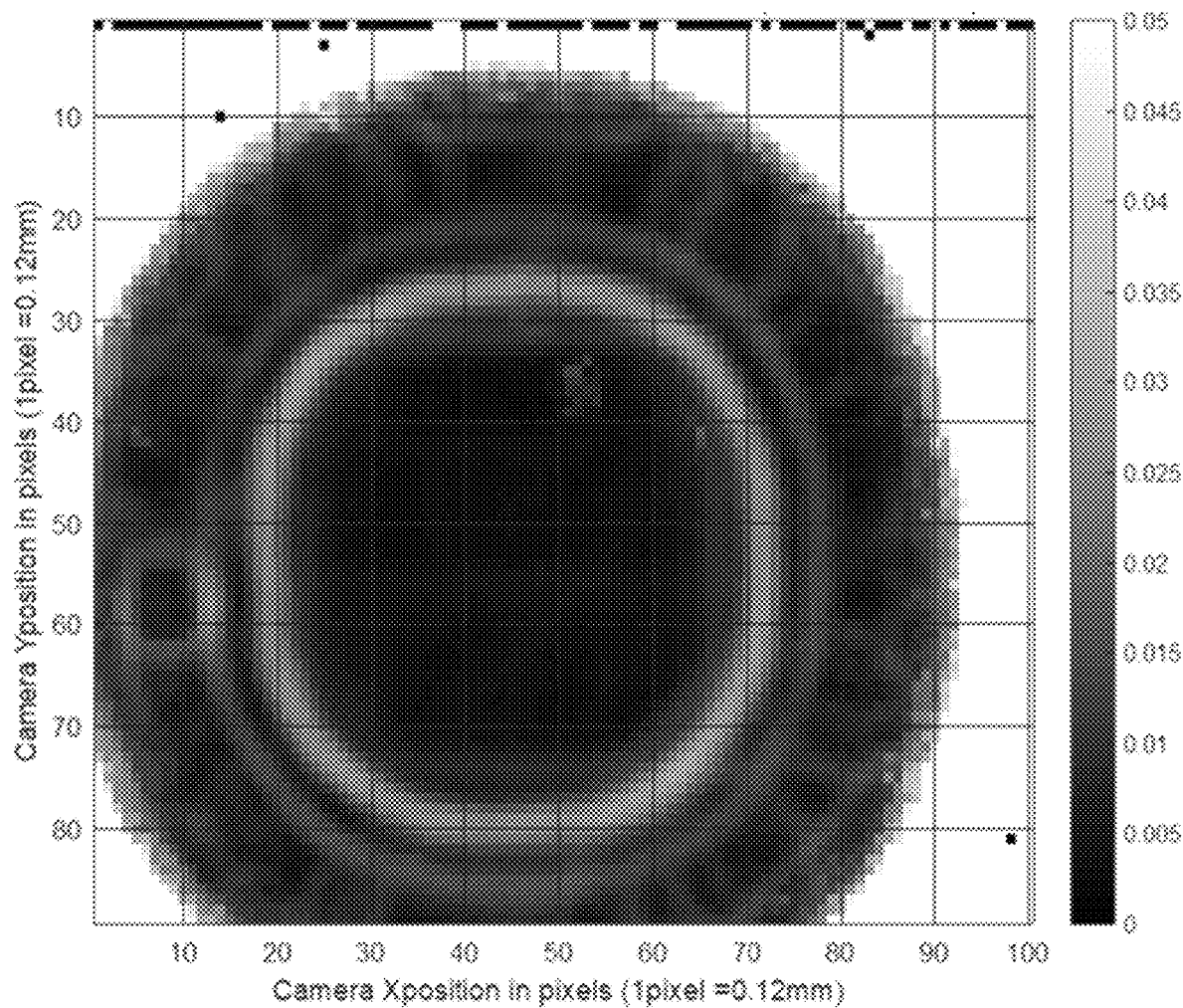
FIG. 40 shows the root-mean-squared (rms) deviation of the WFE on the optical axis of a perfect camera lens placed behind each pixel of a convoluted 2D matrix of a polished article.
Figure 41:
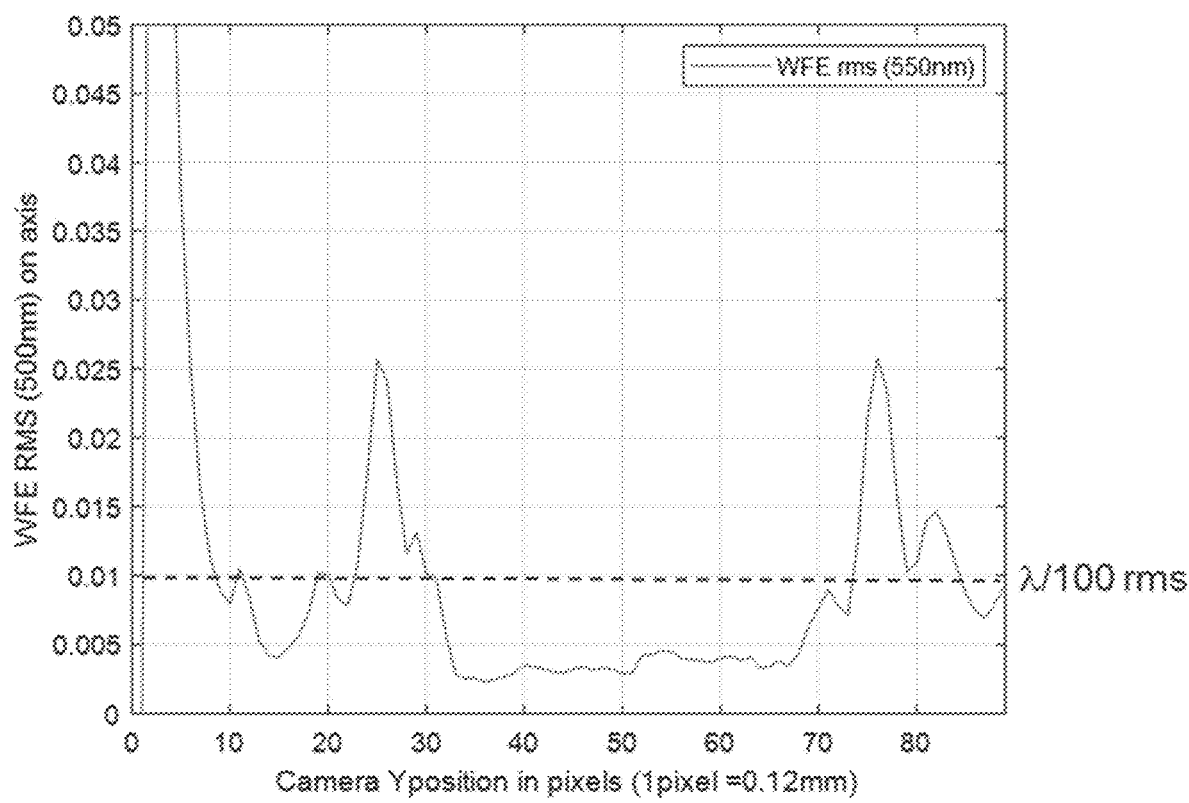
FIG. 41 is a slice in the y-direction through the WFE map of FIG. 40.

FIG. 40 shows the root-mean-squared (rms) deviation of the WFE for the optical axis of a perfect camera lens placed behind each pixel of the convoluted 2D matrix of the polished article. The 2D matrix underwent three convolution cycles. FIG. 41 is a slice in the y-direction through the WFE map of FIG. 40.

Figure 42:
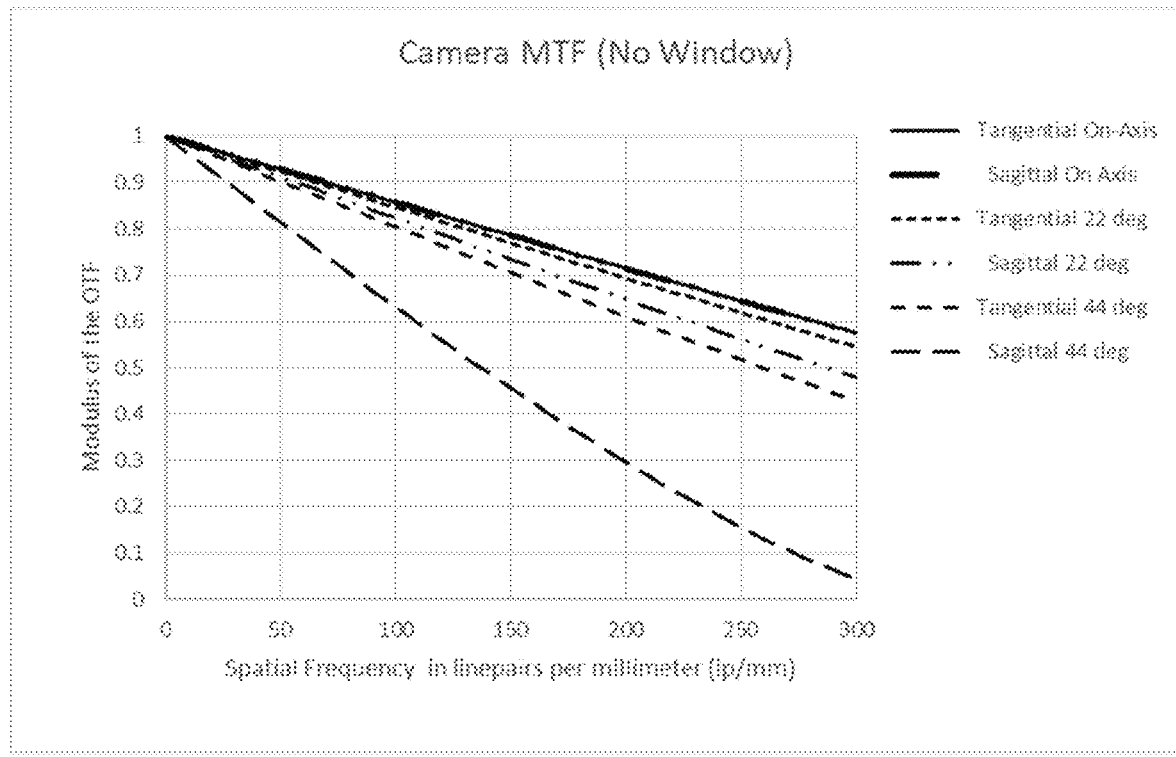
FIG. 42 shows a calculated optical transfer function (OTF, here equivalent to MTF) for a control.
Figure 43:
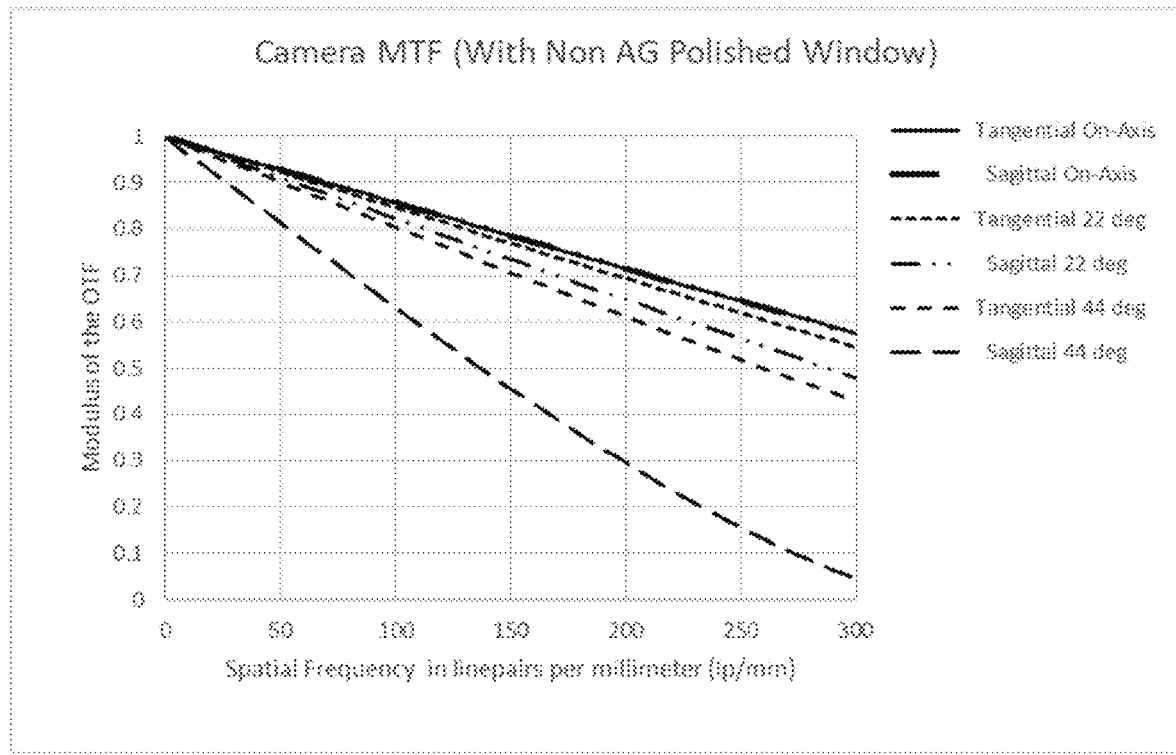
FIG. 43 shows a calculated optical transfer function (OTF, here equivalent to MTF) for a perfect camera with light first passing through a polished article according to an embodiment.
Figure 44:
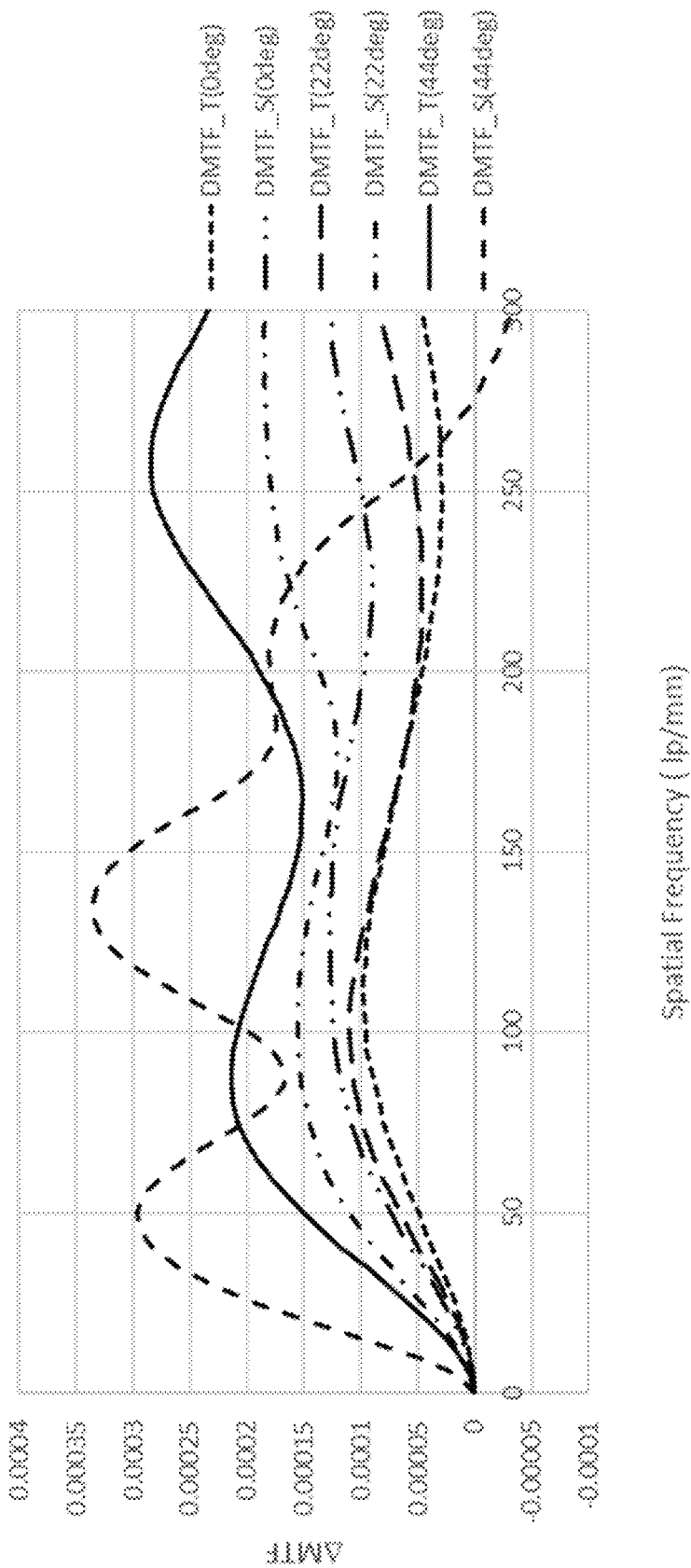
FIG. 44 shows the MTF degradation for a sample polished article calculated as the difference between the MTF of a control window and the MTF of the sample polished article.

A Zemax simulation was then conducted to calculate the MTF (with the diffraction effect included) of the control window and of the sample polished articles. Calculated optical transfer function (OTF, here equivalent to MTF) for the control is shown in FIG. 42 and for a perfect camera with light first passing through the polished article is shown in FIG. 43. The MTF degradation for a sample polished article was then calculated as the difference between the MTF of the control window and the MTF of the sample polished article, and is shown in FIG. 44.

Within the flat region of the five polished articles, the values of MTF degradation were 0.013-0.092% at 0° from the optical axis, 0.18-0.60% at 22° from the optical axis, and 0.034-0.098% at 44° from the optical axis. These values of MTF degradation were similar to those of the control window: 0.033% at 0°, 0.044% at 22°, and 0.126% at 44° from the optical axis.

The exemplary textured articles may be locally polished to produce a surface with multiple roughness regions, as described above.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass-based article, comprising:
  a first surface region with a first thickness $t_1$, a first surface roughness $R_{a1}$, and a first haze $H_1$; and
  a second surface region having a second thickness $t_2$, a second surface roughness $R_{a2}$, and a second haze $H_2$,
  wherein $R_{a1} > R_{a2}$, $H_1 > H_2$, and $t_1 > t_2$; and
  wherein 0.5 µm ≤ $t_1 - t_2$ ≤ 50 µm.

2. The glass-based article of claim 1, wherein $t_1 - t_2$ ≤ 2 µm 0.5.

3. The glass-based article of claim 1, wherein $R_{a1}$ is greater than or equal to 300 nm and $H_1$ is greater than or equal to 30% to less than or equal to 100%.

4. The glass-based article of claim 1, wherein $R_{a2}$ is greater than or equal to 0.2 nm to less than or equal to 10 nm $H_2$ is less than or equal to 0.2%.

5. The glass-based article of claim 1, further comprising:
  a third surface region having a third thickness $t_3$, a third surface roughness $R_{a3}$, and a third haze $H_3$,
  wherein $R_{a1} > R_{a3} > R_{a2}$, $H_1 > H_3 > H_2$, and $t_1 > t_3 > t_2$.

6. The glass-based article of claim 1, wherein the second surface region has a diameter greater than or equal to 1 mm to less than or equal to 20 mm.

7. The glass-based article of claim 1, wherein the glass-based article comprises a transition region, the transition region being characterized by the transition between the region with the thickness $t_1$ to the second surface region with the thickness $t_2$, and the transition region has a width greater than or equal to 0.1 mm to less than or equal to 8 mm.

8. The glass-based article of claim 1, wherein the second surface region comprises a flat region with a diameter greater than or equal to 0.1 mm to less than or equal to 19.8 mm.

9. The glass-based article of claim 8, wherein the flat region has a peak-to-valley value greater than or equal to 0.2 nm to less than or equal to 600 nm.

10. The glass-based article of claim 8, wherein the flat region has a second surface roughness $R_{a2}$ greater than or equal to 0.2 nm to less than or equal to 20 nm and a second haze $H_2$ greater than or equal to 0.0001% to less than or equal to 0.2%.

11. The glass-based article of claim 8, wherein the flat region has a modulation transfer function degradation greater than or equal to 0% to less than or equal to 0.1%.

12. A consumer electronic product, comprising:
  a housing having a front surface, a back surface and side surfaces;
  electrical components provided at least partially within the housing, the electrical components including at least a controller, a memory, and a display, the display being provided at or adjacent the front surface of the housing; and
  a cover substrate disposed over the display,
  wherein at least a portion of at least one of the housing and the cover substrate comprises the glass-based article of claim 1.

13. A method, comprising:
  texturing a surface of a glass-based substrate to produce a textured glass-based substrate having a first thickness $t_1$, a first surface roughness $R_{a1}$, and a first haze $H_1$; and
  polishing a region of the surface of the textured glass-based substrate to produce a glass-based article with a surface comprising a polished region with a second thickness $t_2$, a second surface roughness $R_{a2}$, and a second haze $H_2$,
  wherein $R_{a1} > R_{a2}$, $H_1 > H_2$, $t_1 > t_2$, and the glass-based article comprises a region having $t_1$, $R_{a1}$, and $H_1$; and
  wherein 0.5 µm ≤ $t_1 - t_2$ ≤ 50 µm.

14. The method of claim 13, wherein the texturing removes from greater than or equal to 5 µm to less than or equal to 50 µm from the surface of the glass-based substrate.

15. The method of claim 13, wherein the texturing comprises etching the surface of the glass-based substrate with an etchant.

16. The method of claim 13, wherein the texturing comprises mechanically lapping the surface of the glass-based substrate.

17. The method of claim 13, wherein $t_1 - t_2$ ≤ 2 µm.

18. The method of claim 13, wherein:
  $R_{a1}$ is greater than or equal to 300 nm,
  $H_1$ is greater than or equal to 30% to less than or equal to 100%,
  $R_{a2}$ is greater than or equal to 0.2 nm to less than or equal to 10 nm, and
  $H_2$ is less than or equal to 0.2%.

19. The method of claim 13, further comprising:
  polishing an additional region of the surface of the textured glass-based substrate to produce a glass-based article comprising an additional region with a third thickness $t_3$, a third surface roughness $R_{a3}$, and a third haze $H_3$,
  wherein $R_{a1} > R_{a3} > R_{a2}$, $H_1 > H_3 > H_2$, and $t_1 > t_3 > t_2$.

20. A method, comprising:
polishing a region of a surface of a glass-based substrate with a rotary polishing tool to produce a glass-based article with a surface comprising a polished region, wherein:
- the pressure applied to the glass-based substrate by the rotary polishing tool is controlled to be in the range greater than or equal to 1 psi to less than or equal to 15 psi,
- the rotary polishing tool comprises an abrasive component embedded in a binder,
- the glass-based substrate has a first thickness $t_1$,
- the polished region of the glass-based article has a second thickness $t_2$,
- the glass-based article comprises a region having a thickness $t_1$, and
- $t_1 > t_2$,
- the glass-based substrate has a textured surface having a first surface roughness $R_{a1}$ and a first haze $H_1$; the polished region has a second surface roughness $R_{a2}$ and a second haze $H_2$; $R_{a1} > R_{a2}$; and $H_1 > H_2$, and 0.5 µm ≤ $t_1 - t_2$ ≤ 50 µm.

21. The method of claim 20, wherein the rotary polishing tool operates at a rotational speed greater than or equal to 500 rpm to less than or equal to 60,000 rpm.

22. The method of claim 20, wherein the rotary polishing tool has a diameter that is less than or equal half of a diameter of the polished region.

23. The method of claim 20, wherein the rotary polishing tool is moved at a feed rate greater than or equal to 500 mm/min to less than or equal to 2000 mm/min.

24. The method of claim 20, wherein the polished region has a diameter greater than or equal to 1 mm to less than or equal to 20 mm.

25. The method of claim 20, wherein the glass-based article comprises a transition region, the transition region being characterized by the transition between the region with the thickness $t_1$ to the polished region with the thickness $t_2$, and the transition region has a width greater than or equal to 0.1 mm to less than or equal to 8 mm.

26. The method of claim 20, wherein the polished region comprises a flat region with a diameter greater than or equal to 0.1 mm to less than or equal to 19.8 mm.

27. The method of claim 26, wherein the flat region has at least one of:
- a peak-to-valley value greater than or equal to 0.2 nm to less than or equal to 600 nm,
- a second surface roughness $R_{a2}$ greater than or equal to 0.2 nm to less than or equal to 20 nm and a second haze $H_2$ greater than or equal to 0.0001% to less than or equal to 0.2%, and
- a modulation transfer function degradation greater than or equal to 0% to less than or equal to 0.1%.

28. The method of claim 20, wherein the rotary polishing tool is moved in a pattern with a step over size greater than or equal to 2% to less than or equal to 6% of a diameter of the rotary polishing tool.

* * * * *